(12) United States Patent
Tung et al.

(10) Patent No.: US 9,086,928 B2
(45) Date of Patent: Jul. 21, 2015

(54) PROVISIONER WITHIN CLOUD CONSOLE—DEFINING IMAGES OF AN ENTERPRISE TO BE OPERABLE ON DIFFERENT CLOUD COMPUTING PROVIDERS

(75) Inventors: Teresa Sheausan Tung, San Jose, CA (US); Owen E. Richter, Santa Clara, CA (US); Vipul Savjani, Friendswood, TX (US)

(73) Assignee: Accenture Global Services Limited, Dublin (IE)

( * ) Notice: Subject to any disclaimer, the term of this patent is extended or adjusted under 35 U.S.C. 154(b) by 1422 days.

(21) Appl. No.: 12/642,596

(22) Filed: Dec. 18, 2009

(65) Prior Publication Data

US 2011/0055399 A1    Mar. 3, 2011

Related U.S. Application Data

(60) Provisional application No. 61/238,617, filed on Aug. 31, 2009.

(51) Int. Cl.
| | |
|---|---|
| *G06F 15/173* | (2006.01) |
| *G06F 9/50* | (2006.01) |
| *G06F 11/34* | (2006.01) |

(52) U.S. Cl.
CPC ............ *G06F 9/5072* (2013.01); *G06F 9/5077* (2013.01); *G06F 11/3404* (2013.01); *G06F 11/3409* (2013.01); *G06F 2201/815* (2013.01); *G06F 2201/86* (2013.01); *G06F 2201/865* (2013.01)

(58) Field of Classification Search
USPC .......................... 709/224, 223, 226, 212, 213
See application file for complete search history.

(56) References Cited

U.S. PATENT DOCUMENTS 8,572,602 B1 * 10/2013 Colton et al. ................. 717/177
2003/0105810 A1    6/2003 McCrory et al.

(Continued)

OTHER PUBLICATIONS

V. Consulo et al: "Volunteer Computing and Desktop Cloud: The Cloud@Home Paradigm", Network Computing and Applications, 2009. NCA 2009. Jul. 9, 2009, pp. 134-139, XP002610062, Cambridge, MA, USA DOI: http://dx.doi.org/10.1109/NCA.2009.41 Retrieved from the Internet: URL: http://ieeexplore.ieee.org/stamp/stamp.jsp?tp=&arnumber=5190364 [retrieved on Nov. 15, 2010] p. 136, col. g, line 8—p. 139, col. g, line 20; figures 1,2,3.

(Continued)

*Primary Examiner* — Lan-Dai T Truong
(74) *Attorney, Agent, or Firm* — Fish & Richardson P.C.

(57) ABSTRACT

A method, computer-readable medium, and system for provisioning computing resources across multiple cloud providers and/or data centers are disclosed. A graphical user interface is used to select a plurality of computing resources and at least one cloud provider and/or at least one data center for providing the plurality of computing resources. Scripts associated with the at least one cloud provider and/or at least one data center are accessed, where each script is capable of automatically setting up a computing resource on an associated cloud provider or associated data center. The scripts are then used to automatically allocate and/or configure the computing resources on the at least one cloud provider and/or at least one data center. As such, computing resources can be automatically provisioned using a generic graphical user interface and without a user having skills or credentials specific to each cloud provider and/or data center.

27 Claims, 35 Drawing Sheets

(56) References Cited

U.S. PATENT DOCUMENTS

| | | | |
|---|---|---|---|
| 2008/0080552 A1 | 4/2008 | Gates et al. | |
| 2009/0300210 A1* | 12/2009 | Ferris | 709/235 |
| 2010/0131624 A1* | 5/2010 | Ferris | 709/221 |
| 2010/0306767 A1* | 12/2010 | Dehaan | 718/1 |
| 2012/0265884 A1* | 10/2012 | Zhang et al. | 709/226 |

OTHER PUBLICATIONS

A. Konstantinou et al: "An architecture for virtual solution composition and deployment in infrastructure clouds" Proceedings of the 3rd international workshop on Virtualization technologies in distributed computing, Jun. 15, 2009, pp. 9-17, XP002610018, DOI: http://dx.doi.org/10.1145/1555336.1555339 Retrieved from the Internet: URL: http://delivery.acm.org/10.1145/1560000/1555339/p9-konstantinou.pdf?key1=1555339&key2=058048921&coll=DL&dl=ACM&CFID=111005859&CFTOKEN=66777387.

B. Rochwerger et al: "The reservoir model and architecture for open federated cloud computing", IBM Journal of Research and Development, vol. 53, No. 4 Jul. 2009, pp. 1-11, XP002610063, Retrieved from the Internet: URL: http://62.149.240.97/uploads/Publications/The%20RESERVOIR%20Model%20and%20Architecture%20for%20Open%20Federated%20Cloud%20Computing.pdf [retrieved on Nov. 16, 2010] the whole document.

Christian Vecciola et al: "Multi-Objective Problem Solving With Offspring on Enterprise Clouds", Jan. 1, 2009, [Online] Mar. 3-5, 2009, pp. 1-8, XP007915869, Retrieved from the Internet: URL: http://www.buyya.com/papers/MultiObjectivePSE-Cloud-HPCAsia2009.pdf> [retrieved on Nov. 22, 2010] graphical user interface to select cloud resources; p. 4, left-hand column, line 2—p. 6, left-hand column, line 23; figure 3.

Maheswaran M et al: "MetaGrid: a scalable framework for wide-area service deployment and management", High Performance Computing Systems and Applications, 2002. Proceedings. 16th Annual International Symposium on Jun. 16-19, 2002, Piscataway, NJ, USA, IEEE, Jun. 16, 2002, pp. 57-64, XP010592687, ISBN: 978-0-7695-1626-4 the whole document.

Nurmi D et al: "The Eucalyptus Open-Source Cloud-Computing System", Cluster Computing and the Grid, 2009. CCGRID '09. PTH IEEE/ACM International Symposium on, IEEE, Piscataway, NJ, USA, May 18, 2009, pp. 124-131, XP031473033, ISBN: 978-1-4244-3935-5 p. 126, left-hand column, line 31—p. 130, left-hand column, line 2.

C. Vecchiola et al: "Aneka: A Software Platform for .NET-based Cloud Computing", GRIDS-TR-2009-4, May 25, 2009, pp. 1-30, XP002611917, Grid Computing and Distributed Systems Laboratory, The University of Melbourne, Australia Retrieved from the Internet: URL: http://www.buyya.com/gridbus/reports/AnekaCloudPlatform2009.pdf [retrieved on Nov. 18, 2010] the whole document.

Elmroth E et al: "Accounting and Billing for Federated Cloud Infrastructures", Grid and Cooperative Computing, 2009. GCC '09. Eighth International Conference on, IEEE, Piscataway, NJ, USA, Aug. 27, 2009, pp. 268-275, XP031542055, ISBN: 978-0-7695-3766-5 p. 270, right-hand column, line 10—p. 271, left-hand column, line 45.

Multi-Cloud Engine Cloud Computing Management Platform by RightScale http://www.rightscale.com/products/features/mulit-cloud-engine.php pp. 2-5 Copyright 2009 RightScales, Inc.

Unibus: A Contrarian Approach to Grid Computing, Kurzyniec, et al. Department of Math and Computer Science, Emory University. pp. 1-25.

Multi-Cloud Engine Cloud Computing Management Platform by RightScale http://www.rightscale.com/products/features/mulit-cloud-engine.php pp. 2-5 Copyright 2009 RightScales, Inc Needs Date.

RightScale Dashboard User Guide, [retrieved on Jun. 13, 2013) Retrieved from internet URL: http://web.archive.org/web/20090618012656/http:/support.rightscale.com/12-Guides/01-RightScale_Dashboard_User_Guide published on Jun. 18, 2009 as per Wayback Engine.

Instances, [retrieved on Jun. 13, 2013] Retrieved from internet URL: http://web.archive.org/web/20090619105620/http:/support.rightscale.com/12-Guides/01-RightScale_Dashboard_User_Guide/02-Clouds/01-EC2/01—Instances published on Jun. 19, 2009 as per Wayback Engine.

Create a FlexiScale ServerTemplate, [retrieved on Jun. 13, 2013] Retrieved from internet URL: http://web.archive.org/ web/20090617005139/http:/support.rightscale.com/1._Tutorials/03-FlexiScale/01- Create_a_$_L$ $_{FlexiScale}$_Server_Template published on Jun. 17, 2009 as per Wayback Engine.

Add a FlexiScale Server to a Deployment, [retrieved on Jun. 13, 2013] Retrieved from internet URL: http://web.archive.org/web/20090620130908/http:/support.rightscale:com/1._Tutorials/03-FlexiScale/02-Add_a_FlexiScale_Server_to_a_Deployment published on Jun. 20, 2009 as per Wayback Engine.

Provision (Build) a FlexiScale Server, [retrieved on Jun. 13, 2013] Retrieved from internet URL: http://web.archive.org/web/20090617005144/http:/support.rightscale.com/1._Tutorials/03-FlexiScale/03-Provision_(Build)_a_FlexiScale_Server published on Jun. 17, 2009 as per Wayback Engine.

Add a GoGrid Server to a Deployment, [retrieved on Jun. 13, 2013] Retrieved from internet URL: http://web.archive.org/web/20090620130914/http:/support.rightscale.com/1._Tutorials/04-GoGrid/ Add_a_GoGrid_Server_to_a_Deployment published on Jun. 20, 2009 as per Wayback Engine.

Cloud Management Environment, [retrieved on Jun. 13, 2013] Retrieved from internet URL: http://web.archive.org/web/20090624233747/http:/www.rightscale.com/products/features/cloud-management-environment.php published on Jun. 24, 2009 as per Wayback Engine.

Account, [retrieved on Nov. 21, 2014] Retrieved from internet URL: http://web.archive.org/web/20090619002617/http:/support.rightscale.com/12-Guides/01-RightScale_Dashboard_User_Guide/05-Settings/02-Account published on Jun. 19, 2009 as per Wayback Engine.

User, [retrieved on Nov. 21, 2014] Retrieved from internet <URL: http://web.archive.org/web/20090710093103 1http:/support.rightscale.com/2._References/01-RightScale/01-RightScale_Dashboard/01- RightScale_Dashboard_User_Guide/05-Settings/01-User published on Jul. 2009 as per Wayback Engine.

Australian Office Action issued in Application No. 2014201374 on Nov. 25, 2014, 6 pages.

* cited by examiner

600

Provide Dev/Test environments for Software Development Lifecycle
This service manages the deployment, maintenance, and support of Dev/Test environments.

The user may configure a pre-defined environment from our library, or specify a custom environment.
The environment deployment may be scheduled for either the data center or a cloud provider.
These environments may be used to support the design, build, test, and deploy phases.

The user may also procure environment maintenance and IT support services.
Maintenance services include environment backup, archive, rebundling, refresh, deletion, patch, migration.

Specify project information

Project Name      [ATL Demo]
   Expected Start    [1-Dec-09]
   Expected Finish   [1-Jun-10] }— 610

Provide the following Dev/Test environments for the project

Current Environments:   ATL Demo Windows Development Environment
                              ATL Demo Java Build Accelator

*Select One*

☐ Create New      Provision new Dev/Test environment

☐ Update Existing  Update the settings for an existing Dev/Test environment

*Indicate selections*

622 —

☐ IT Support      Provides project specific IT support
                              Choose one among support via email or live phone options
                              Select between business hours or 24 x 7 x 365 support }— 620
                              Guaranteed turn-around for urgent issues

624 —

☐ Budget Tracking  Set and track limits on project spend for Dev/Test environments
                              User sets total and month-to-month budget limits

Backup

Schedule regular backups for created environments
Backup machine images and data stores
Rolling number of snapshots

| | |
|---|---|
| Backup Target | Image |
| *Select Image* | Present a selectable list of images or volumes |
| | am:1 |
| | am:2 |
| Frequency | Weekly |
| Schedule duration | Project duration |
| Start | 1-Dec-09 |
| Stop | 1-Jun-10 |

⎱ 1010

Rebundle

Rebundle image or environment

| | |
|---|---|
| Select Instance | Present list of instance names |
| | am:1 |
| | am:2 |
| Target Name | |

⎱ 1020

Refresh

Restore an image from backup or archive

| | |
|---|---|
| Select Target | Image, volume |
| Select snapshot | Present a list of snapshots with timestamps |

⎱ 1030

Delete

Delete existing Dev/Test environment

Please archive environment elements wish to save
Any items you have not saved will not be recoverable after deletion.

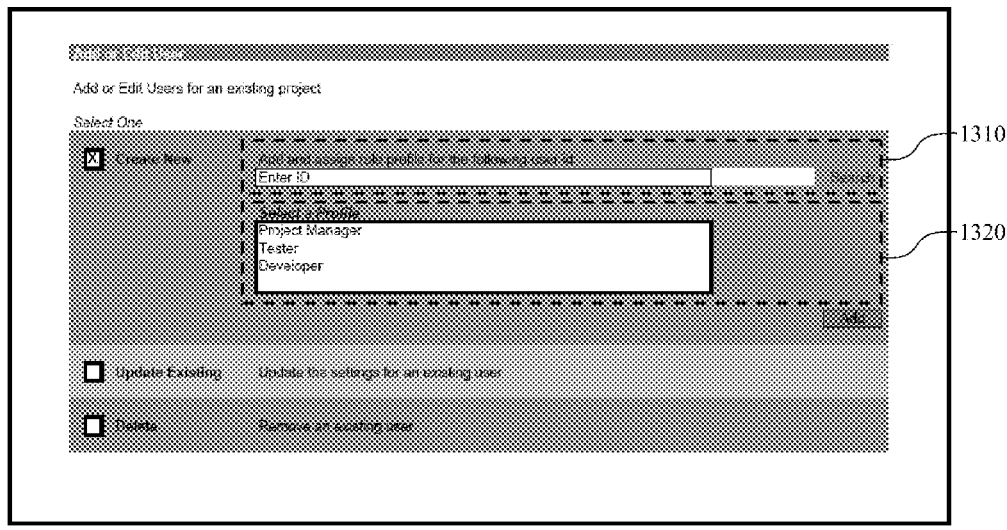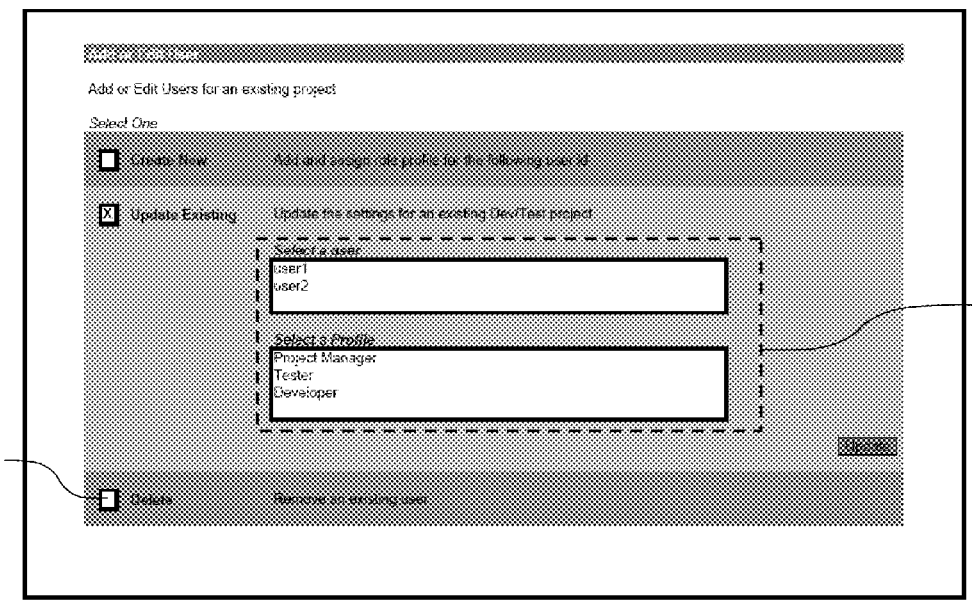
FIGURE 13

PROVISIONER WITHIN CLOUD CONSOLE—DEFINING IMAGES OF AN ENTERPRISE TO BE OPERABLE ON DIFFERENT CLOUD COMPUTING PROVIDERS

RELATED APPLICATIONS

The present application claims the benefit of U.S. Provisional Patent Application No. 61/238,617, filed Aug. 31, 2009, entitled "CLOUD CONSOLE DESCRIPTION," naming Teresa Tung and Owen Richter as inventors. That application is incorporated herein by reference in its entirety and for all purposes.

This application is related to U.S. patent application Ser. No. 12/642,635 filed Dec. 18, 2009, and U.S. patent application Ser. No. 12/642,656 filed Dec. 18, 2009, both of which are incorporated herein by reference.

BACKGROUND OF THE INVENTION

Cloud computing typically involves using remote computing resources on a pay-per-use basis, where the remote computing resources may be used alone or in conjunction with internal computing resources of a "data center." For example, processing resources and storage resources of a cloud provider, such as Amazon Web Services, Microsoft Azure, Go Grid or Rackspace Cloud Servers, can be requested and used on-demand in a scalable fashion. As such, cloud computing can be used for applications with varying or unpredictable demand like year-end financials or tax-return preparation. Additionally, computationally-intensive processing, such as Monte Carlo simulations or protein folding, can be performed using cloud computing resources.

Given the variation among products and services offered by cloud providers, it is often desirable to setup a project with computing resources sourced from various cloud providers and/or data centers. Additionally, it may be desirable to change the sourcing of the computing resources for a project as the products or services offered by a cloud provider or data center are updated. However, each cloud provider requires a different set of skills and credentials to provision (e.g., to define, make ready for use, setup, etc.), use and manage respective computing resources. Accordingly, it is difficult and time consuming to provision, use and manage computing resources across multiple cloud providers and/or data centers.

Additionally, conventional approaches to cloud computing limit sharing of resources between users. For example, most cloud providers limit each account to a single user identifier (e.g., an email address) and restrict the sharing of resources between multiple accounts. As such, it is typically difficult, insecure, or impossible to share computing resources among multiple users.

It is also difficult to monitor or track the usage of computing resources using conventional approaches to cloud computing. For example, each cloud provider reports back different types or amounts of usage data, and therefore, monitoring usage of computing resources across multiple cloud providers is difficult. The monitoring of usage data is made even more difficult where each account is limited to a single user and/or a single project, and therefore, multiple accounts exist to enable multiple users to access computing resources and/or to enable work on multiple projects. Further, where multiple users share one account to enable sharing of resources between the users, or where a single account is used for multiple projects, monitoring of usage data on a per-user basis or per-project basis is impossible since the cloud provider is unaware of the multiple users and/or multiple projects and only reports usage data for the single account as a whole.

SUMMARY OF THE INVENTION

Accordingly, a need exists to more easily provision, use and manage computing resources across multiple cloud providers and/or data centers. A need also exists to share cloud computing resources among multiple users. Additionally, a need exists to monitor and/or track the usage of cloud computing resources across multiple cloud providers and/or data centers. Further, a need exists to monitor and/or track the usage of cloud computing resources on a per-user basis and/or a per-project basis. Embodiments of the present invention provide novel solutions to these needs and others as described below.

Embodiments of the present invention are directed to a method, computer-readable medium, and system for provisioning computing resources across multiple cloud providers and/or data centers. In one embodiment, a graphical user interface is used to select a plurality of computing resources (e.g., at least one processing resource, at least one storage resource, at least one network resource, at least one operating system, at least one software application, at least one software application configuration, state data, another type of data, some combination thereof, etc.) and at least one cloud provider and/or at least one data center for providing the plurality of computing resources. Scripts associated with the at least one cloud provider and/or at least one data center are accessed, where each script is capable of automatically setting up a computing resource on an associated cloud provider or associated data center. The scripts are then used to automatically allocate and/or configure the computing resources on the at least one cloud provider and/or at least one data center. The provisioned computing resources create an environment which may include one or more virtual machines. As such, computing resources can be automatically provisioned using a generic graphical user interface and without a user having skills or credentials specific to each cloud provider and/or data center.

The graphical user interface may also be used to manage user accounts associated with the provisioned computing resources. For example, one or more users may be associated with the provisioned computing resources. Additionally, the graphical user interface may be used to assign a permission level to the user, where the permission level defines which operations (e.g., creation, deletion, updating, using, etc.) a user may perform on a component (e.g., an image, an instance, a file system, storage, a static IP address, etc.) associated with the provisioned computing resources. Further, the graphical user interface may be used to associate multiple users with a cloud provider account, and therefore, multiple users may share computing resources provisioned across multiple cloud providers and/or data centers.

In one embodiment, a method of provisioning a plurality of computing resources includes accessing a user selection of the plurality of computing resources and of a plurality of cloud providers operable to implement the plurality of computing resources, wherein the user selection is input via a graphical user interface generic to the plurality of cloud providers. A plurality of scripts associated with the plurality of cloud providers are accessed, wherein each script of the plurality of scripts corresponds to a respective cloud provider of the plurality of cloud providers, wherein each script of the plurality of scripts is operable to allocate a computing resource on the respective cloud provider. The method also includes automatically allocating, using the plurality of scripts, the plurality of computing resources on the plurality of cloud providers.

In another embodiment, a computer-readable medium having computer-readable program code embodied therein is capable of causing a computer system to perform a method of provisioning a plurality of computing resources. In yet another embodiment, a system including a processor and a memory, wherein the memory includes instructions that when executed by the system implement a method of provisioning a plurality of computing resources.

BRIEF DESCRIPTION OF THE DRAWINGS

The present invention is illustrated by way of example, and not by way of limitation, in the figures of the accompanying drawings and in which like reference numerals refer to similar elements.

FIG. 6 shows an exemplary on-screen graphical user interface for selecting a cloud computing environment to create or modify in accordance with one embodiment of the present invention.

FIG. 7 shows a first portion of an exemplary on-screen graphical user interface for configuring a cloud computing environment in accordance with one embodiment of the present invention.

FIG. 10 shows an exemplary on-screen graphical user interface for configuring options associated with a cloud computing environment in accordance with one embodiment of the present invention.

FIG. 13 shows an exemplary on-screen graphical user interface for associating a user with a cloud computing environment in accordance with one embodiment of the present invention.

DETAILED DESCRIPTION OF THE INVENTION

Figure 1:
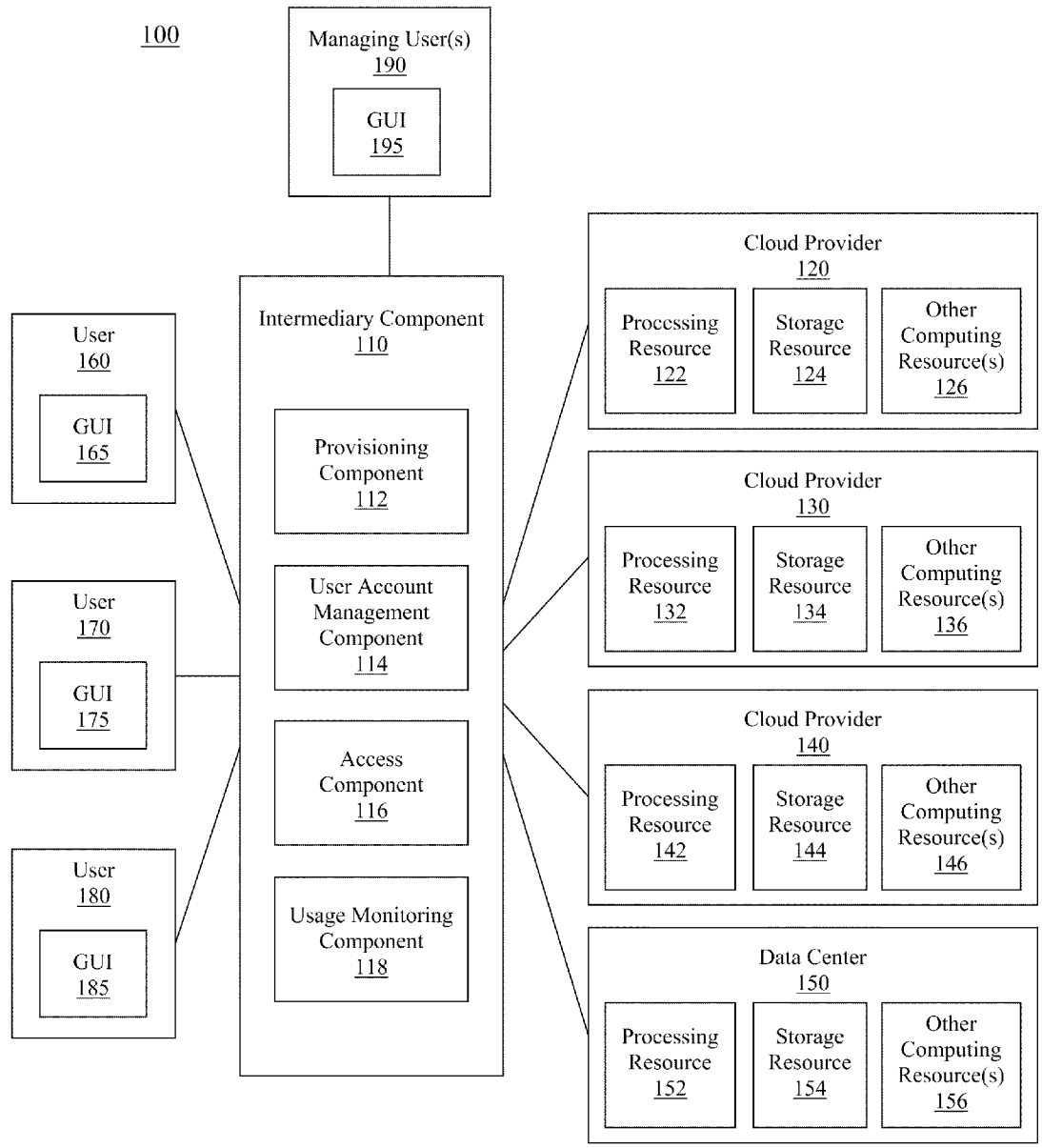
FIG. 1 shows an exemplary system for creating, using and managing a cloud computing environment in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "allocating," "analyzing," "applying," "assembling," "assigning," "balancing," "blocking," "calculating," "capturing," "combining," "comparing," "collecting," "communicating," "configuring," "creating," "debugging," "defining," "delivering," "depicting," "detecting," "determining," "displaying," "downloading," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "providing," "provisioning," "querying," "removing," "rendering," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for creating, using and monitoring usage of a cloud computing environment in accordance with one embodiment of the present invention. As shown in FIG. 1, intermediary component 110 may be used to create, use and monitor usage of a cloud computing environment (e.g., 200 of FIG. 2) which includes one or more computing resources of a cloud provider (e.g., 120, 130, 140, etc.) and/or one or more computing resources of a data center (e.g., 150). Each cloud provider (e.g., 120, 130, 140, etc.) may include respective computing resources such as a processing resource (e.g., 122, 132, 142, etc.), a storage resource (e.g., 124, 134, 144, etc.), other computing resources (e.g., 126, 136, 146, etc.), etc. Additionally, data center 150 may include a processing resource (e.g., 152), a storage resource (e.g., 154), other computing resources (e.g., 156), etc. In one embodiment, computing resources of a cloud provider may be remote or external computing resources (e.g., located separately from or owned by a different entity than other components of system 100), while computing resources of a data center (e.g., 150) may be internal computing resources (e.g., located together with or owned by the same entity as users 160-180, at least one managing user 190, data center 150, intermediary component 110, some combination thereof, etc.).

In one embodiment, the at least one other computing resource of a cloud provider (e.g., 126, 136, 146, etc.) and/or the at least one other computing resource of a data center (e.g., 156) may include at least one network resource (e.g., a static IP address, etc.), at least one operating system, at least one software application, at least one software application configuration (e.g., for configuring a software application to perform a particular function such as configuring a browser to navigate to a particular page when launched, etc.), or some combination thereof. The at least one other computing resource of a cloud provider (e.g., 126, 136, 146, etc.) and/or the other computing resources of a data center (e.g., 156) may include state data (e.g., for implementing a particular state of a software application, an operating system, etc.). And in one embodiment, the at least one other computing resource of a cloud provider (e.g., 126, 136, 146, etc.) and/or the other computing resources of a data center (e.g., 156) may include another type of data (e.g., a file system including files or documents accessed by a user of the cloud computing environment, a database, etc.).

Figure 3:
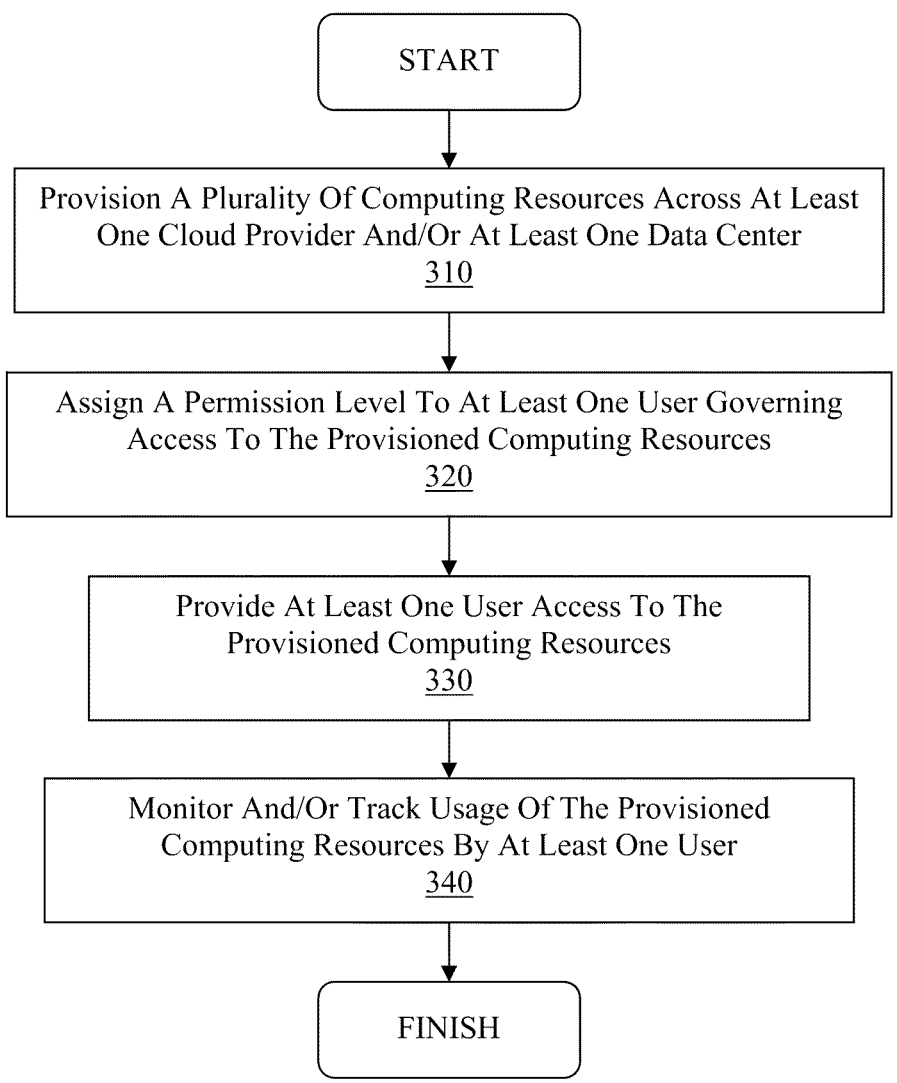
FIG. 3 shows a flowchart of an exemplary process for creating, using and managing a cloud computing environment in accordance with one embodiment of the present invention.

Provisioning component 112 may be used to provision a plurality of computing resources across at least one cloud provider and/or at least one data center (e.g., in accordance with step 310 of FIG. 3 and as described with respect to FIGS. 4 through 12 and FIG. 15 herein). For example, at least one managing user (e.g., 190) may interact with a graphical user interface (e.g., GUI 195) to provision computing resources and set up a cloud computing environment (e.g., 200) with at least one virtual machine image (e.g., 210, 220, 230, etc.) for use by one or more users (e.g., 160, 170, 180, 190, etc.). Provisioning component 112 may automatically access one or more scripts for automatically allocating the computing resources requested using GUI 195 on the appropriate cloud provider (e.g., 120, 130, 140, etc.) and/or data center (e.g., 150). In one embodiment, GUI 195 may be displayed using a web browser, where data used to display GUI 195 may be accessed and/or generated by provisioning component 112 and communicated over the internet to at least one managing user 190. Accordingly, a user may automatically provision computing resources across at least one cloud provider and/or at least one data center (e.g., using GUI 195) using a generic GUI without skills or credentials specific to the at least one cloud provider and/or at least one data center.

In one embodiment, the at least one cloud provider and/or at least one data center which computing resources are provisioned across (e.g., using provisioning component 112) may utilize at least two different technologies or virtual machine representations for implementing one or more virtual machines. For example, cloud provider 120 may utilize a virtual machine representation from VMWare to provide computing resources for the cloud computing environment (e.g., 200 of FIG. 2), while cloud provider 130 may utilize an open source virtual machine representation such as Xen to provide computing resources for the cloud computing environment (e.g., 200 of FIG. 2). Accordingly, computing resources may be automatically provisioned across at least one cloud provider and/or at least one data center (e.g., using GUI 195) which utilize at least two different technologies or virtual machine representations for implementing a virtual machine.

Figure 2:
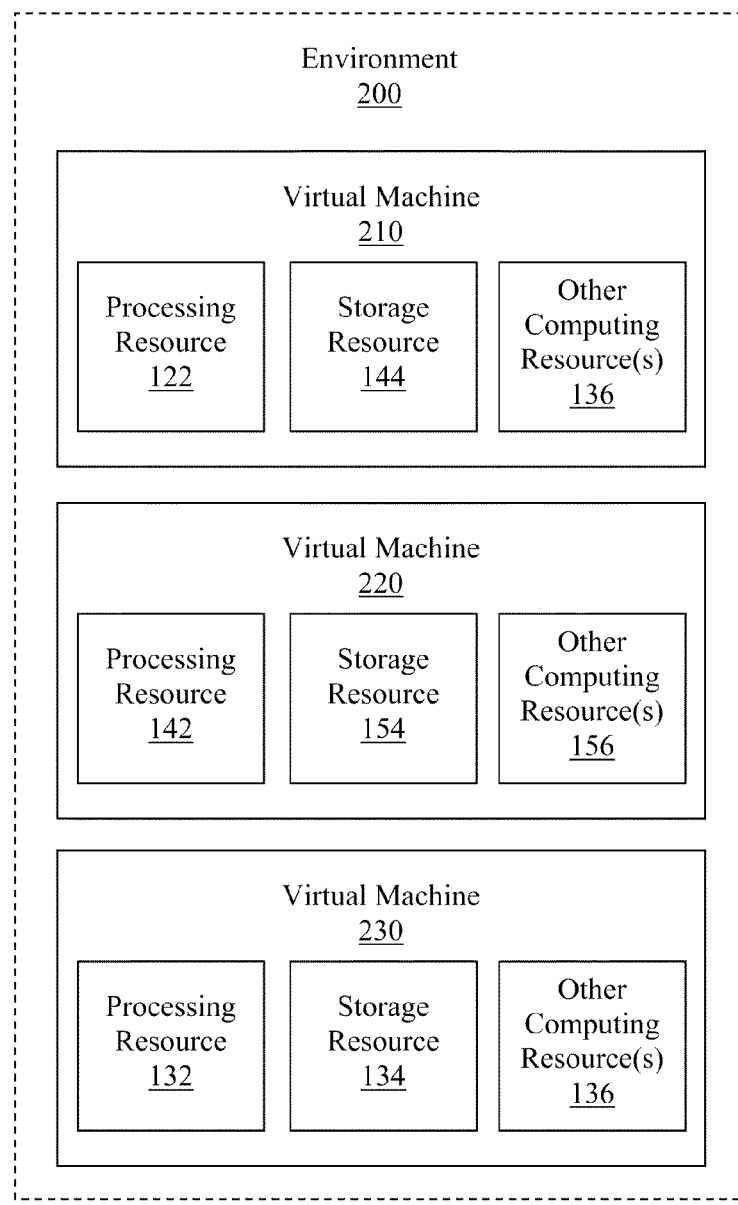
FIG. 2 shows an exemplary cloud computing environment in accordance with one embodiment of the present invention.

Turning to FIG. 2, each virtual machine of environment 200 may include computing resources from at least one cloud provider, at least one data center, or some combination thereof. For example, virtual machine 210 includes processing resource 122 from cloud provider 120, storage resource 144 from cloud provider 140, and at least one other computing resource 136 from cloud provider 130, whereas virtual machine 220 includes processing resource 142 from cloud provider 140, storage resource 154 from data center 150, and at least one other computing resource 156 from data center 150. As another example, virtual machine 230 includes computing resources (e.g., processing resource 132, storage resource 134, and at least one other computing resource 136) from the same cloud provider (e.g., 130).

The virtual machines (e.g., 210, 220, 230, etc.) of environment 200 may perform different functions. For example, environment 200 may implement a web server by provisioning virtual machine 210 to implement a web portal, provisioning virtual machine 220 to implement a middle tier, and provisioning virtual machine 230 to implement a database. Alternatively, the virtual machines (e.g., 210, 220, 230, etc.) of environment 200 may perform the same function to implement batch processing, parallel processing, etc. In other embodiments, the virtual machines of environment 200 may perform different functions and/or implement different types of components.

Additionally, in one embodiment, one or more of the virtual machines (e.g., 210, 220, 230, etc.) of environment 200 may be pre-configured virtual machines. For example, one or more of the virtual machines (e.g., 210, 220, 230, etc.) of environment 200 may include an image which is pre-loaded with software, settings, etc. As another example, one or more of the virtual machines (e.g., 210, 220, 230, etc.) of environment 200 may include a storage medium with a pre-loaded data set. As yet another example, one or more of the virtual machines (e.g., 210, 220, 230, etc.) of environment 200 may include appropriate network configurations.

Figure 14:
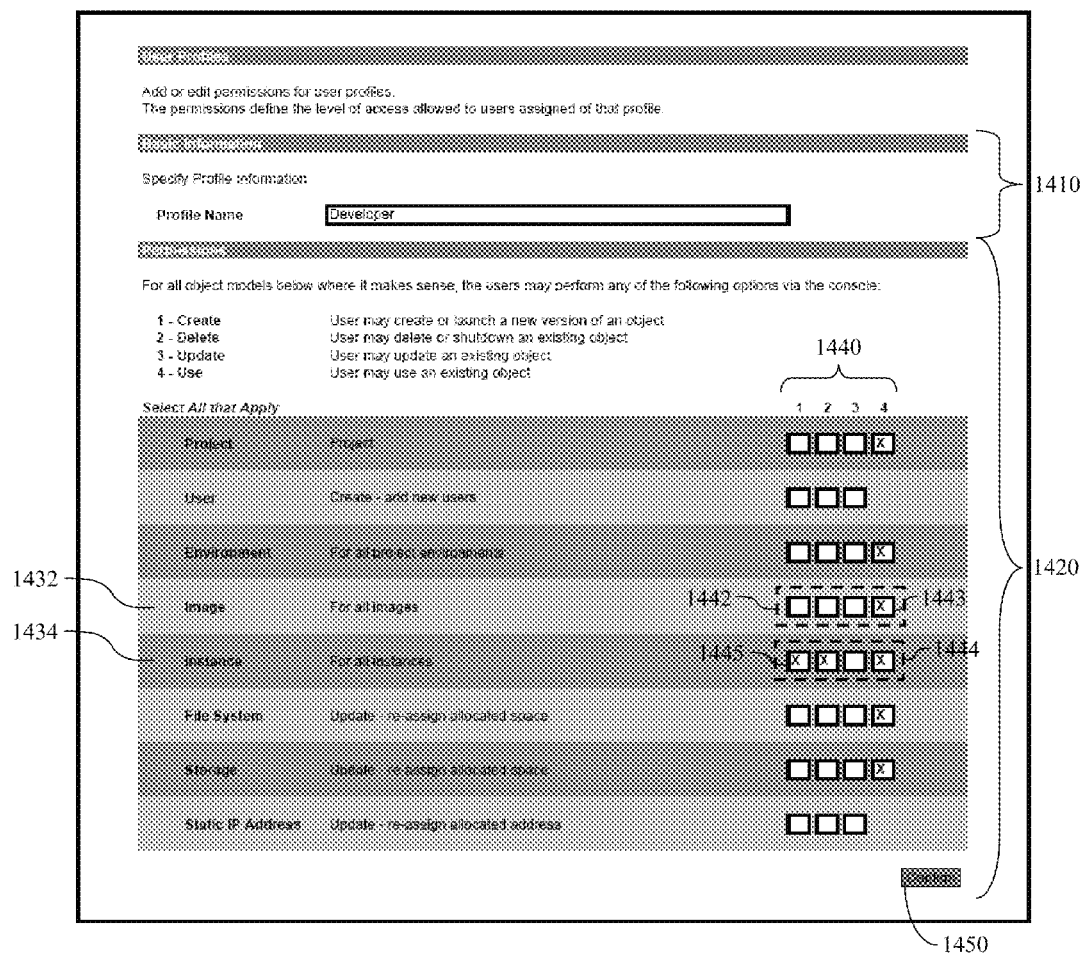
FIG. 14 shows an exemplary on-screen graphical user interface for configuring access rights associated with a user profile in accordance with one embodiment of the present invention.

Turning back to FIG. 1, user account management component 114 may be used to assign a permission level to one or more users governing access to the provisioned computing resources (e.g., in accordance with step 320 of FIG. 3 and as described with respect to FIGS. 13 and 14). For example, at least one user (e.g., 160, 170, 180, etc.) may be associated with environment 200 using component 114. Additionally, component 114 may be used to determine and assign a user profile (e.g., corresponding to a particular permission level) to each user, thereby enabling one or more managing users (e.g., 190 using GUI 195) to define which operations (e.g., creation, deletion, updating, usage, etc.) a user may perform on a component (e.g., an image, an instance, a file system, storage, a static IP address, etc.) associated with the provisioned computing resources (e.g., of environment 200). In one embodiment, an "image" as used herein may be a data representation of at least one computing resource (e.g., one or more virtual machines, one or more processing resources, one or more storage resources, one or more network resources, etc.), whereas an "instance" as used herein may be a version of an image that is running on a cloud provider and/or data center (e.g., which consumes computing resources and results in a charge). Accordingly, the rights of one or more users with respect to one or more provisioned computing resources may be assigned, limited or expanded using a GUI (e.g., 195).

Access component 116 may be used to provide at least one user access to the provisioned computing resources (e.g., in accordance with step 330 of FIG. 3 and as described with respect to FIGS. 16 to 23B herein). In one embodiment, access component 116 may regulate an authenticated user's access to the provisioned computing resources based upon a permission level assigned to the user (e.g., assigned using user account management component 114). For example, a user (e.g., 160) with a higher permission level may be provided access (e.g., via GUI 165 in communication with access component 116 of intermediary component 110) to a larger number of provisioned computing resources (e.g., computing resources corresponding to a plurality of virtual machines of a cloud computing environment), while a user (e.g., 170) with a lower permission level may be provided access (e.g., via GUI 175 in communication with access component 116 of intermediary component 110) to a smaller number of provisioned computing resources (e.g., computing resources corresponding to only one virtual machine of a cloud computing environment).

Additionally, access component 116 may be used to broker access for a plurality of users to an account held with a cloud provider and/or data center (e.g., acting as a proxy between the users and at least one cloud provider and/or at least one data center). In this manner, the cloud provider and/or data center may "see" the intermediary component as the only user of the account, and therefore, may be unaware of the multiple users. Accordingly, multiple users may share the provisioned computing resources even where the computing resources are provisioned on a cloud provider or data center which allows only one user per account.

Each user or group of users may be provided access to the provisioned computing resources using a respective GUI (e.g., GUI 165, 175, 185, etc.), where each of the respective GUIs enables logging into an instance (e.g., associated with one or more virtual machines of a cloud computing environment), launching and/or configuring of an instance (e.g., associated with one or more virtual machines of a cloud computing environment), saving (e.g., rebundling, creating a snapshot of, etc.) an image (e.g., associated with one or more virtual machines of a cloud computing environment), reversion to a previously-saved image (e.g., associated with one or more virtual machines of a cloud computing environment), restarting of an instance (e.g., associated with one or more virtual machines of a cloud computing environment), sharing of an instance (e.g., associated with one or more virtual machines of a cloud computing environment), deleting an image (e.g., associated with one or more virtual machines of a cloud computing environment), creating an image (e.g., associated with one or more virtual machines of a cloud computing environment), copying of an image (e.g., associated with one or more virtual machines of a cloud computing environment), some combination thereof, etc. Certain users may be provided greater access to provisioned computing resources than other users (e.g., as determined by a respective permission level assigned to each user). In one embodiment, each of the GUIs (e.g., 165, 175, 185, etc.) may be displayed using a web browser, where data used to display each GUI may be accessed and/or generated by access component 116 and communicated over the internet to each user (e.g., 160, 170, 180, 190, etc.).

As shown in FIG. 1, usage monitoring component 118 may be used to monitor usage of the provisioned computing resources (e.g., in accordance with step 340 of FIG. 3 and as described with respect to FIGS. 24 to 32 herein). For example, usage monitoring component 118 may generate usage data for the provisioned computing resources based on events (e.g., accessed from access component 116, from the cloud providers, from the data centers, some combination thereof, etc.) associated with the plurality of computing resources. The usage data may include historical data associated with previous usage of the plurality of computing resources (e.g., usage for previous days, weeks, months, years, etc.). Accordingly, the usage of computing resources, which are provisioned across at least one cloud provider and/or at least one data center, may be monitored. Further, information identifying a user and/or group of computing resources associated with each event (e.g., communicated from provisioning component 112, user account management component 114, access component 116, some combination thereof, etc.) may be used to organize the usage data into respective portions corresponding to each user and/or each group of computing resources (e.g., project, environment, virtual machine, some combination thereof, etc.), thereby enabling the monitoring and/or tracking by user and/or by group of computing resources (e.g., one or more projects, one or more environments, one or more virtual machines, some combination thereof, etc.) of the usage of a plurality of computing resources provisioned across at least one cloud provider and/or at least one data center.

Although FIG. 1 shows system 100 with a specific number of components (e.g., three users, three cloud providers, one data center, etc.), it should be appreciated that system 100 may include a larger or smaller number of each type of component in other embodiments. Additionally, although FIG. 1 depicts intermediary component 110 as including components 112, 114, 116 and 118, it should be appreciated that one or more of these components may be separated from the others (e.g., access component 116 may be a separate component from components 112, 114 and 118). Further, although FIG. 1 shows each cloud provider (e.g., 120, 130 and 140) and data center (e.g., 150) with a specific number and type of computing resources, it should be appreciated that each cloud provider and/or data center may include a different number and/or type of computing resources in other embodiments.

Further, although FIG. 1 depicts specific types and numbers of users (e.g., at least one managing user 190, other users 160-180, etc.), it should be appreciated that system 100 may include any number and/or types of users in other embodiments. For example, system 100 may not include a managing user in one embodiment, and thus, one or more of the other users (e.g., 160, 170, 180, etc.) may provision computing resources or otherwise perform functions of at least one managing user 190 (e.g., using one or more of their respective GUIs 165, 175, 185, etc.). Accordingly, a GUI (e.g., 165, 175, 185, etc.) of another user (e.g., 160, 170, 180, etc.) may implement the functions of the managing user's GUI (e.g., 195) in one embodiment (e.g., where managing user 190 is not present in system 100).

Additionally, although FIG. 2 shows environment 200 with 3 virtual machines (e.g., 210, 220 and 230), it should be appreciated that environment 200 may include a smaller or larger number of virtual machines in other embodiments. Additionally, although FIG. 2 shows each virtual machine with a specific number of computing resources, it should be appreciated that each virtual machine may include a larger or smaller number of computing resources in other embodiments. Further, although FIG. 2 shows each virtual machine with a specific type of computing resources, it should be appreciated that each virtual machine may include a different type of computing resources in other embodiments. For example, in one embodiment, virtual machine 210 may include only processing resources (e.g., 122) and storage resource (e.g., 144), but not include any other type of computing resource (e.g., network resources, software applications, etc.). Alternatively, virtual machine 210 may include processing resources and network resources, but not include other types of computing resources (e.g., storage resources, software applications, etc.).

Figure 4:
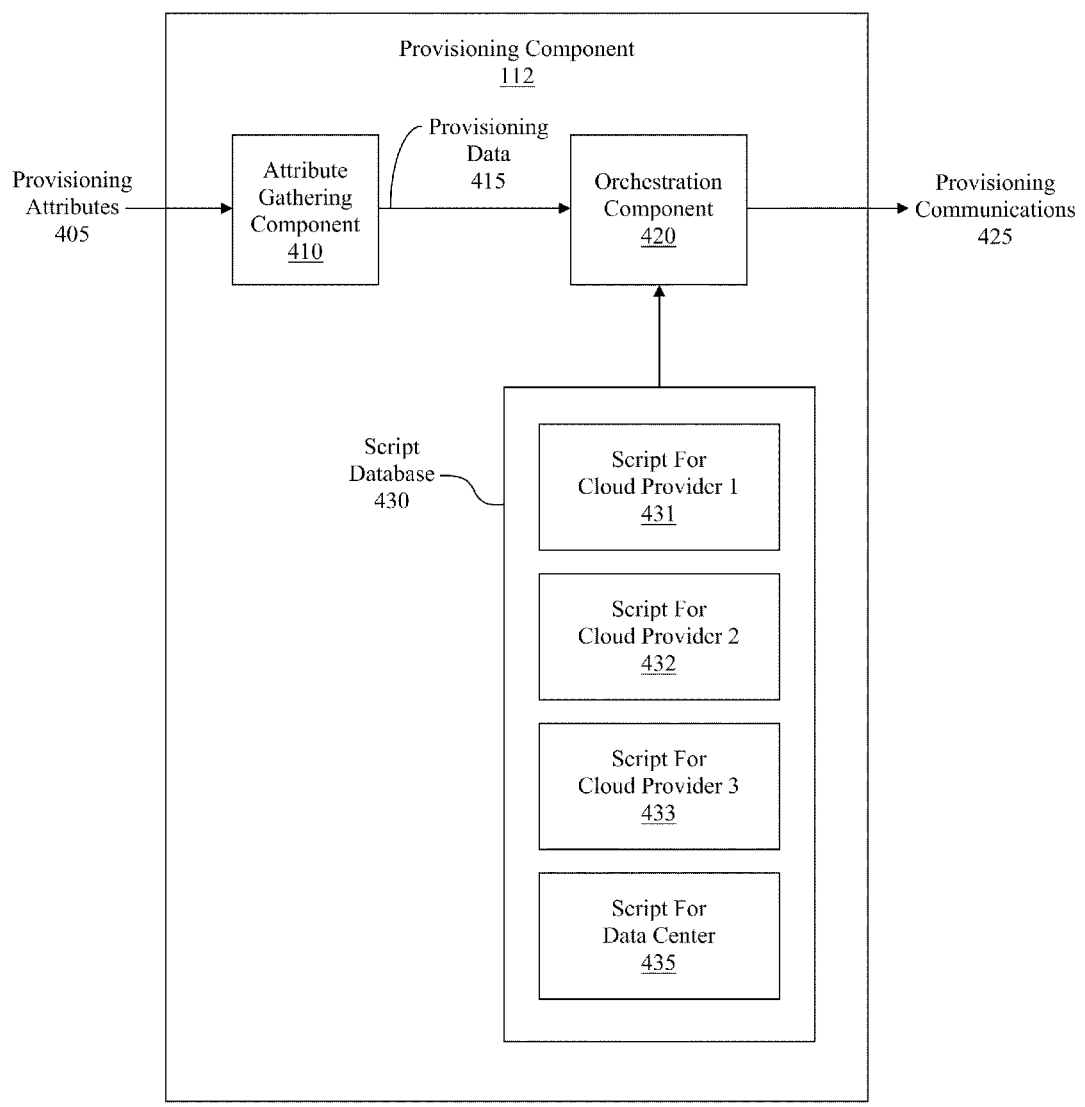
FIG. 4 shows an exemplary provisioning component for provisioning a plurality of computing resources across at least one cloud provider and/or at least one data center in accordance with one embodiment of the present invention.

Provisioning Computing Resources and User Account Management for a Cloud Computing Environment FIG. 4 shows exemplary provisioning component 112 for provisioning a plurality of computing resources across at least one cloud provider and/or at least one data center in accordance with one embodiment of the present invention. As shown in FIG. 4, provisioning component 112 may include attribute gathering component 410 and orchestration component 420, where attribute gathering component 410 may access provisioning attributes 405 and generate provisioning data 415 therefrom. Provisioning attributes 405 may include a plurality of attributes associated with a cloud computing environment (e.g., 200) such as the number of virtual machines, the type of computing resources for each virtual machine, the desired cloud provider to implement each computing resource of each virtual machine, etc. Provisioning attributes 405 may be generated by or generated based on user input to a GUI (e.g., GUI 195) for provisioning a cloud computing environment (e.g., 200). Additionally, in one embodiment, provisioning data 415 may be formatted in accordance with XML or another computing language.

Orchestration component 420 may access an appropriate script from script database 430 based on provisioning data 415, where the accessed script is used to generate provisioning communications 425 to provision computing resources across at least one cloud provider (e.g., 120, 130, 140, etc.) and/or at least one data center (e.g., 150). For example, if provisioning data 415 includes a request to provision one or more computing resources (e.g., a processing resource, a storage resource, a network resource, an operating system, a software application, a software application configuration, state data, another type of data, some combination thereof, etc.) on a cloud provider (e.g., 120, 130, 140, etc.), then orchestration component 420 may access a script (e.g., 431, 432, 433, etc.) corresponding to the cloud provider. Alternatively, if provisioning data 415 includes a request to provision one or more computing resources (e.g., a processing resource, a storage resource, a network resource, an operating system, a software application, a software application configuration, state data, another type of data, some combination thereof, etc.) on a data center (e.g., 150), then orchestration component 420 may access a script (e.g., 435) corresponding to the data center. In one embodiment, each script within script database 430 may correspond to a different cloud provider (e.g., 120, 130, 140, etc.) and/or a different data center (e.g., 150).

Accordingly, in accordance with step 310 of FIG. 3, computing resources (e.g., at least one processing resource, at least one storage resource, at least one network resource, at least one operating system, at least one software application, at least one software application configuration, state data, another type of data, some combination thereof, etc.) can be automatically provisioned across at least one cloud provider and/or at least one data center based upon user input to a GUI (e.g., 195) using provisioning component 112. Since the GUI (e.g., 195) is generic to the at least one cloud provider and/or at least one data center and since the automated provisioning utilizes scripts specific to a cloud provider and/or data center, a user need not have skills or credentials specific to each cloud provider and/or data center.

In one embodiment, the scripts (e.g., 431, 432, 433, etc.) within script database 430 may be associated with at least two different technologies or virtual machine representations for implementing one or more virtual machines. For example, script 431 may be used to provision computing resources on a cloud provider or data center which utilizes a first virtual machine representation, while script 432 may be used to provision computing resources on a cloud provider or data center which utilizes a second virtual machine representation. Accordingly, the scripts (e.g., 431, 432, 433, etc.) within script database 430 may be used automatically provision computing resources across at least one cloud provider and/or at least one data center (e.g., using GUI 195) which utilize at least two different technologies or virtual machine representations for implementing a virtual machine.

Although FIG. 4 shows a specific number of scripts within script database 430, it should be appreciated that script database 430 may include a larger or smaller number of scripts in other embodiments. Additionally, it should be appreciated that script database 430 may include different types of scripts (e.g., scripts for only cloud providers, scripts for only data centers, a different number of scripts for cloud providers and data centers, etc.) in other embodiments.

FIGS. 5 through 12 show exemplary on-screen GUIs for provisioning for provisioning a plurality of computing resources across at least one cloud provider and/or at least one data center. One or more of the GUIs depicted in FIGS. 5 through 12 may be generated by a provisioning component (e.g., 112) and used to implement a GUI (e.g., 195) of at least one managing user (e.g., 190) in one embodiment. Additionally, it should be appreciated that one or more of the GUIs depicted in FIGS. 5 through 12 may be part of the same user interface or part of at least one different user interface. Further, one or more of the GUIs depicted in FIGS. 5 through 12 may be part of a user interface which also enables assignment of a permission level to one or more users governing access to computing resources provisioned across at least one cloud provider and/or at least one data center (e.g., in accordance with FIGS. 13 and 14), access to computing resources provisioned across at least one cloud provider and/or at least one data center (e.g., in accordance with FIGS. 16 to 23B), monitoring of usage of computing resources provisioned across at least one cloud provider and/or at least one data center (e.g., in accordance with FIGS. 24 to 32), or some combination thereof.

Figure 5:
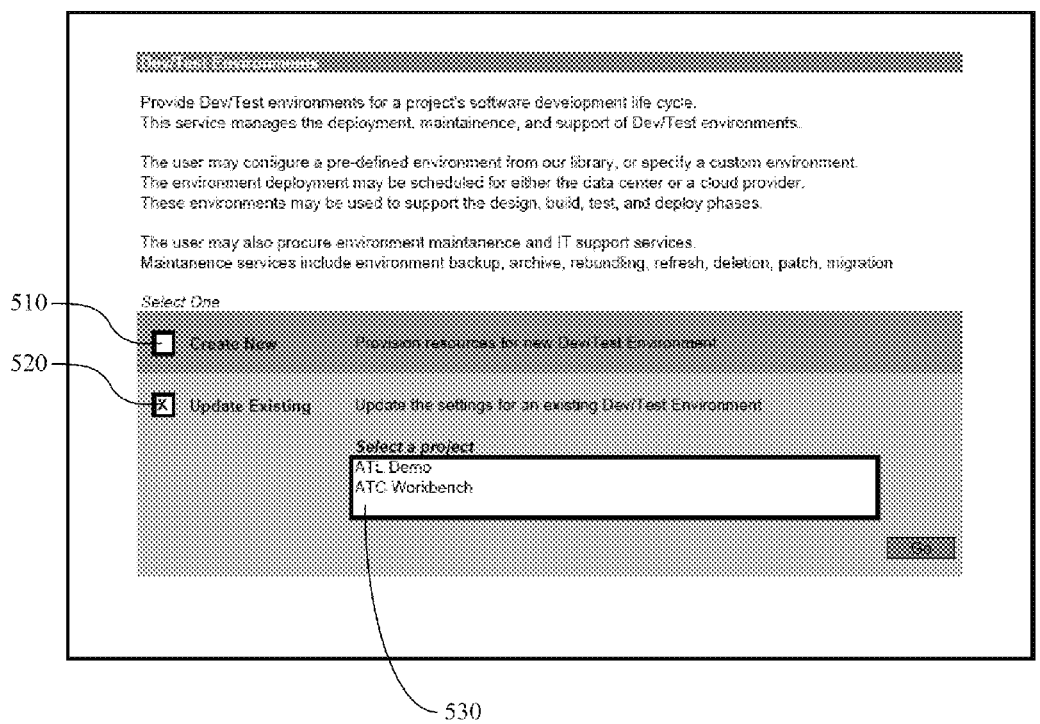
FIG. 5 shows an exemplary on-screen graphical user interface for selecting a cloud computing environment to create or modify in accordance with one embodiment of the present invention.

FIG. 5 shows exemplary on-screen graphical user interface 500 for selecting a cloud computing environment to create or modify in accordance with one embodiment of the present invention. As shown in FIG. 5, interaction with element 510 may enable a user to create a new project or cloud computing environment (e.g., 200). Alternatively, interaction with element 520 may enable a user to select an existing project or cloud computing environment (e.g., listed in region 530) to modify. In one embodiment, interaction with a portion of GUI 500 (e.g., element 510, element 520, region 530, etc.) may cause GUI 600 of FIG. 6 to be automatically displayed.

FIG. 6 shows exemplary on-screen graphical user interface 600 for selecting a cloud computing environment to create or modify in accordance with one embodiment of the present invention. As shown in FIG. 6, region 610 enables a user to enter information about a new project or cloud computing environment or change previously-entered information about an existing project or cloud computing environment. Region 620 enables a user to select optional services for the environment. For example, interaction with element 622 may enable a user to select support services such as one-on-one support via the web, one-on-one support via telephone, support available during specific hours of the day, support available during all hours of the day, etc. Interaction with element 624 may enable a user to select budget tracking options for the project or environment such as setting limits on the spending for an environment (e.g., on a month-to-month basis, on a day-to-day basis, etc.), configuring the tracking of spending for an environment, etc. In one embodiment, interaction with a portion of GUI 600 (e.g., an element of region 610, element 622, element 624, etc.) may cause GUI 700 (e.g., of FIG. 7, FIG. 8A and FIG. 9) to be automatically displayed.

Figure 7:
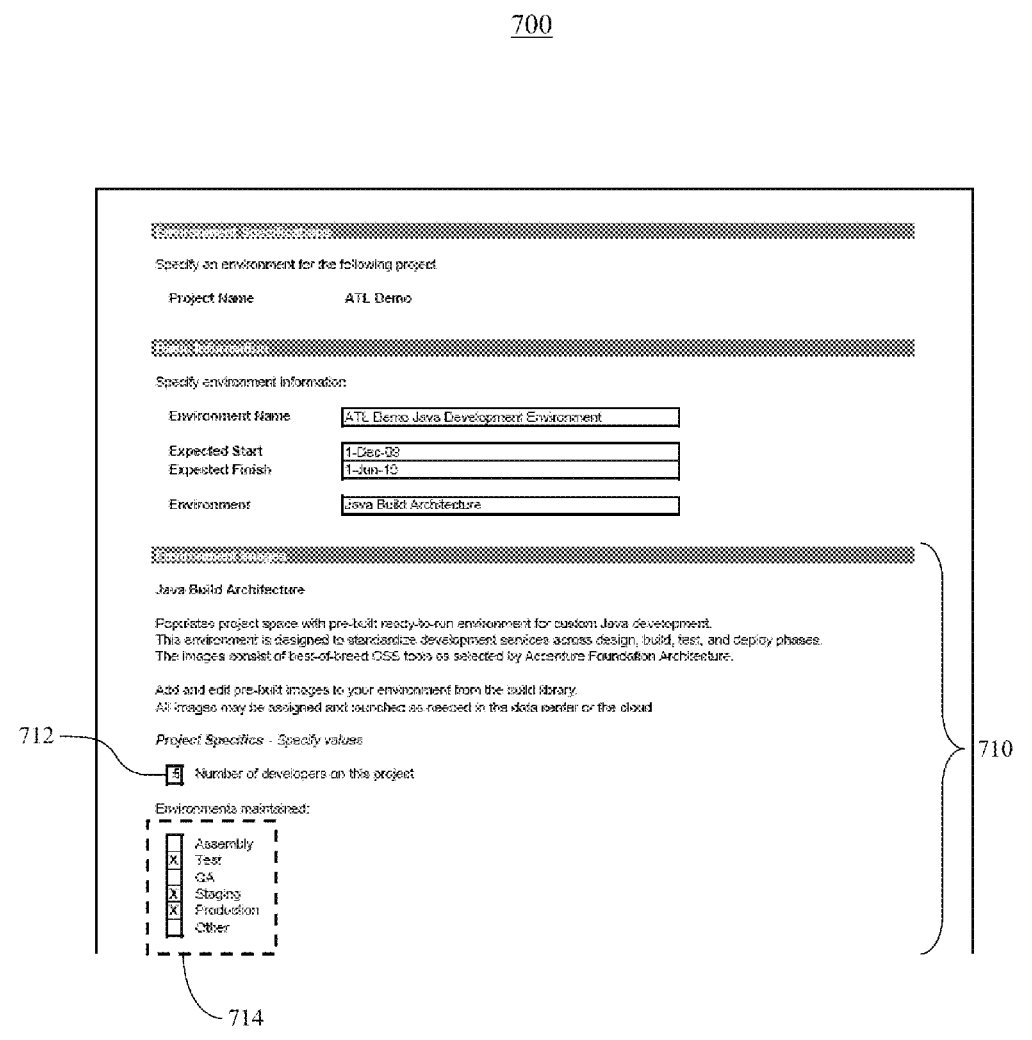
Figure 8A:
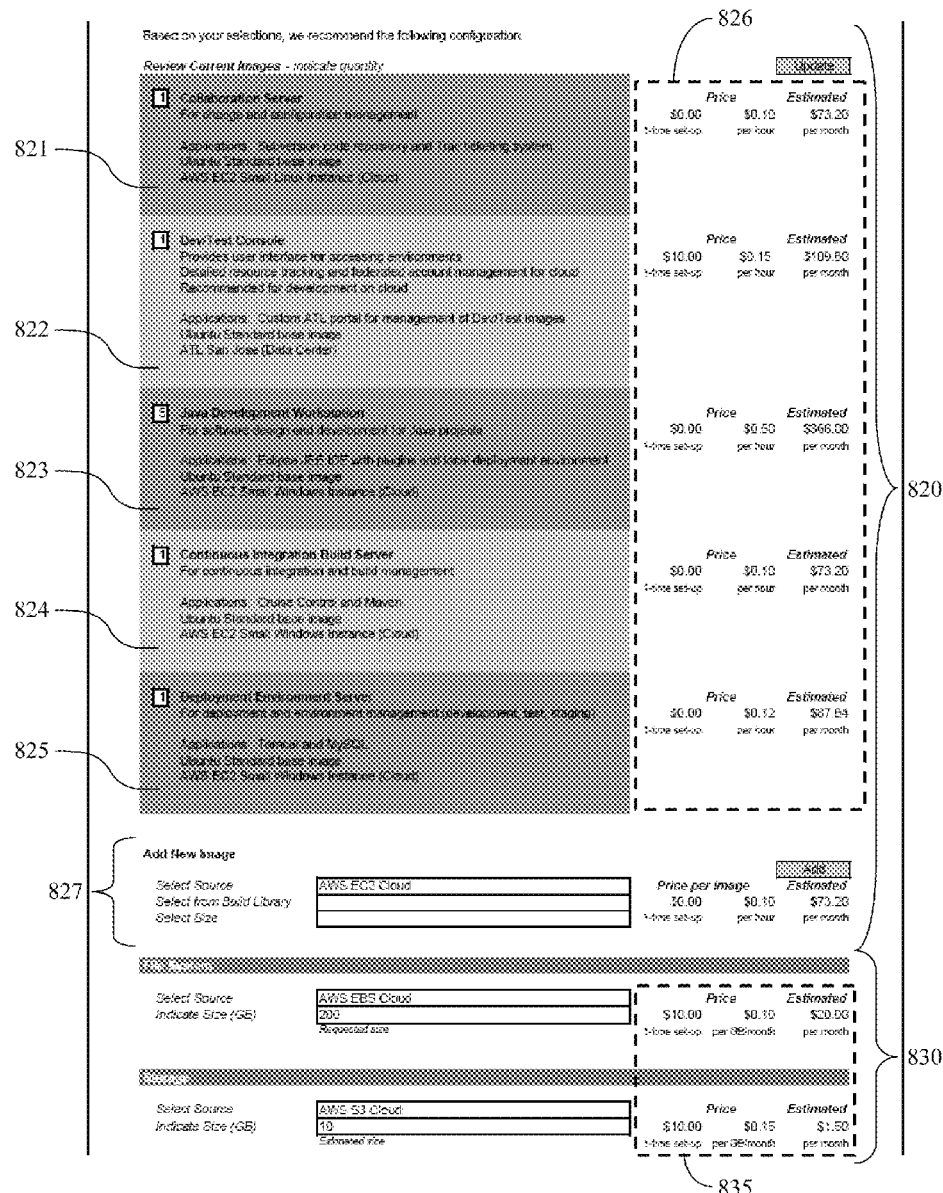
FIG. 8A shows a second portion of an exemplary on-screen graphical user interface for configuring a cloud computing environment in accordance with one embodiment of the present invention.
Figure 9:
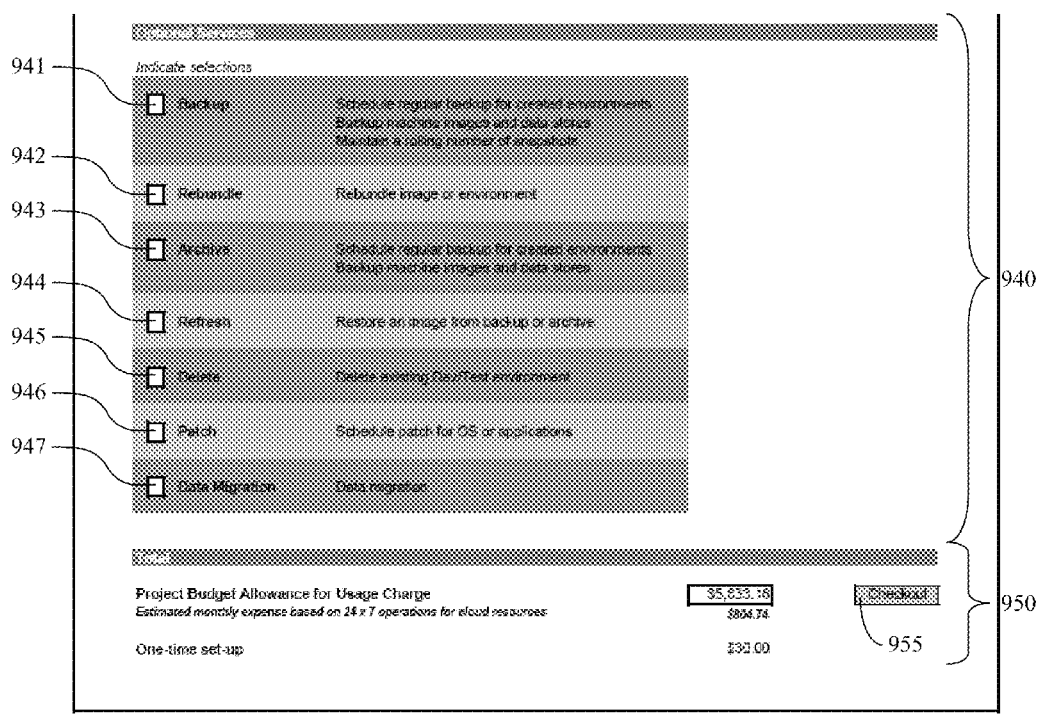
FIG. 9 shows a third portion of an exemplary on-screen graphical user interface for configuring a cloud computing environment in accordance with one embodiment of the present invention.

FIGS. 7, 8A and 9 show exemplary on-screen graphical user interface 700 for configuring a cloud computing environment in accordance with one embodiment of the present invention. As shown in FIG. 7, element 712 of region 710 enables a user to specify a number of users for the environment. Elements 714 enable a user to select attributes of the environment. For example, each of elements 714 may be associated with a different application for the environment.

As shown in FIG. 8A, region 820 enables a user to define or configure virtual machines for the cloud computing environment. For example, interaction with element 821 may enable a user to define attributes associated with a first virtual machine, where the attributes may include a number of instances of the virtual machine, a location of computing resources of the virtual machine (e.g., on a particular cloud provider, on a particular data center, etc.), a function to be performed by the virtual machine, a program or application associated with the virtual machine, etc. Similarly, interaction with elements 822-825 may enable a user to define attributes associated with other virtual machines. Region 826 shows costs (e.g., initial set-up cost, per-hour cost, estimated per-month cost, etc.) for each respective virtual machine. Additionally, region 827 enables a user to add additional virtual machines and configure the additional virtual machines (e.g., to define attributes for the additional virtual machines similar to virtual machines 821-825).

Figure 8B:
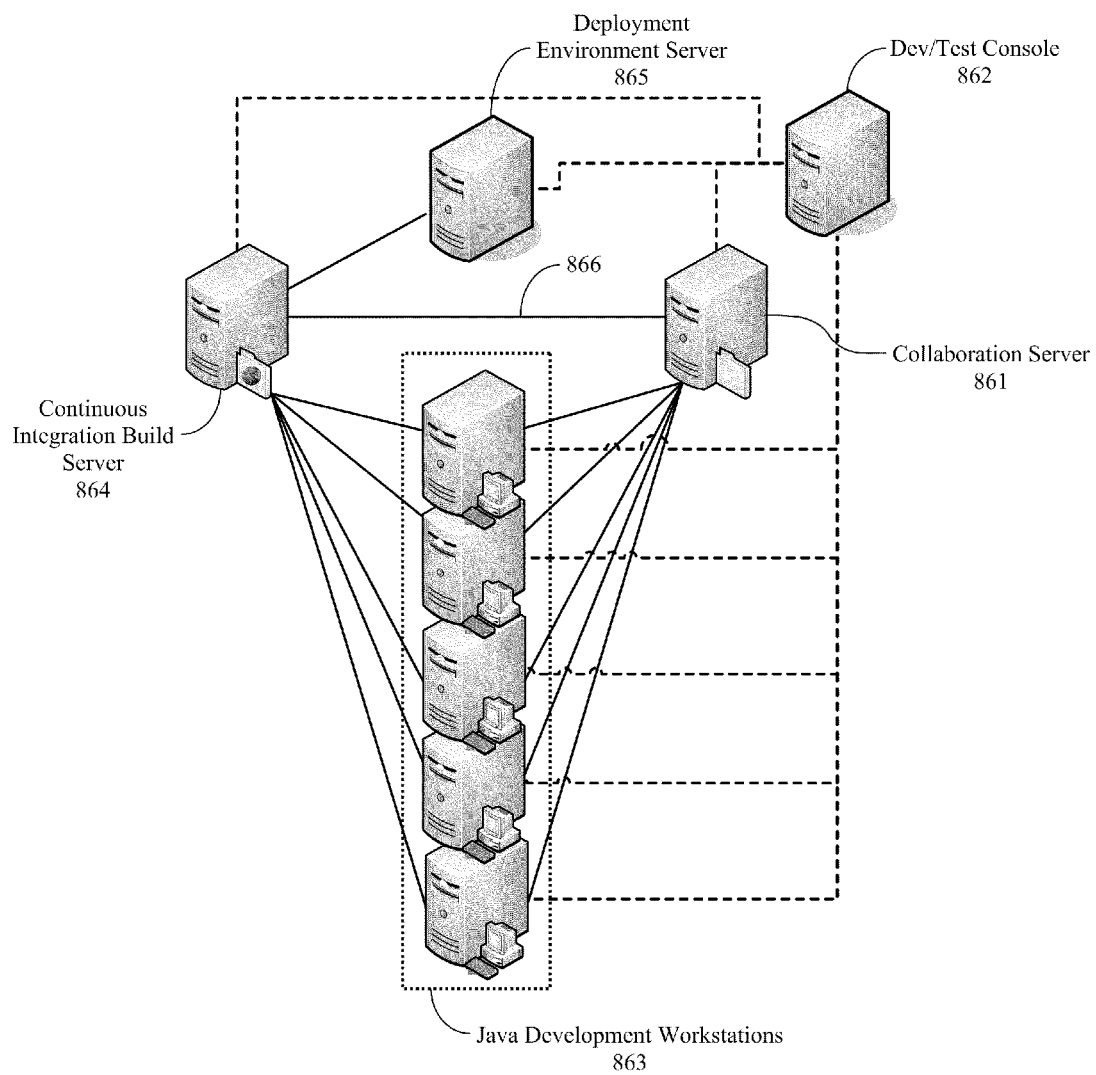
FIG. 8B shows an exemplary on-screen graphical user interface which includes a graphical representation of an environment for configuring a cloud computing environment in accordance with one embodiment of the present invention.

FIG. 8B shows exemplary on-screen graphical user interface 860 which includes a graphical representation of an environment for configuring a cloud computing environment in accordance with one embodiment of the present invention. As shown in FIG. 8B, each icon or element (e.g., 861-865) may be associated with a different set of computing resources of a cloud computing environment (e.g., 200). In one embodiment, each element (e.g., 861, 862, etc.) may be associated with a different virtual machine (e.g., 210, 220, 230, etc.) of a cloud computing environment (e.g., 200). Interaction with an element (e.g., 861, 862, etc.) may enable a user to define and/or configure the computing resources associated with selected element. Additionally, GUI 860 may display connections (e.g., element 866) between two or more elements (e.g., 861 and 864), thereby enabling a user to define and/or configure connections between the computing resources represented by the elements (e.g., 861, 862, etc.). In this manner, a user may define and/or configure a cloud computing environment using a graphical representation of the environment.

In one embodiment, a user interaction with an element of GUI 860 (e.g., moving a cursor over an element and pushing a button on a mouse) may initiate the display of information (e.g., in a pop-up window, a separate region of GUI 860, etc.) for configuration by a user. For example, interaction with an element of GUI 860 may enable a user to define attributes associated with a virtual machine, where the attributes may include a number of instances of the virtual machine, a location of computing resources of the virtual machine (e.g., on a particular cloud provider, on a particular data center, etc.), a function to be performed by the virtual machine, a program or application associated with the virtual machine, etc. GUI 860 may also enable a user to add virtual machines, re-purpose virtual machines (e.g., to perform a different function, etc.), delete virtual machines, or otherwise configure the environment.

As shown in FIG. 8B, each element (e.g., 861, 862, etc.) of GUI 860 may correspond to a respective element of region 820 of GUI 700 (e.g., as shown in FIG. 8A). For example, element 861 may correspond to element 821, element 862 may correspond to element 822, element 863 may correspond to element 823, element 864 may correspond to element 824 and element 865 may correspond to element 825. As such, in one embodiment, GUI 860 may be used to convey the same information and/or enable the same configuration of the environment as region 820 of GUI 700.

In one embodiment, GUI 860 may be displayed together with region 820 of GUI 700. Alternatively, GUI 860 may be displayed in lieu of region 820 of GUI 700.

Turning back to FIG. 8A, region 830 enables a user to define or configure other computing resources for the environment. For example, a user may define attributes associated with one or more storage resources (e.g., of the one or more of the virtual machines configured using region 820, GUI 860, etc.), where the attributes may include a number of instances of each storage resource, a location of each storage resource (e.g., on a particular cloud provider, on a particular data center, etc.), a size or capacity for each storage resource, etc.

As another example, a user may define attributes associated with one or more file systems (e.g., of the one or more of the virtual machines configured using region 820, GUI 860, etc.), where the attributes may include a number of instances of each file system, a location of each file system (e.g., on a particular cloud provider, on a particular data center, etc.), a size or capacity for each file system, etc. Additionally, region 835 shows costs (e.g., initial set-up cost, per-hour cost, estimated per-month cost, etc.) for each respective computing resource defined or configured using region 830.

In one embodiment, the information displayed in GUI 700 (e.g., region 820, region 830, etc.) and/or GUI 860 may be based on one or more of the attributes defined by a user using region 710 as shown in FIG. 7. For example, if a user specifies that 5 users will be assigned to a particular project or environment (e.g., using element 712), GUI 700 (e.g., region 820, region 830, etc.) and/or GUI 860 may be used to automatically display or suggest provisioning of computing resources (e.g., at least one processing resource, at least one storage resource, at least one network resource, at least one operating system, at least one software application, at least one software application configuration, state data, another type of data, some combination thereof, etc.) capable of implementing 5 separate workstations. As another example, if a user specifies that an environment is to be used as a test environment (e.g., using one or more of elements 714), GUI 700 (e.g., region 820, region 830, etc.) and/or GUI 860 may be used to automatically display or suggest provisioning of computing resources (e.g., at least one processing resource, at least one storage resource, at least one network resource, at least one operating system, at least one software application, at least one software application configuration, state data, another type of data, some combination thereof, etc.) capable of implementing a test environment. The suggested types of computing resources (e.g., processing resources, storage resources, network resources, operating systems, software applications, software application configurations, state data, another type of data, etc.) and/or locations of the computing resources (e.g., allocated on a particular cloud provider, a particular data center, etc.) may be based on a preferred sourcing arrangement and/or a best practice in one embodiment. Accordingly, GUI 700 and/or GUI 860 may enable more efficient provisioning of an environment by automatically suggesting at least one computing resources and/or at least one cloud provider based upon at least one user-defined attribute of the environment (e.g., entered using GUI 700, GUI 860, etc.).

As shown in FIG. 9, region 940 of GUI 700 enables a user to configure or specify options associated with the environment. For example, a user may configure options associated with the backup of the environment (e.g., by selecting or interacting with element 941), rebundling or creating a snapshot of the environment (e.g. by selecting or interacting with element 942), archiving of the environment (e.g. by selecting or interacting with element 943), refreshing of the environment (e.g. by selecting or interacting with element 944), deletion of the environment (e.g. by selecting or interacting with element 945), patching of the environment (e.g. by selecting or interacting with element 946), performing data migration with respect to the environment (e.g., by selecting or interacting with element 947), etc.

In one embodiment, interaction with any of the elements of region 940 (e.g., 941-947) may cause an automated display of GUI 1000 of FIG. 10. FIG. 10 shows exemplary on-screen graphical user interface 1000 for configuring options associated with a cloud computing environment in accordance with one embodiment of the present invention. As shown in FIG.

10, region 1010 may be used to specify a virtual machine or image for backup, schedule the frequency of backup, schedule the timeframe for backups (e.g., during the first month of the project, for the duration of the project, etc.), define a start and/or end of the project, etc. Region 1020 may be used to define which image or virtual machine is to be saved (e.g., rebundled, creation of a snapshot of, etc.), where the saved image is to be stored, etc. Region 1030 may be used to configure which image or virtual machine is to be refreshed or restored (e.g., by selecting a location, by selecting a rebundled image or snapshot, etc.). Additionally, region 1040 may be used to delete an environment.

Turning back to FIG. 9, region 950 of GUI 700 displays the total cost for the environment if provisioned in accordance with the user selections made in other regions of GUI 700 (e.g., region 710, 820, 830 and 940). Additionally, interaction with element 955 of region 950 may initiate a checkout a process and/or initiate an automated display of GUI 11 (e.g., of FIGS. 11 and 12) in one embodiment.

Figure 11:
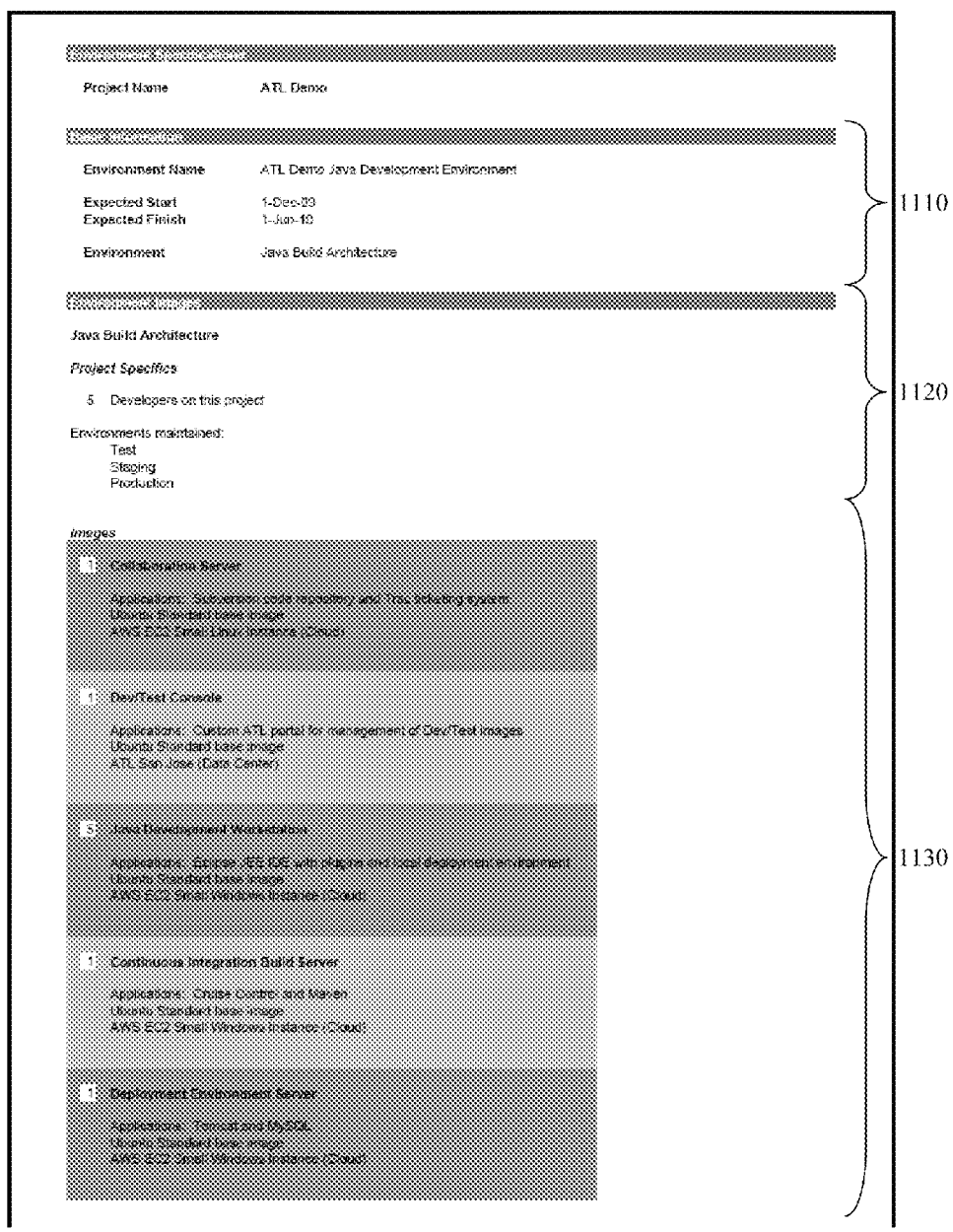
FIG. 11 shows a first portion of an exemplary on-screen graphical user interface for reviewing a configuration of and initiating automated provisioning of a cloud computing environment in accordance with one embodiment of the present invention.
Figure 12:
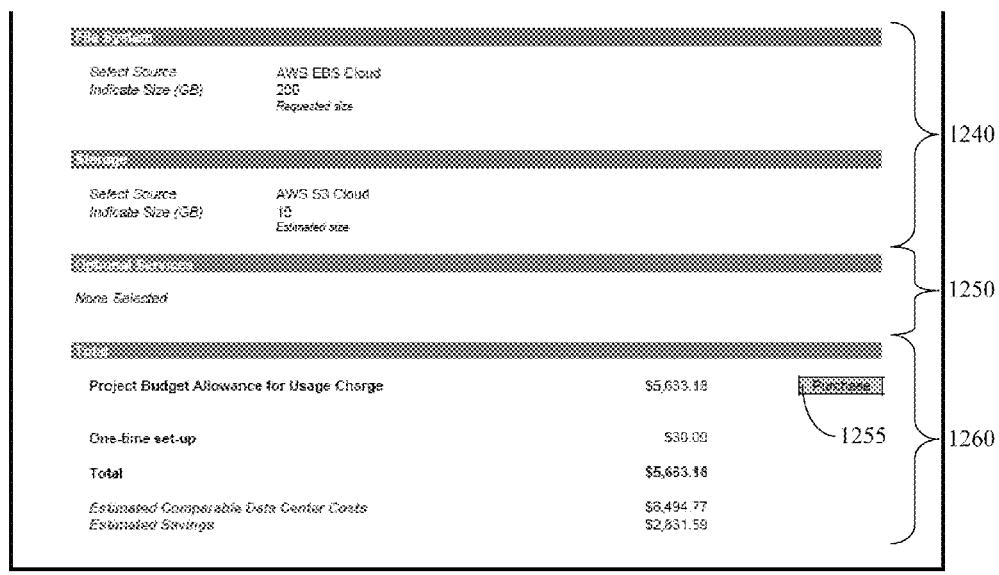
FIG. 12 shows a second portion of an exemplary on-screen graphical user interface for reviewing a configuration of and initiating automated provisioning of a cloud computing environment in accordance with one embodiment of the present invention.

FIGS. 11 and 12 show exemplary on-screen graphical user interface 1100 for reviewing a configuration of and initiating automated provisioning of a cloud computing environment in accordance with one embodiment of the present invention. As shown in FIG. 11, region 1110 includes a summary of basic information associated with the environment (e.g., entered in region 610 of GUI 600). Region 1120 includes a summary of user-defined attributes associated with the environment (e.g., entered in region 710 of GUI 700). Additionally, region 1130 includes a summary of a configuration of computing resources for the environment (e.g., entered in region 820 of GUI 700, GUI 860, etc.).

As shown in FIG. 12, region 1240 includes a summary of a configuration of storage resources for the environment (e.g., entered in region 830 of GUI 700). Region 1250 includes a summary of a configuration of options for the environment (e.g., entered in region 820 of GUI 700, GUI 860, etc.). Additionally, region 1260 includes a summary of the total cost for the environment if provisioned in accordance with the user selections made in other regions of GUI 700 (e.g., region 710, 820, 830 and 940), GUI 860, etc. Further, in one embodiment, interaction with element 1255 of region 1250 may initiate a purchase and/or automated provisioning of the cloud computing environment in accordance with the information summarized using GUI 1100 and/or entered using GUI 500, GUI 600, GUI 700, GUI 860, or some combination thereof. As such, computing resources can be automatically provisioned without requiring a user to have skills or credentials specific to each cloud provider and/or data center.

FIGS. 13 and 14 show exemplary on-screen GUIs for assigning a permission level to one or more users governing access to computing resources provisioned across at least one cloud provider and/or at least one data center. One or more of the GUIs depicted in FIGS. 13 and 14 may be generated by a user account management component (e.g., 114) and used to implement a GUI (e.g., 195) of at least one managing user (e.g., 190) in one embodiment. Additionally, it should be appreciated that one or more of the GUIs depicted in FIGS. 13 and 14 may be part of the same user interface or part of at least one different user interface. Further, one or more of the GUIs depicted in FIGS. 13 and 14 may be part of a user interface which also enables provisioning of computing resources across at least one cloud provider and/or at least one data center (e.g., in accordance with FIGS. 5 through 12), access to computing resources provisioned across at least one cloud provider and/or at least one data center (e.g., in accordance with FIGS. 16 to 23B), monitoring of usage of computing resources provisioned across at least one cloud provider and/ or at least one data center (e.g., in accordance with FIGS. 24 to 32), or some combination thereof.

FIG. 13 shows exemplary on-screen graphical user interface 1300 for associating a user with a cloud computing environment in accordance with one embodiment of the present invention. As shown in FIG. 13, region 1310 enables creation of a user to be associated with a cloud computing environment (e.g., 200, an environment provisioned using a GUI depicted in one or more of FIGS. 5 through 12, etc.), while region 1320 enables a user profile to be associated with the user (e.g., created using region 1310). In one embodiment, each profile may be associated with a particular bundle of rights enabling access to computing resources of the provisioned cloud computing environment. For example, a "project manager" profile (e.g., associated with element 1322) may provide a user more access rights than a "developer" profile (e.g., associated with element 1324) or a "tester" profile (e.g., associated with element 1326). In one embodiment, the access rights associated with a user profile may enable a user to create a component, delete a component, update a component, use a component, or perform another operation with respect to a component of an environment (e.g., 200).

Region 1330 enables information associated with a user (e.g., created using region 1310, 1320, etc.) to be updated. For example, region 1330 may be used to change the name of a user, change the profile associated with a user, etc. Additionally, interaction with element 1340 may delete a user (e.g., created using region 1310, 1320, etc.).

FIG. 14 shows exemplary on-screen graphical user interface 1400 for configuring access rights associated with a user profile in accordance with one embodiment of the present invention. As shown in FIG. 14, region 1410 enables selection of a user profile. Additionally, region 1420 enables configuration of the access rights (e.g., to computing resources of a cloud computing environment) associated with the user profile (e.g., selected using region 1410).

In one embodiment, each region of regions 1430 may correspond to a different component (e.g., an image, an instance, a file system, storage, a static IP address, etc.) associated with provisioned computing resources of a cloud computing environment (e.g., 200), where each region of regions 1430 includes a respective subset of elements 1440 for associating access rights with the selected user profile (e.g., selected using region 1410). For example, region 1432 includes elements 1442 for associating access rights to one or more images of the environment, while region 1434 includes elements 1444 for associating access rights to one or more instances of an image of the environment. Additionally, each column of elements 1440 may be associated with a different operation (e.g., creation, deletion, updating, usage, etc.) which a user may perform on a component of the environment. For example, element 1443 may be used to associate usage rights with the selected user profile for one or more images of the environment, while element 1445 may be used to associate creation rights with the selected user profile for one or more instances of an image of the environment.

Thus, in accordance with step 320 of FIG. 3, a user may be assigned a permission level governing access to computing resources of a cloud computing environment (e.g., 200). In one embodiment, a permission level may be assigned to a user by associating a user profile with the user (e.g., using GUI 1300 of FIG. 13) and defining the access rights for the user profile (e.g., using GUI 1400 of FIG. 14). Alternatively, a user may be assigned a permission level governing access to computing resources of a cloud computing environment in other ways (e.g., by directly assigning access rights to a user without the use of a user profile, etc.).

Figure 15:
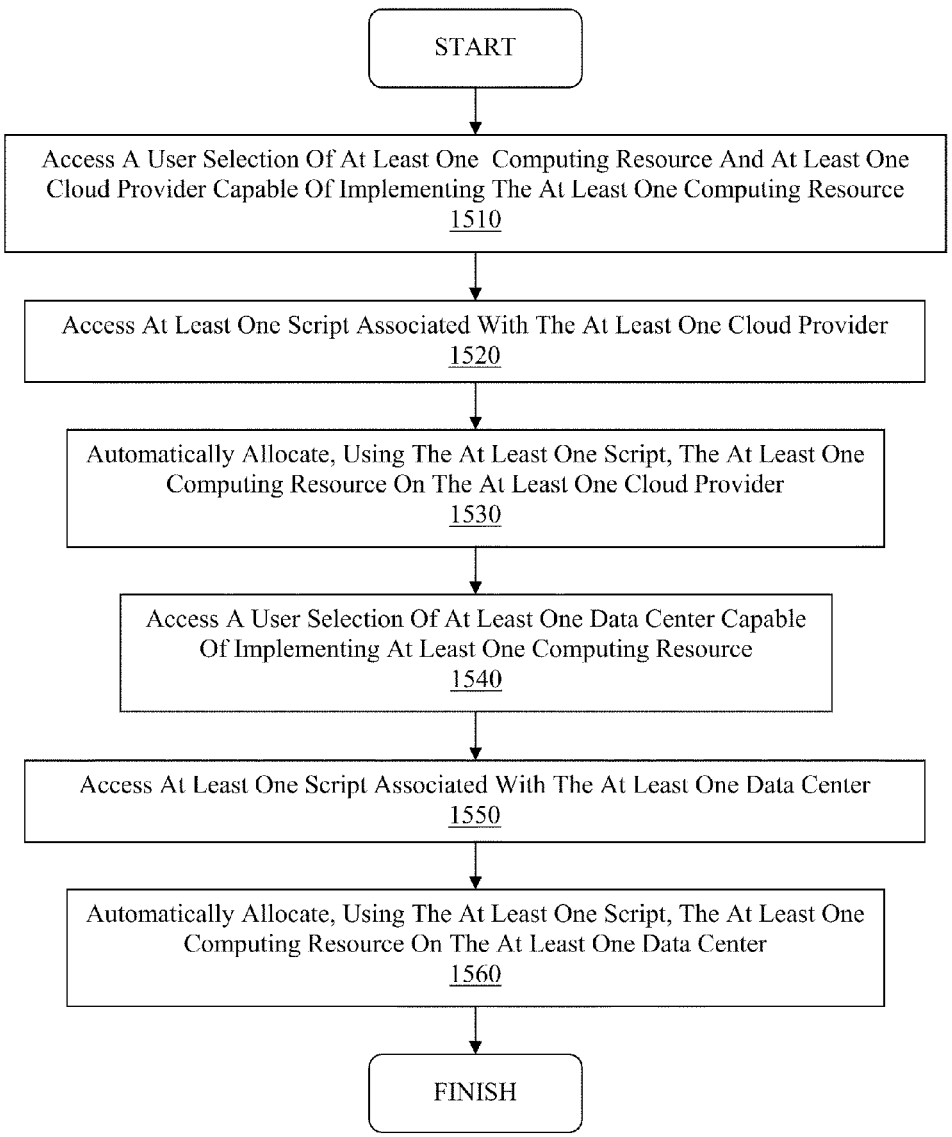
FIG. 15 shows a flowchart of an exemplary process for provisioning a plurality of computing resources across at least one cloud provider and/or at least one data center in accordance with one embodiment of the present invention.

FIG. 15 shows a flowchart of exemplary process 1500 for provisioning a plurality of computing resources across at least one cloud provider and/or at least one data center in accordance with one embodiment of the present invention. As shown in FIG. 15, step 1510 involves accessing a user selection of at least one computing resource (e.g., processing resource 122, storage resource 124, at least one other computing resource 126, etc.) and of at least one cloud provider (e.g., 120, 130, 140, etc.) capable of implementing the at least one computing resource. The at least one computing resource may be capable of implementing a virtual machine (e.g., 210, 220, 230, etc.) within a cloud computing environment (e.g., 200) in one embodiment. Additionally, the user selection may be input via a GUI (e.g., 195, 500, 600, 700, 860, 1000, 1100, 1300, etc.) which is generic to the plurality of cloud providers, and therefore, does not require skills or credentials specific to any one cloud provider and/or data center. The GUI may be capable of automatically suggesting the plurality of computing resources and/or the plurality of cloud providers based on at least one user-defined attribute (e.g., selected using elements of a GUI such as elements 712 and/or 714 of GUI 700, etc.). In one embodiment, the user selection accessed in step 1510 may include at least one provisioning attribute (e.g., 405) and be accessed by a provisioning component (e.g., 112) or a component thereof (e.g., attribute gathering component 410).

Step 1520 involves accessing at least one script associated with the at least one cloud provider. In one embodiment, a component (e.g., orchestration component 420 of provisioning component 112) may access the at least one script (e.g., 431, 432, 433, etc.) from a script database (e.g., 430), where the at least one script corresponds to the at least one cloud provider (e.g., 120, 130, 140, etc.). The at least one script (e.g., 431, etc.) may be capable of automatically allocating the at least one computing resource (e.g., 122, 124, etc.) on the at least one cloud provider (e.g., 120, etc.).

As shown in FIG. 15, step 1530 involves automatically allocating, using the at least one script, the at least one computing resource on the at least one cloud provider. In one embodiment, a component (e.g., orchestration component 420 of provisioning component 112) may generate provisioning communications (e.g., 425) using the at least one script, where the provisioning communications are communicated to the at least one cloud provider (e.g., 120, 130, 140, etc.) and used to automatically allocate the at least one computing resource (e.g., 122, 124, 132, 134, 142, 144, etc.) on the at least one cloud provider (e.g., 120, 130, 140, etc.).

Step 1540 involves accessing a user selection of at least one data center (e.g., 150, etc.) capable of implementing at least one computing resource (e.g., processing resource 122, storage resource 124, at least one other computing resource 126, etc.). The at least one computing resource may be capable of implementing a virtual machine (e.g., 210, 220, 230, etc.) within a cloud computing environment (e.g., 200) in one embodiment. Additionally, the at least one data center may be selected by a user via a GUI (e.g., 195, 500, 600, 700, 860, 1000, 1100, 1300, etc.). Alternatively, the at least one data center may be automatically suggested or displayed by a GUI (e.g., 195, region 820 of GUI 700, 860, etc.) based on user-defined attributes (e.g., selected using elements of a GUI such as elements 712 and/or 714 of GUI 700, etc.). Further, in one embodiment, the user selection accessed in step 1540 may include at least one provisioning attribute (e.g., 405) and be accessed by a provisioning component (e.g., 112) or a component thereof (e.g., attribute gathering component 410).

As shown in FIG. 15, step 1550 involves accessing at least one script associated with the at least one cloud provider. In one embodiment, a component (e.g., orchestration component 420 of provisioning component 112) may access the at least one script (e.g., 435, etc.) from a script database (e.g., 430), where the at least one script corresponds to the at least one data center (e.g., 150, etc.). The at least one script (e.g., 435, etc.) may be capable of automatically allocating the at least one computing resource (e.g., 152, 154, etc.) on the at least one data center (e.g., 150, etc.).

Step 1560 involves automatically allocating, using the at least one script, the at least one computing resource on the at least one data center. In one embodiment, a component (e.g., orchestration component 420 of provisioning component 112) may generate provisioning communications (e.g., 425) using the at least one script, where the provisioning communications are communicated to the at least one data center (e.g., 150, etc.) and used to automatically allocate the at least one computing resource (e.g., 152, 154, etc.) on the at least one data center (e.g., 150, etc.).

Providing Access to Computing Resources Provisioned Across at Least One Cloud Provider and/or at Least One Data Center Turning back to FIG. 1, access component 116 of intermediary component 110 may be used to provide at least one user (e.g., 160, 170, 180, etc.) access to computing resources (e.g., a processing resource, a storage resource, a network resource, an operating system, a software application, a software application configuration, state data, another type of data, some combination thereof, etc.) provisioned across at least one cloud provider (e.g., 120, 130, 140, etc.) and/or at least one data center (e.g., 150, etc.). Each user may be provided access to the provisioned computing resources using a respective GUI (e.g., GUI 165, 175, 185, etc.), where data used to display each GUI may be accessed and/or generated by access component 116. Additionally, each of the GUIs may be used to submit authentication data to access component 116, thereby enabling access component 116 to regulate access to the provisioned computing resources based upon a respective permission level of each user (e.g., determined using respective authentication data of each user) and/or enable multiple authenticated users to share the provisioned computing resources.

In one embodiment, access may be provided (e.g., using access component 116) to computing resources provisioned across at least one cloud provider and/or at least one data center which utilize at least two different technologies or virtual machine representations for implementing one or more virtual machines. For example, cloud provider 120 may utilize a virtual machine representation from VMWare to provide computing resources for the cloud computing environment (e.g., 200 of FIG. 2), while cloud provider 130 may utilize an open source virtual machine representation such as Xen to provide computing resources for the cloud computing environment (e.g., 200 of FIG. 2).

Figure 16:
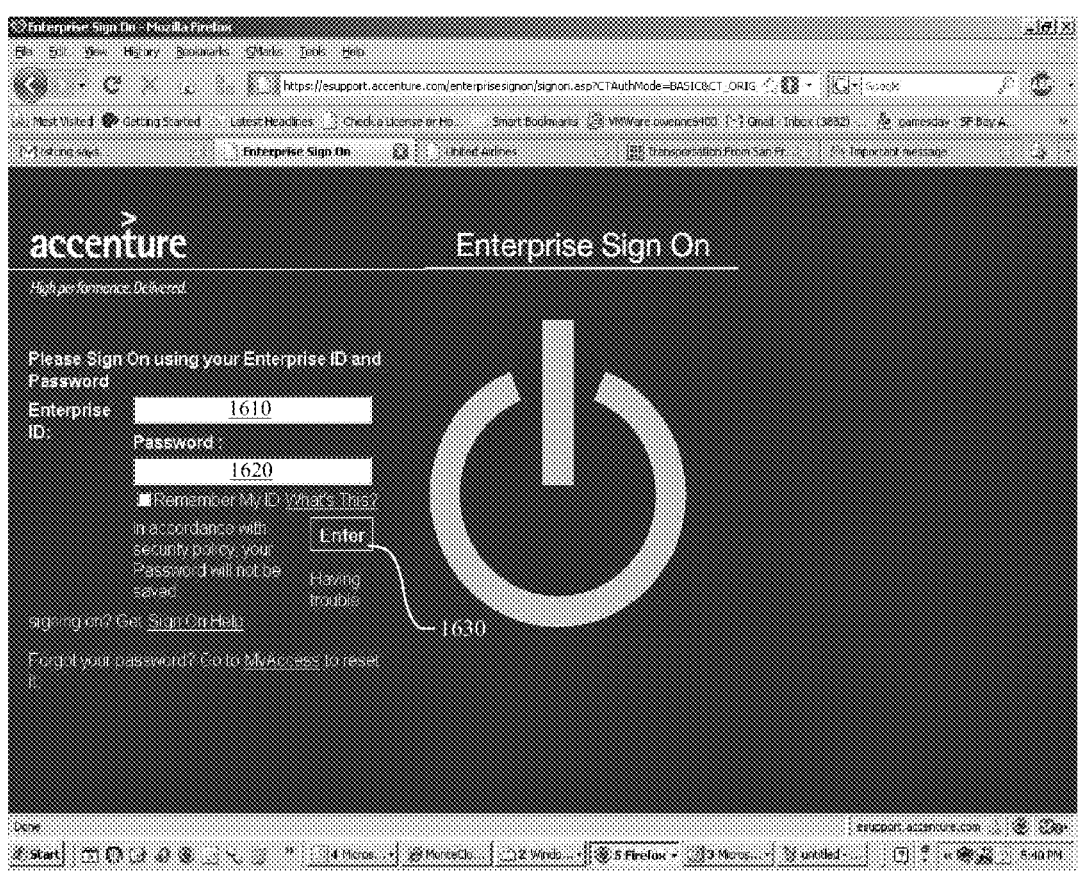
FIG. 16 shows an exemplary on-screen graphical user interface for submitting authentication data in accordance with one embodiment of the present invention.

FIG. 16 shows exemplary on-screen graphical user interface 1600 for submitting authentication data in accordance with one embodiment of the present invention. As shown in FIG. 16, a user's name can be entered into region 1610 and a user's password can be entered into region 1620. The authentication data (e.g., a user's name, password, etc.) entered using GUI 1600 may be submitted to access component 116 (e.g., in response to an interaction with element 1630), and thereafter used by access component 116 to authenticate the user (e.g., 160, 170, 180, etc.). As such, the submitted authentication data (e.g., submitted using GUI 1600) may be used to regulate access to the provisioned computing resources (e.g., provisioned across at least one cloud provider and/or at least one data center) based upon a respective permission level of each user (e.g., determined using respective authentication data of each user) and/or enable multiple authenticated users to share the provisioned computing resources.

Figure 17:
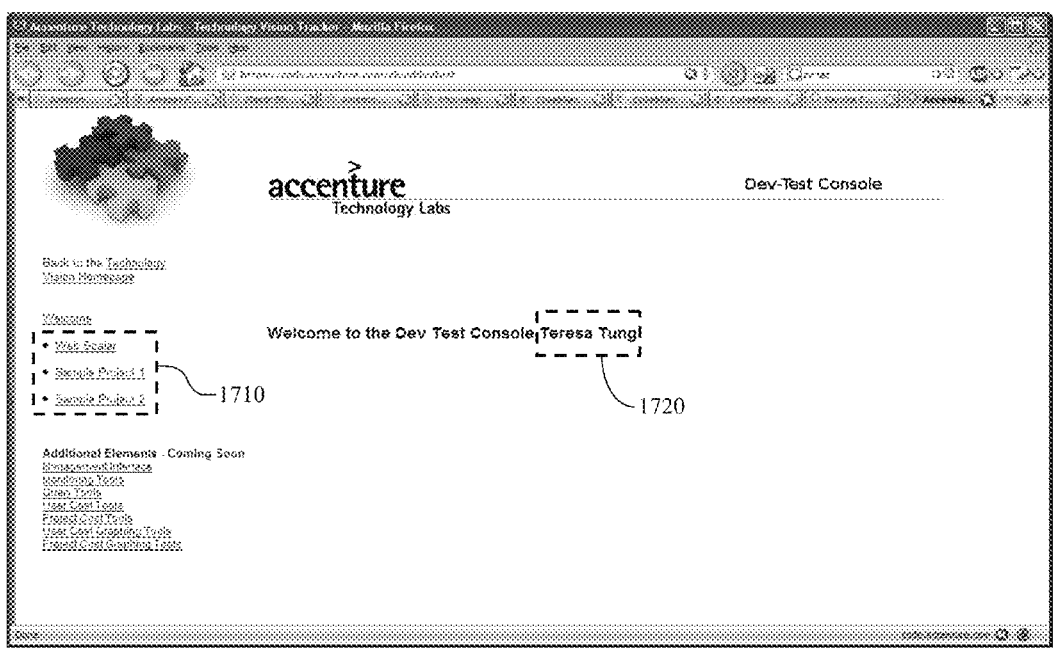
FIG. 17 shows an exemplary on-screen graphical user interface for enabling a user to select a project in accordance with one embodiment of the present invention.
Figure 18:
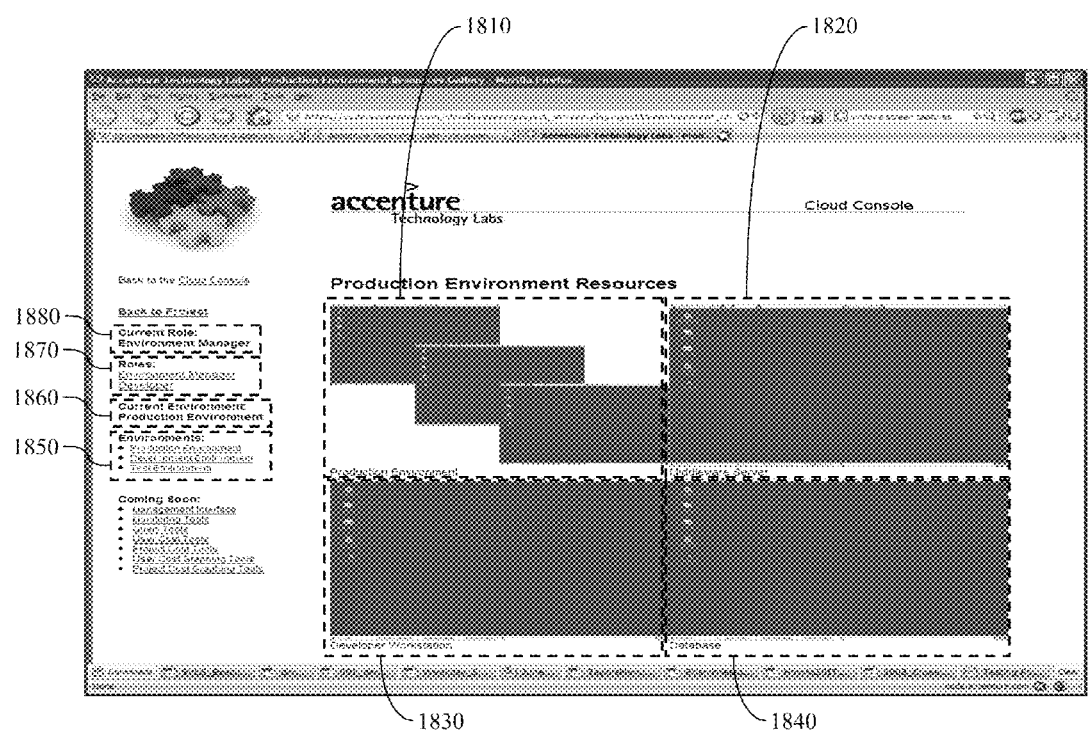
FIG. 18 shows an exemplary on-screen graphical user interface for enabling a user to select provisioned computing resources for access in accordance with one embodiment of the present invention.

FIG. 17 shows exemplary on-screen graphical user interface 1700 for enabling a user to select a project in accordance with one embodiment of the present invention. As shown in FIG. 17, region 1710 includes a plurality of selectable elements, where each element in region 1710 is associated with a respective project. In one embodiment, a user interaction with an element of region 1710 may initiate a display of information associated with a project corresponding to the selected element of region 1710 (e.g., as shown in FIG. 18). Additionally, in one embodiment, GUI 1700 may be displayed in response to a user submission of authentication data (e.g., using element 1630 of GUI 1600).

The elements displayed in region 1710 may be determined (e.g., by access component 116) based upon a permission level of a user (e.g., identified in region 1720). For example, in response to a user (e.g., identified in region 1720) submitting authentication data using GUI 1600 to access component 116, access component 116 may query user account management component 114 to determine a permission level for the user. Access component 116 may then determine at least one project associated with the user based upon the permission level of the user. At least one element corresponding to the at least one project associated with the user may then be displayed in region 1710. In this manner, access to provisioned computing resources (e.g., provisioned across at least one cloud provider and/or at least one data center) may be regulated based upon a permission level of a user.

FIG. 18 shows exemplary on-screen graphical user interface 1800 for enabling a user to select provisioned computing resources for access in accordance with one embodiment of the present invention. The information presented using GUI 1800 may be associated with a project selected using GUI 1700 in one embodiment. Additionally, GUI 1800 may be displayed in response to interaction with an element of region 1710 of GUI 1700 in one embodiment.

As shown in FIG. 18, interaction with region 1810 may enable access to computing resources for implementing all virtual machines of an environment, while interaction with regions 1820, 1830 and 1840 may enable access to computing resources for implementing individual virtual machines of an environment. For example, interaction with region 1820 may enable access to computing resources for implementing a first virtual machine (e.g., 210), interaction with region 1830 may enable access to computing resources for implementing a second virtual machine (e.g., 220), and interaction with region 1840 may enable access to computing resources for implementing a third virtual machine (e.g., 230). Additionally, interaction with region 1810 may enable access to computing resources of the entire environment (e.g., capable of implementing the first virtual machine, the second virtual machine and the third virtual machine). As such, GUI 1800 enables a user to access provisioned computing resources (e.g., provisioned across at least one cloud provider and/or at least one data center) for implementing an entire environment (e.g., all the virtual machines of an environment) or a portion thereof (e.g., one or more individual virtual machines of an environment).

In one embodiment, interaction with a region of GUI 1800 (e.g., region 1810, region 1820, region 1830, region 1840, etc.) may enable direct access to computing resources (e.g., provisioned across at least one cloud provider and/or at least one data center) corresponding to the region. For example, interaction with region 1810 may launch and/or configure computing resources (e.g., provisioned across at least one cloud provider and/or at least one data center) for implementing all virtual machines of an environment, while interaction with region 1820 may launch and/or configure computing resources (e.g., provisioned across at least one cloud provider and/or at least one data center) for implementing one or more individual virtual machines of an environment.

Figure 19:
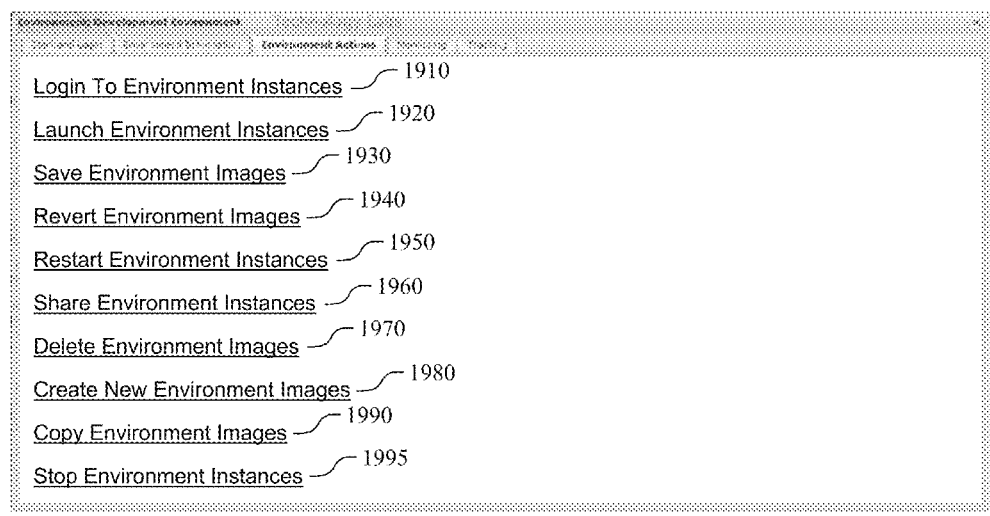
FIG. 19 shows an exemplary on-screen graphical user interface for enabling a user to access provisioned computing resources associated with an environment in accordance with one embodiment of the present invention.
Figure 20:
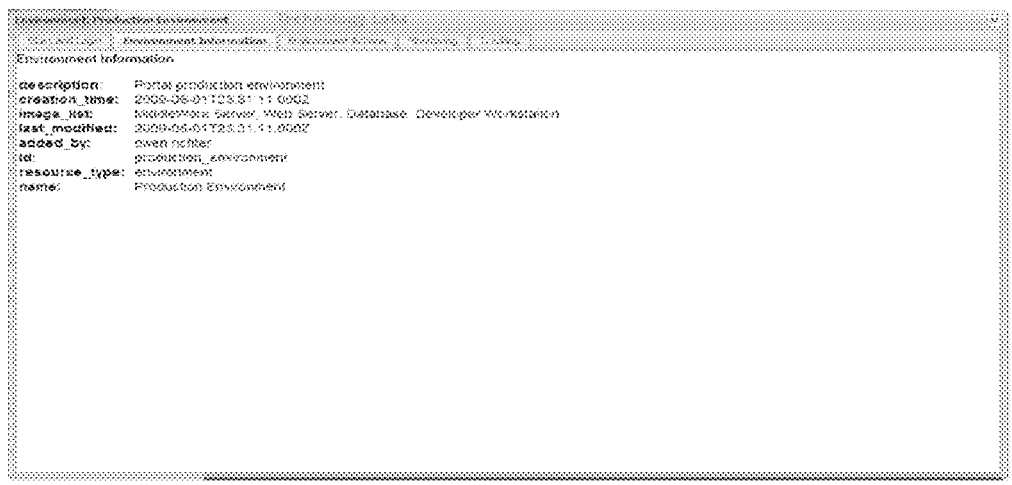
FIG. 20 shows an exemplary on-screen graphical user interface for displaying information about provisioned computing resources associated with an environment in accordance with one embodiment of the present invention.
Figure 21:
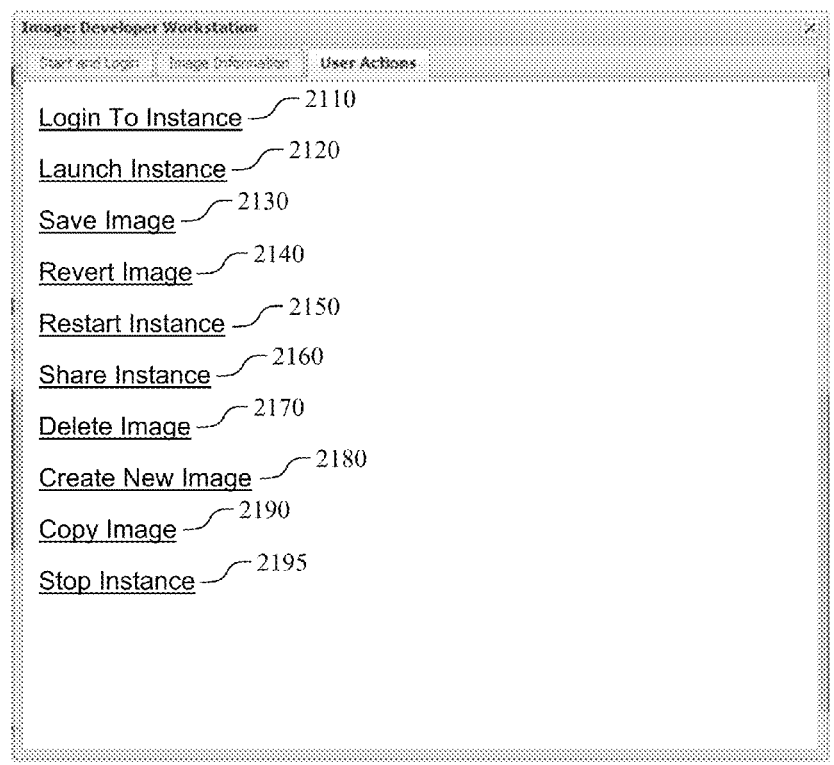
FIG. 21 shows an exemplary on-screen graphical user interface for enabling a user to access provisioned computing resources associated with a portion of an environment in accordance with one embodiment of the present invention.
Figure 22:
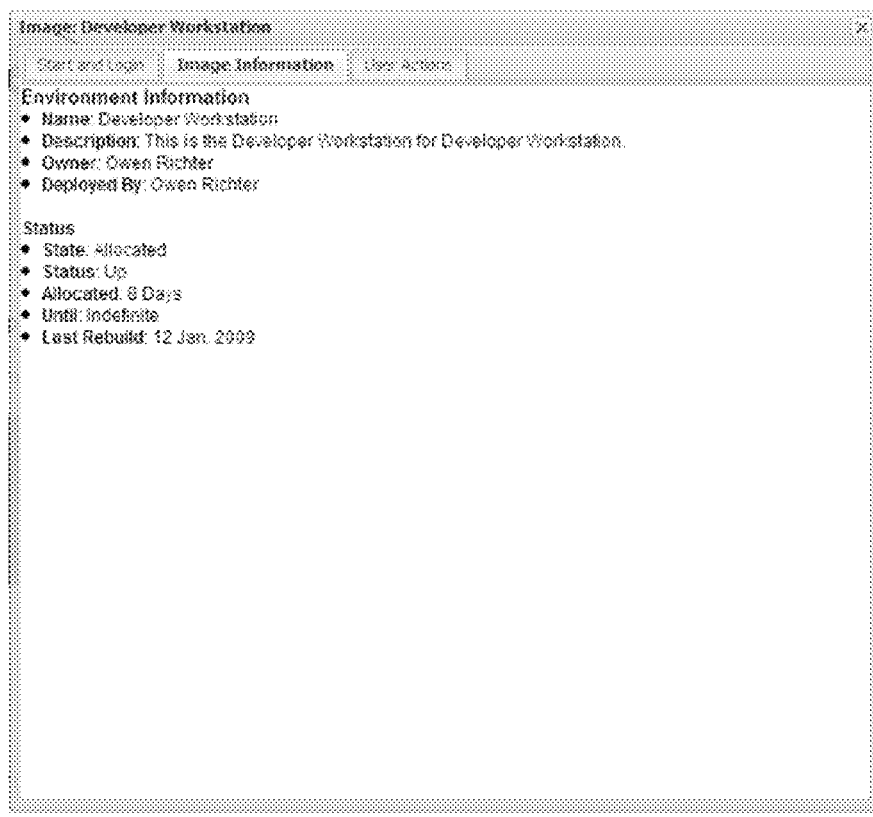
FIG. 22 shows an exemplary on-screen graphical user interface for displaying information about provisioned computing resources associated with a portion of an environment in accordance with one embodiment of the present invention.

Alternatively, interaction with a region of GUI 1800 (e.g., region 1810, region 1820, region 1830, region 1840, etc.) may enable access to computing resources in an indirect manner (e.g., using one or more additional GUIs which enable access to computing resources of an entire environment or a portion thereof). For example, interaction with region 1810 may initiate the display of at least one GUI enabling access to computing resources (e.g., provisioned across at least one cloud provider and/or at least one data center) for implementing all virtual machines of an environment (e.g., as shown in FIGS. 19 and 20), while interaction with region 1820 may initiate the display of at least one GUI (e.g., as shown in FIGS. 21 and 22) enabling access to computing resources (e.g., provisioned across at least one cloud provider and/or at least one data center) for implementing one or more individual virtual machines of an environment.

As shown in FIG. 18, region 1850 includes at least one selectable element, where each element of region 1850 may be associated with a different environment. Region 1860 displays a currently selected environment (e.g., associated with the computing resources and/or virtual machines displayed in regions 1810, 1820, 1830 and 1840). In this manner, a user may reconfigure GUI 1800 to display and/or enable access to provisioned computing resources of another environment. For example, if a new environment is selected using region 1850, interaction with region 1810 may enable access to computing resources for implementing all virtual machines of the new environment, while interaction with regions 1820, 1830 and 1840 may enable access to computing resources for implementing individual virtual machines of the new environment.

It should be appreciated that other environments (e.g., selectable using region 1850) may have a different number and/or type of virtual machines, and thus, the number of regions and/or the content displayed in each region of GUI 1800 may vary accordingly. For example, if the new environment has four virtual machines, then GUI 1800 may be reconfigured with an additional region to enable access to computing resources for implementing the additional virtual machine. As another example, if the new environment has four virtual machines, then region 1810 of GUI 1800 may be reconfigured to enable access to computing resources for implementing all four virtual machines.

In one embodiment, the environments selectable using region 1850 may be determined (e.g., by access component 116) based upon a user permission level (e.g., assigned using user account management component 114). For example, a larger number of elements associated with a larger number of environments may be displayed in region 1850 for a higher permission level, thereby enabling a user to access computing resources for a larger number of environments using GUI 1800 based upon a permission level of the user. Additionally, the amount or number of computing resources accessible using GUI 1800 may be regulated based upon a permission level of a user (e.g., by displaying a larger number of virtual machines in regions 1810-1840 for a higher permission level, by displaying a smaller number of virtual machines in regions 1810-1840 for a lower permission level, etc.).

As shown in FIG. 18, region 1870 includes at least one selectable element, where each element of region 1870 may be associated with a different role of a user. Region 1880 displays a currently selected role of a user (e.g., selected using region 1870). A different number and/or type of environments may be associated with each role selectable using region 1870, and thus, selection of a different role using region 1870 may cause a different set of elements associated with a different set of environments (e.g., associated with the role selected using region 1870) to be displayed in region 1850. In this manner, GUI 1800 may be reconfigured to display and/or enable access to provisioned computing resources associated with a particular role of a user (e.g., selected using region 1870).

In one embodiment, the roles selectable using region 1870 may be determined (e.g., by access component 116) based upon a user permission level (e.g., assigned using user account management component 114). For example, a larger number of elements associated with a larger number of roles may be displayed in region 1870 for a higher permission level, thereby enabling a user to access computing resources for a larger number of roles using GUI 1800 based upon a permission level of the user.

FIG. 19 shows exemplary on-screen graphical user interface 1900 for enabling a user to access provisioned computing resources associated with an environment in accordance with one embodiment of the present invention. GUI 1900 may be displayed in response to a user interaction with region 1810 of GUI 1800 in one embodiment.

As shown in FIG. 19, may enable a user to login to one or more instances of an environment or "environment instances." For example, interaction with element 1910 may display a graphical user interface which enables a user to input authentication data (e.g., a username, password, etc.), where the authentication data may be specific to the one or more environment instances. In one embodiment, the authentication data input using element 1910 may be different from the authentication data entered using GUI 1600.

Interaction with element 1920 may initiate launching and/or configuring of one or more environment instances (e.g., logged into using element 1910). For example, the computing resources of an environment (e.g., 200), which are provisioned across at least one cloud provider and/or at least one data center, may be launched and/or configured (e.g., by the at least one cloud provider and/or at least one data center) to implement one or more virtual machines (e.g., 210, 220, 230, etc.) of the environment.

As shown in FIG. 19, interaction with element 1930 may initiate saving of one or more images of one or more environment instances (e.g., launched using element 1920). For example, element 1930 may be used to rebundle one or more environment instances in one embodiment. Alternatively, element 1930 may be used to create a snapshot of one or more environment instances which may include saving volatile data for the environment.

Interaction with element 1940 may initiate a reversion to one or more previously-saved images of one or more environment instances (e.g., saved using element 1930). For example, computing resources (e.g., provisioned across at least one cloud provider and/or at least one data center) associated with one or more previously-saved images of one or more environment instances may be launched and/or configured responsive to an interaction with element 1930.

As shown in FIG. 19, interaction with element 1950 may initiate a restart of one or more environment instances (e.g., originally launched using element 1920). Interaction with element 1960 may initiate sharing of one or more environment instances. The one or more environment instances may be shared with another user (e.g., 160, 170, 180, 190, etc.) in one embodiment.

Interaction with element 1970 may initiate a deletion of one or more images of one or more environment instances. Additionally, interaction with element 1980 may initiate a creation of one or more new images of one or more environment instances, whereas interaction with element 1990 may initiate a copy of one or more images of one or more environment instances. Interaction with element 1995 may initiate a stopping or ending of one or more environment instances.

FIG. 20 shows exemplary on-screen graphical user interface 2000 for displaying information about provisioned computing resources associated with an environment in accordance with one embodiment of the present invention. GUI 2000 may be displayed in response to a user interaction with region 1810 of GUI 1800 in one embodiment.

As shown in FIG. 20, a user may view information about the environment and/or about the provisioned computing resources which implement the environment. For example, GUI 2000 may display a description of the environment and a list of which images or virtual machines (e.g., 210, 220, 230, etc.) make up the environment (e.g., 200). GUI 2000 may also display the user who created the environment and/or the date and/or time of the creation of the environment. Additionally, GUI 2000 may display the date and/or time of the last modification to the environment. Further, GUI 2000 may display other information about the environment in other embodiments.

FIG. 21 shows exemplary on-screen graphical user interface 2100 for enabling a user to access provisioned computing resources associated with a portion of an environment in accordance with one embodiment of the present invention. In one embodiment, GUI 2100 may be displayed in response to a user interaction with region 1820 of GUI 1800, region 1830 of GUI 1800, region 1840 of GUI 1800, or some combination thereof.

As shown in FIG. 21, may enable a user to login to an instance (e.g., associated with a portion of an environment). For example, interaction with element 2110 may display a graphical user interface which enables a user to input authentication data (e.g., a username, password, etc.), where the authentication data may be specific to the instance. In one embodiment, the authentication data input using element 2110 may be different from the authentication data entered using GUI 1600.

Interaction with element 2120 may initiate launching and/or configuring of an instance (e.g., associated with a portion of an environment). For example, the computing resources associated with a virtual machine (e.g., 210, 220, 230, etc.), which are provisioned across at least one cloud provider and/or at least one data center, may be launched and/or configured (e.g., by the at least one cloud provider and/or at least one data center) to implement the virtual machine.

As shown in FIG. 21, interaction with element 2130 may initiate saving an image of an instance (e.g., associated with a portion of an environment). For example, element 2130 may be used to rebundle an instance in one embodiment. Alternatively, element 2130 may be used to create a snapshot of an instance which may include saving volatile data for one or more virtual machines.

Interaction with element 2140 may initiate a reversion to a previously-saved image of an instance (e.g., saved using element 2130). For example, computing resources (e.g., provisioned across at least one cloud provider and/or at least one data center) associated with a previously-saved image of an instance (e.g., associated with a portion of an environment) may be launched and/or configured responsive to an interaction with element 2140.

As shown in FIG. 21, interaction with element 2150 may initiate a restart of an instance (e.g., originally launched using element 2120). Interaction with element 2160 may initiate sharing of an instance (e.g., associated with a portion of an environment). The instance may be shared with another user (e.g., 160, 170, 180, 190, etc.) in one embodiment.

Interaction with element 2170 may initiate a deletion of an image of an instance (e.g., associated with a portion of an environment). Additionally, interaction with element 2180 may initiate a creation of a new image of an instance (e.g., associated with a portion of an environment), whereas interaction with element 2190 may initiate a copy of an image of an instance (e.g., associated with a portion of an environment). Interaction with element 2195 may initiate a stopping or ending of an instance (e.g., associated with a portion of an environment).

FIG. 22 shows exemplary on-screen graphical user interface 2200 for displaying information about provisioned computing resources associated with a portion of an environment in accordance with one embodiment of the present invention. In one embodiment, GUI 2200 may be displayed in response to a user interaction with region 1820 of GUI 1800, region 1830 of GUI 1800, region 1840 of GUI 1800, or some combination thereof.

As shown in FIG. 22, a user may view information about an image and/or about the provisioned computing resources which implement the image. For example, GUI 2200 may display a name and description of the image. GUI 2200 may also display identification information for a user that created or deployed the image.

GUI 2200 may display information about the status of the image. For example, GUI 2200 may indicate whether the image is launching, running, shutting down, terminated, etc. GUI 2200 may also indicate whether or not the image is allocated, a date and/or time of the allocation of the image, a date and/or time of the last rebuild of the image, etc. And in other embodiments, GUI 2200 may display other information about the image.

One or more of the GUIs depicted in FIGS. 16 through 22 may be generated by an access component (e.g., 116) and used to implement a GUI (e.g., 165, 175, 185, etc.) of at least one user (e.g., 160, 170, 180, etc.) in one embodiment. Additionally, it should be appreciated that one or more of the GUIs depicted in FIGS. 16 through 22 may be part of the same user interface or part of at least one different user interface. Further, one or more of the GUIs depicted in FIGS. 16 through 22 may be part of a user interface which also enables provisioning of computing resources across at least one cloud provider and/or at least one data center (e.g., in accordance with FIGS. 5 through 12), enables assignment of a permission level to one or more users governing access to computing resources provisioned across at least one cloud provider and/or at least one data center (e.g., in accordance with FIGS. 13 and 14), monitoring of usage of computing resources provisioned across at least one cloud provider and/or at least one data center (e.g., in accordance with FIGS. 24 to 32), or some combination thereof.

Figure 23A:
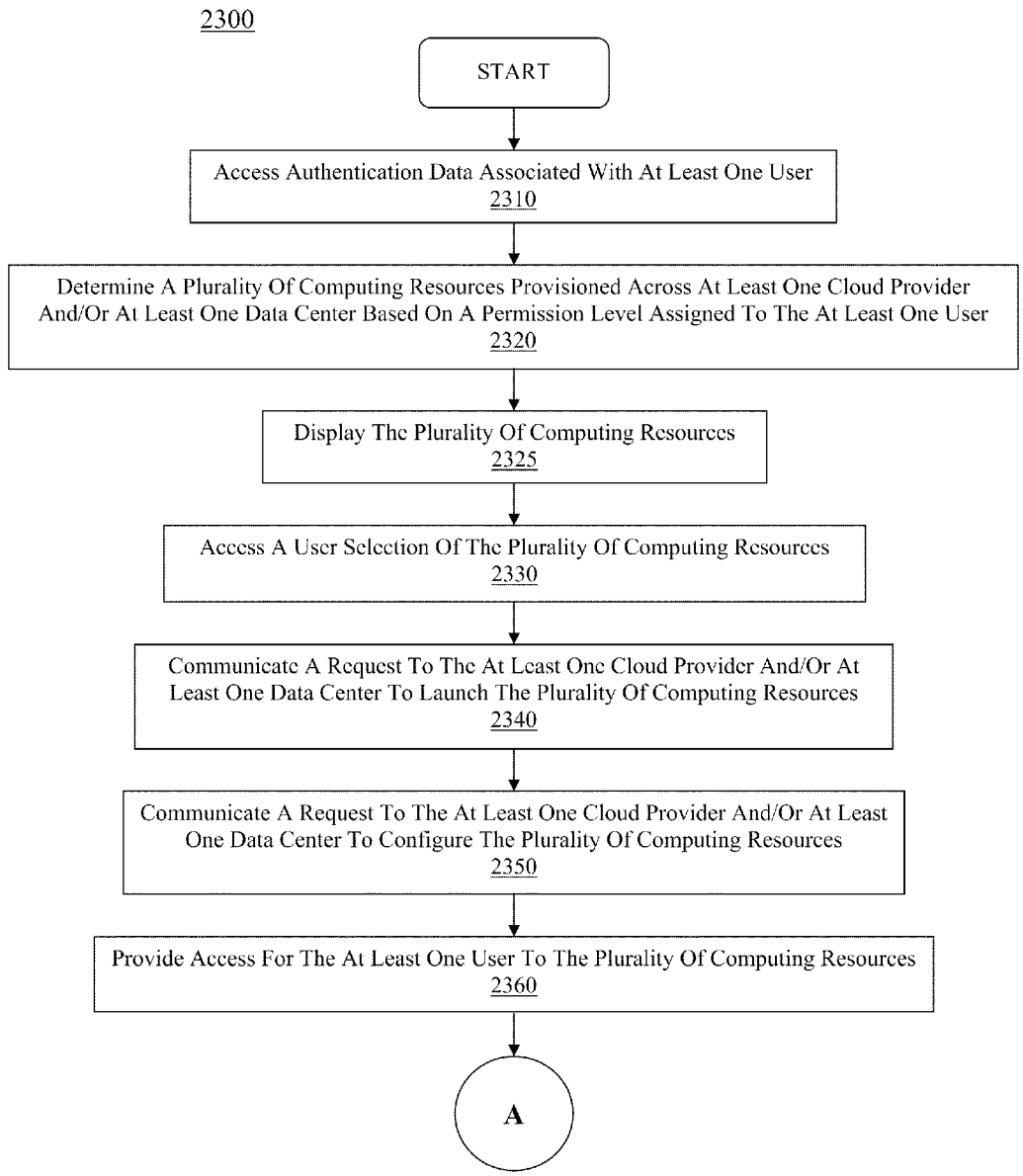
FIG. 23A shows a first portion of a flowchart of an exemplary process for providing access to a plurality of computing resources across at least one cloud provider and/or at least one data center in accordance with one embodiment of the present invention.
Figure 23B:
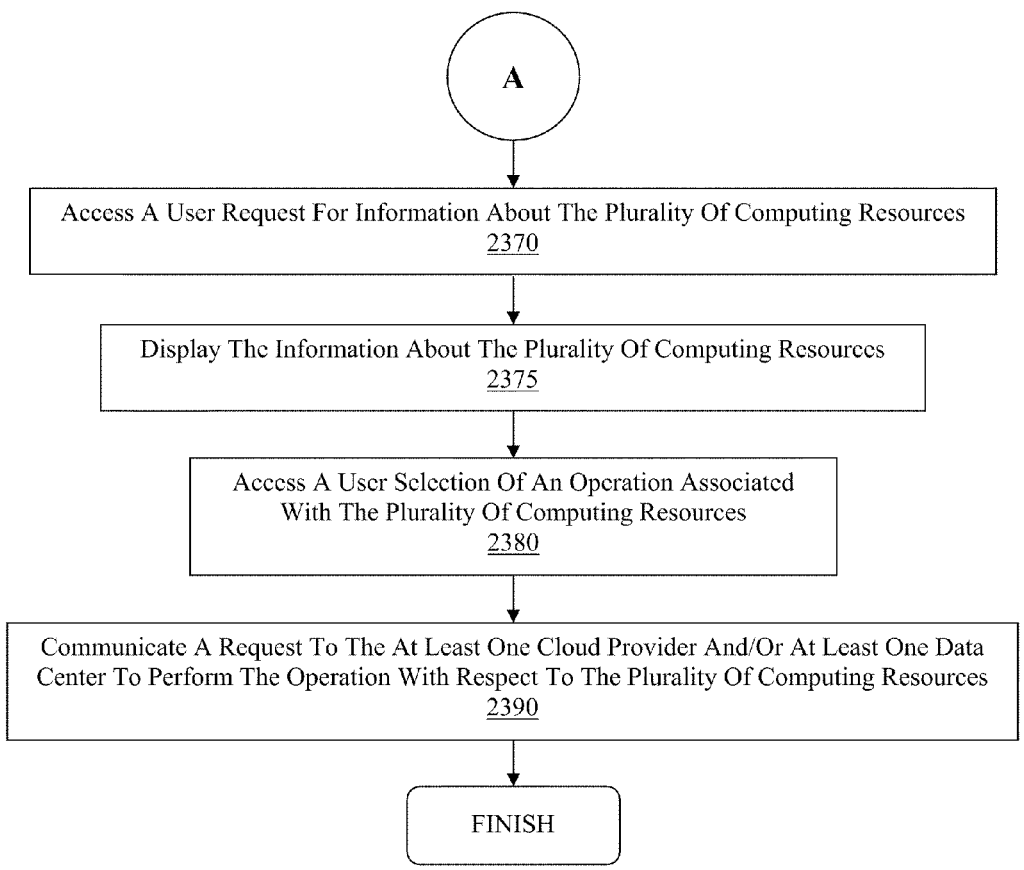
FIG. 23B shows a second portion of a flowchart of an exemplary process for providing access to a plurality of computing resources across at least one cloud provider and/or at least one data center in accordance with one embodiment of the present invention.

FIGS. 23A and 23B show a flowchart of exemplary process 2300 for providing access to a plurality of computing resources provisioned across at least one cloud provider and/or at least one data center in accordance with one embodiment of the present invention. As shown in FIG. 23A, step 2310 involves accessing authentication data associated with at least one user. The authentication data may include a name of a user (e.g., 160, 170, 180, 190, etc.), a password of a user (e.g., 160, 170, 180, 190, etc.), etc. The authentication data may be input using a GUI (e.g., 1600 of FIG. 16). And in one embodiment, the authentication data may be accessed by a component (e.g., access component 116 of intermediary component 110) situated between at least one user (e.g., 160, 170, 180, 190, etc.) and at least one entity (e.g., a cloud provider, data center, etc.) providing a cloud computing resource.

Step 2320 involves determining a plurality of computing resources provisioned across at least one cloud provider and/or at least one data center based on a permission level assigned to the at least one user (e.g., associated with the authentication data accessed in step 2310). For example, a user may be identified based on the authentication data (e.g., by access component 116), where the identification of the user is used to determine a permission level for the user (e.g., assigned by user account management component 114). The permission level associated with the user may then be used (e.g., by access component 116) to determine the plurality of computing resources (e.g., provisioned across at least one cloud provider and/or at least one data center) which the user is allowed to access based upon the permission level. In one embodiment, a lookup table may be indexed (e.g., by access component 116) using the permission level to determine the plurality of computing resources.

The plurality of computing resources determined in step 2330 may be associated with a cloud computing environment (e.g., 200) in one embodiment. For example, the plurality of computing resources may be capable of implementing a single virtual machine (e.g., 210) or a plurality of virtual machines (e.g., 210, 220, etc.). Alternatively, the plurality of computing resources may be computing resources capable of implementing all virtual machines of an environment (e.g., virtual machines 210, 220 and 230 of environment 200, etc.). In one embodiment, the plurality of computing resources may be associated with an image and/or an instance of an image. And in one embodiment, the plurality of computing resources may include at least one processing resource, at least one storage resource, at least one network resource, at least one operating system, at least one software application, at least one software application configuration, state data, another type of data, some combination thereof, etc.

As shown in FIG. 23A, step 2325 involves displaying the plurality of computing resources (e.g., determined in step 2320). The plurality of computing resources may be displayed using a GUI (e.g., 1800 of FIG. 18).

Step 2330 involves accessing a user selection of the plurality of computing resources. The user selection may be input via a GUI (e.g., 165, 175, 185, 195, 1800, 1900, 2000, 2100, 2200, etc.). In one embodiment, the user selection may include a user interaction with a region of a GUI which is associated with computing resources for implementing an entire environment (e.g., region 1810 of GUI 1800). Alternatively, the user selection may include a user interaction with a region of a GUI which is associated with computing resources for implementing a portion of an environment (e.g., region 1820 of GUI 1800, region 1830 of GUI 1800, region 1840 of GUI 1800, etc.).

As shown in FIG. 23A, step 2340 involves communicating a request to the at least one cloud provider and/or at least one data center to launch the plurality of computing resources. Step 2340 may be performed in response to step 2330 in one embodiment. Additionally, the request may be communicated from an intermediary component (e.g., 110, access component 116 of intermediary component 110, etc.) to the at least one cloud provider (e.g., 120, 130, 140, etc.) and/or at least one data center (e.g., 150, etc.).

Step 2350 involves communicating a request to the at least one cloud provider and/or at least one data center to configure the plurality of computing resources. Step 2340 may be performed in response to step 2330 in one embodiment. Additionally, the request may be communicated from an intermediary component (e.g., 110, access component 116 of intermediary component 110, etc.) to the at least one cloud provider (e.g., 120, 130, 140, etc.) and/or at least one data center (e.g., 150, etc.).

As shown in FIG. 23A, step 2360 involves providing access for the at least one user to the plurality of computing resources. Access to the plurality of computing resources may be provided via a GUI (e.g., 165, 175, 185, 195, etc.) in one embodiment.

Additionally, step 2360 may involve brokering access for the at least one user to an account held with a particular cloud provider and/or a particular data center. For example, an intermediary component (e.g., access component 116 of intermediary component 110) may be used to broker access for multiple users (e.g., 160, 170, 180, 190, etc.) to an account held with a cloud provider (e.g., 120, 130, 140, etc.) and/or a data center (e.g., 150, etc.), thereby acting as a proxy between the multiple users and the cloud provider and/or data center. In this manner, the cloud provider and/or data center may "see" the intermediary component as the only user of the account, and therefore, may be unaware of the multiple users. Accordingly, the intermediary component (e.g., 110) may enable multiple users to share the provisioned computing resources even where the computing resources are provisioned on a cloud provider or data center which allows only one user per account.

As shown in FIG. 23B, step 2370 involves accessing a user request for information about the plurality of computing resources. The user request may be input via a GUI (e.g., 165, 175, 185, 195, 1800, 1900, 2000, 2100, 2200, etc.) in one embodiment.

Step 2375 involves displaying the information about the plurality of computing resources. The information about the plurality of computing resources may be displayed using a GUI (e.g., 165, 175, 185, 195, 1800, 1900, 2000, 2100, 2200, etc.) in one embodiment. Additionally, the information (e.g., requested in step 2370, displayed in step 2375, etc.) may include information about an environment (e.g., a description of the environment, a list of images or virtual machines which make up the environment, the user who created the environment, the date and/or time of the creation of the environment, the date and/or time of the last modification to the environment, other information about the environment, etc.) and/or an image (e.g., a name of the image, a description of the image, identification information for a user that created or deployed the image, information about the status of the image, whether or not the image is allocated, a date and/or time of the allocation of the image, a date and/or time of the last rebuild of the image, other information about the image, etc.).

As shown in FIG. 23B, step 2380 involves accessing a user selection of an operation associated with the plurality of computing resources. The user selection of the operation may be input via a GUI (e.g., 165, 175, 185, 195, 1800, 1900, 2000, 2100, 2200, etc.) in one embodiment. Additionally, the operation selected in step 2380 may include saving an image, reversion to a previously-saved image, restarting of an instance, restarting of an image, sharing of an instance, sharing of an image, deleting an image, creating an image, copying of an image, some combination thereof, etc.

Step 2390 involves communicating a request to the at least one cloud provider and/or at least one data center to perform the operation (e.g., associated with the user selection of step 2380) with respect to the plurality of computing resources. Step 2390 may be performed in response to step 2380 in one embodiment. Additionally, the request may be communicated from an intermediary component (e.g., 110, access component 116 of intermediary component 110, etc.) to the at least one cloud provider (e.g., 120, 130, 140, etc.) and/or at least one data center (e.g., 150, etc.).

Monitoring Usage of Computing Resources Provisioned Across at Least One Cloud Provider and/or at Least One Data Center Turning back to FIG. 1, usage monitoring component 118 of intermediary component 110 may be used to monitor usage of computing resources (e.g., a processing resource, a storage resource, a network resource, an operating system, a software application, a software application configuration, state data, another type of data, some combination thereof, etc.) provisioned across at least one cloud provider (e.g., 120, 130, 140, etc.) and/or at least one data center (e.g., 150, etc.). In one embodiment, usage monitoring component 118 may monitor access by at least one user (e.g., 160, 170, 180, etc.) to the provisioned computing resources which is provided by another component (e.g., access component 116) of intermediary component 110. Usage monitoring component 118 may monitor access to the provisioned computing resources by at least one user (e.g., 160, 170, 180, etc.) as defined by account management component 114. And in one embodiment, usage monitoring component 118 may monitor access to the computing resources which are provisioned using provisioning component 112.

In one embodiment, usage monitoring component 118 may be used to monitor access (e.g., provided using access component 116) to computing resources provisioned across at least one cloud provider and/or at least one data center which utilize at least two different technologies or virtual machine representations for implementing one or more virtual machines. For example, cloud provider 120 may utilize a virtual machine representation from VMWare to provide computing resources for the cloud computing environment (e.g., 200 of FIG. 2), while cloud provider 130 may utilize an open source virtual machine representation such as Xen to provide computing resources for the cloud computing environment (e.g., 200 of FIG. 2).

Figure 24:
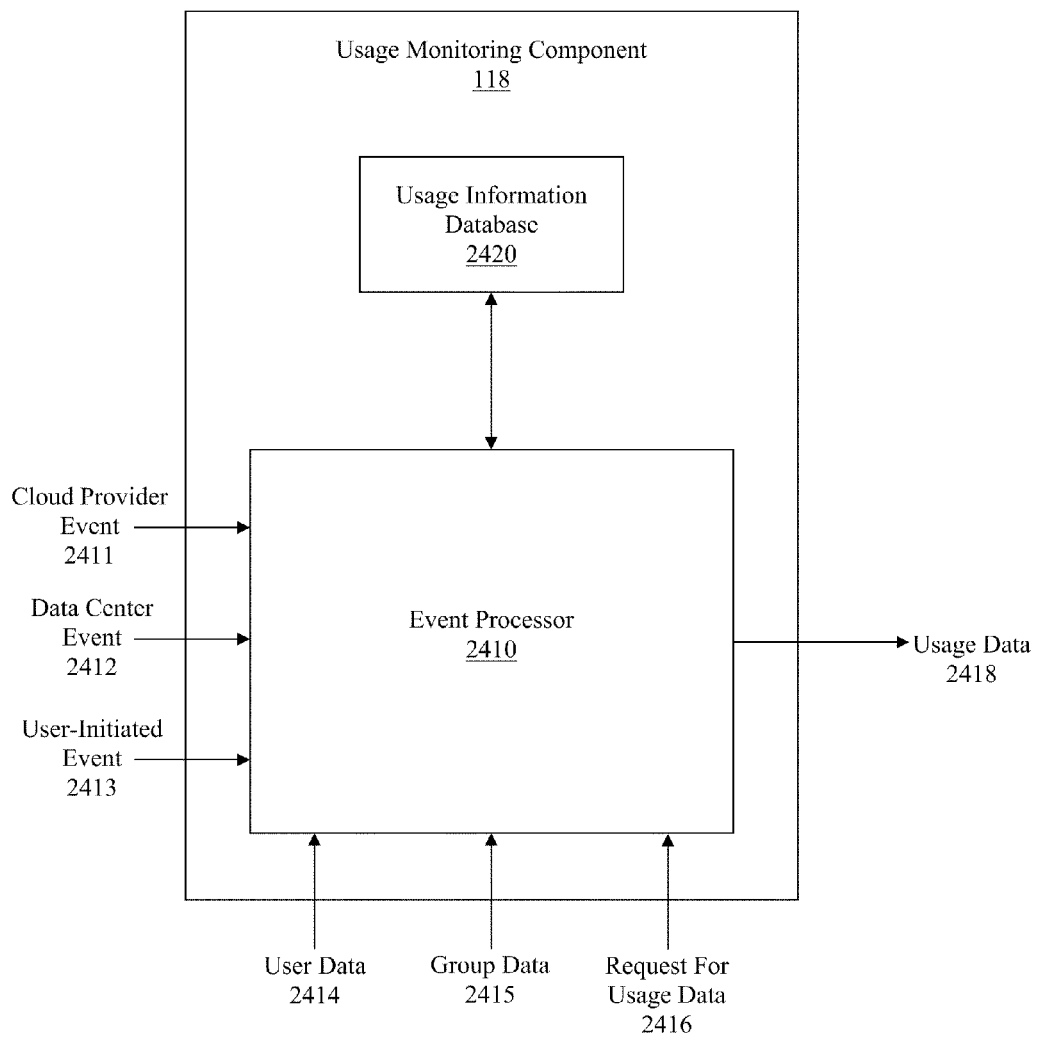
FIG. 24 shows an exemplary usage monitoring component in accordance with one embodiment of the present invention.

FIG. 24 shows exemplary usage monitoring component 118 in accordance with one embodiment of the present invention. As shown in FIG. 24, usage monitoring component 118 includes event processor 2410 and usage information database 2420, where usage information database 2420 may be used by event processor 2410 to keep track of the usage of computing resources provisioned across at least one cloud provider and/or at least one data center. For example, event processor 2410 may update usage information database 2420 based on one or more events, where the events may include a cloud provider event (e.g., 2411), a data center event (e.g., 2412), a user-initiated event (e.g., 2413), some combination thereof, etc. Usage information may be accessed from usage information database 2420 by event processor 2410 and processed to generate usage data (e.g., 2418), where the usage data (e.g., 2418) may be output from usage monitoring component 118 for display (e.g., using a GUI such as GUI 165, 175, 185, 195, etc.). In this manner, usage of computing resources provisioned across at least one cloud provider (e.g., 120, 130, 140, etc.) and/or at least one data center (e.g., 150, etc.) may be monitored and/or tracked.

A cloud provider event (e.g., 2411) may be any event occurring at or otherwise communicated from a cloud provider (e.g., 120, 130, 140, etc.), while a data center event (e.g., 2412) may be any event occurring at or otherwise communicated from a data center (e.g., 150, etc.). In one embodiment, a cloud provider event (e.g., 2411) and/or data center event (e.g., 2412) may be a change in status (e.g., booting, running, shutting down, terminated, etc.) of one or more provisioned computing resources. Additionally, a user-initiated event (e.g., 2413) may include any interaction of a user (e.g., 160, 170, 180, etc.) with a user interface (e.g., GUI 165, 175, 185, etc.) which is associated with accessing the provisioned computing resources. For example, a user-initiated event (e.g., 2413) may include a request to start one or more provisioned computing resources, a request to stop one or more provisioned computing resources, etc.

Figure 25A:
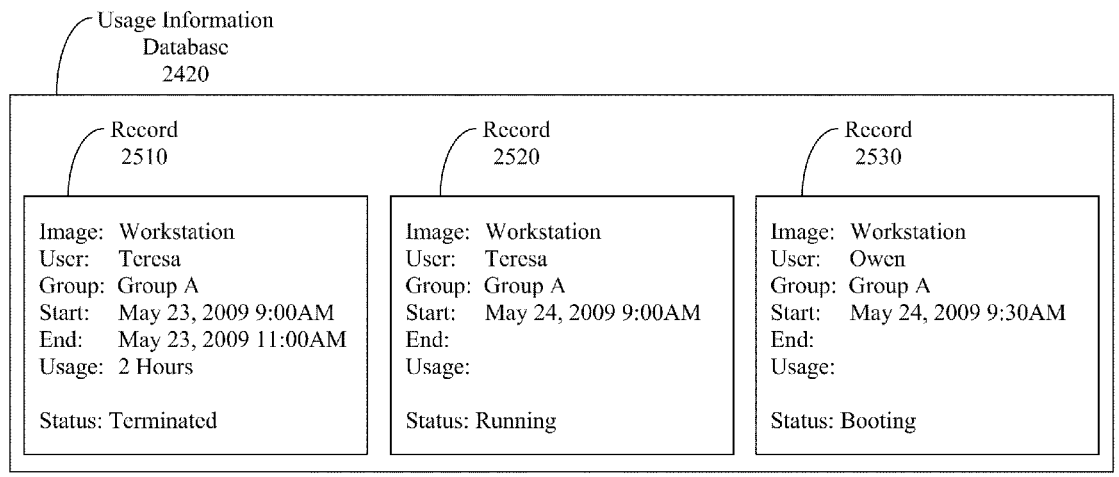
FIG. 25A shows an exemplary usage information database in accordance with one embodiment of the present invention.
Figure 25B:
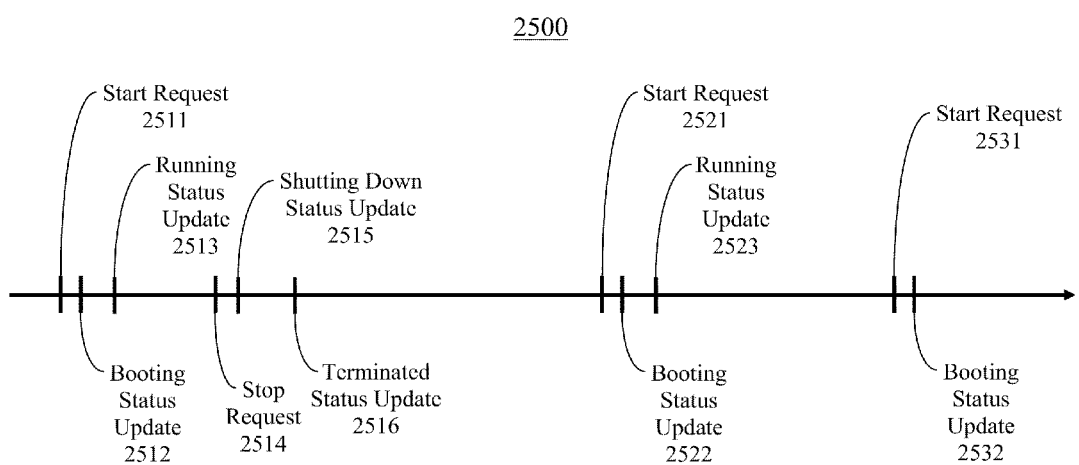
FIG. 25B shows an exemplary timeline which includes events used to update a usage information database in accordance with one embodiment of the present invention.

FIG. 25A shows exemplary usage information database 2420 in accordance with one embodiment of the present invention, while FIG. 25B shows exemplary timeline 2500 which includes events used to update usage information database 2420 in accordance with one embodiment of the present invention. As shown in FIG. 25A, usage information may be organized within usage information database 2420 as records (e.g., 2510, 2520, 2530, etc.). Each record may correspond to and be updated (e.g., by event processor 2410) in response to one or more respective events (e.g., as shown on timeline 2500). For example, events 2511 through 2516 may correspond to and be used to update record 2510, events 2521 through 2523 may correspond to and be used to update record 2520, and events 2531 through 2532 may correspond to and be used to update record 2530.

Each record within usage information database 2420 may include various types of information. For example, the usage data may include an identification of and/or a function performed by the provisioned computing resources associated with a record (e.g., "workstation" as indicated by the "Image" field of record 2510), a user associated with a record (e.g., "Teresa" as indicated by the "User" field of record 2510), a group of computing resources associated with a record (e.g., "Group A" as indicated by the "Group" field of record 2510), or some combination thereof. Additionally, the usage data may include an identification of a start time for the provisioned computing resources associated with a record (e.g., "May 23, 2009 9:00 AM" as indicated by the "Start" field of record 2510), an end time for the provisioned computing resources associated with a record (e.g., "May 23, 2009 11:00 AM" as indicated by the "End" field of record 2510), a usage quantity for the provisioned computing resources associated with a record (e.g., "2 Hours" as indicated by the "Usage" field of record 2510), some combination thereof, etc. Further, the usage data may include a status for the provisioned computing resources associated with a record (e.g., "Terminated" as indicated by the "Status" field of record 2510).

In one embodiment, the information within usage information database 2420 may be updated (e.g., by event processor 2410) in response to and/or based on events (e.g., included in timeline 2500) related to usage of the provisioned computing resources. For example, a record (e.g., 2510) may be created within usage information database 2420 in response to a corresponding start request (e.g., 2511). The start time for the provisioned computing resources associated with a record (e.g., "May 23, 2009 9:00 AM" as indicated by the "Start" field of record 2510) may be updated in response to and/or based on a time associated with the corresponding start request (e.g., 2511), a time associated with the corresponding booting status update (e.g., 2512), a time associated with the corresponding running status update (e.g., 2513), etc. Additionally, the end time for the provisioned computing resources associated with a record (e.g., "May 23, 2009 11:00 AM" as indicated by the "End" field of record 2510) may be updated in response to and/or based on a time associated with the corresponding stop request (e.g., 2514), a time associated with the corresponding shutting down status update (e.g., 2515), a time associated with the corresponding terminated status update (e.g., 2516), etc. And in one embodiment, the start time and/or end time may be used to update the usage quantity for the provisioned computing resources associated with a record (e.g., "2 Hours" as indicated by the "Usage" field of record 2510). For example, the difference between the start time and end time may be determined (e.g., by event processor 2410) and used to update the usage quantity.

As another example, the status for the provisioned computing resources associated with a record (e.g., "Terminated" as indicated by the "Status" field of record 2510) may be updated in response to and/or based on a type of status update event accessed or detected. For example, if a booting status update (e.g., 2532) is detected, then the status for the provisioned computing resources associated with a record may be changed to "Booting" (e.g., as shown in the "Status" field of record 2530). If a running status update (e.g., 2513) is detected, then the status for the provisioned computing resources associated with a record may be changed to "Running" (e.g., as shown in the "Status" field of record 2520). If a shutting down status update (e.g., 2515) is detected, then the status for the provisioned computing resources associated with a record may be changed to "Shutting Down." If a terminated status update (e.g., 2516) is detected, then the status for the provisioned computing resources associated with a record may be changed to "Terminated" (e.g., as shown in the "Status" field of record 2510). In this manner, records in usage information database 2420 may be kept up-to-date to more accurately reflect the status of provisioned computing resources at any given time.

In one embodiment, the information within usage information database 2420 may be updated (e.g., by event processor 2410) in real-time. Event processor 2410 may access events (e.g., 2411, 2412, 2413, etc.) in real-time and dynamically update usage information database 2420. In this manner, usage monitoring component 118 may perform dynamic or real-time monitoring and/or tracking of usage of computing resources provisioned across at least one cloud provider (e.g., 120, 130, 140, etc.) and/or at least one data center (e.g., 150, etc.).

As shown in FIG. 25B, start requests (e.g., 2511, 2521, 2531, etc.) and stop requests (e.g., 2514) may be user-initiated events (e.g., 2413). For example, a start request may be initiated by a user interaction with element 1920 of GUI 1900, element 2120 of GUI 2100, etc. Alternatively, a stop request may be initiated by a user interaction with element 1995 of GUI 1900, element 2195 of GUI 2100, etc.

Timeline 2500 may also include status update events which refer to the status of the provisioned computing resources at any given time, where each status update event may be a cloud provider event (e.g., 2411) or a data center event (e.g., 2412). For example, the computing resources may be booting (e.g., as indicated by booting status updates 2512, 2522 and 2532), running (e.g., as indicated by running status updates 2513 and 2523), shutting down (e.g., as indicated by shutting down status update 2515), terminated (e.g., as indicated by terminated status update 2516), etc. In one embodiment, a booting status update (e.g., 2512, 2522, 2532, etc.) may occur after a start request (e.g., 2511, 2521, 2531, etc.) since the provisioned computing resources may be booted in response to a request to start the provisioned computing resources. Additionally, a shutting down status update (e.g., 2515, etc.) may occur after a stop request (e.g., 2514, etc.) since the provisioned computing resources may be shut down in response to a request to stop the provisioned computing resources.

Turning back to FIG. 24, event processor 2410 may access information identifying a user (e.g., user data 2414) and/or group of computing resources (e.g., group data 2415) associated with an event (e.g., cloud provider event 2411, data center event 2412, user-initiated event 2413, etc.). The group of computing resources identified by group data 2415 may include one or more projects, one or more environments (e.g., 200), one or more virtual machines (e.g., 210, 220, 230, etc.), some combination thereof, etc. The information (e.g., 2414, 2415, etc.) may be accessed from another component of intermediary component 110 (e.g., from provisioning component 112, user account management component 114, access component 116, some combination thereof, etc.). In one embodiment, the data may be used to update usage information database 2420. For example, a user associated with a record (e.g., "Teresa" as indicated by the "User" field of record 2510) may be determined using user data 2414, while a group of computing resources associated with a record (e.g., "Group A" as indicated by the "Group" field of record 2510) may be determined using group data 2415.

The user data (e.g., 2414) and/or group data (e.g., 2415) may be used to monitor and/or track usage of computing resources provisioned across at least one cloud provider (e.g., 120, 130, 140, etc.) and/or at least one data center (e.g., 150, etc.) by user and/or by group of computing resources (e.g., one or more projects, one or more environments, one or more virtual machines, some combination thereof, etc.). For example, the user data (e.g., 2414) may be used to organize the usage data (e.g., 2418) into respective portions corresponding to each user, thereby enabling monitoring and/or tracking of usage by user (e.g., as discussed with respect to FIG. 26). As another example, the group data (e.g., 2415) may be used to organize the usage data (e.g., 2418) into respective portions corresponding to each group of computing resources (e.g., project, environment, virtual machine, some combination thereof, etc.), thereby enabling monitoring and/or tracking of usage by group of computing resources (e.g., as discussed with respect to FIG. 27).

Figure 26:
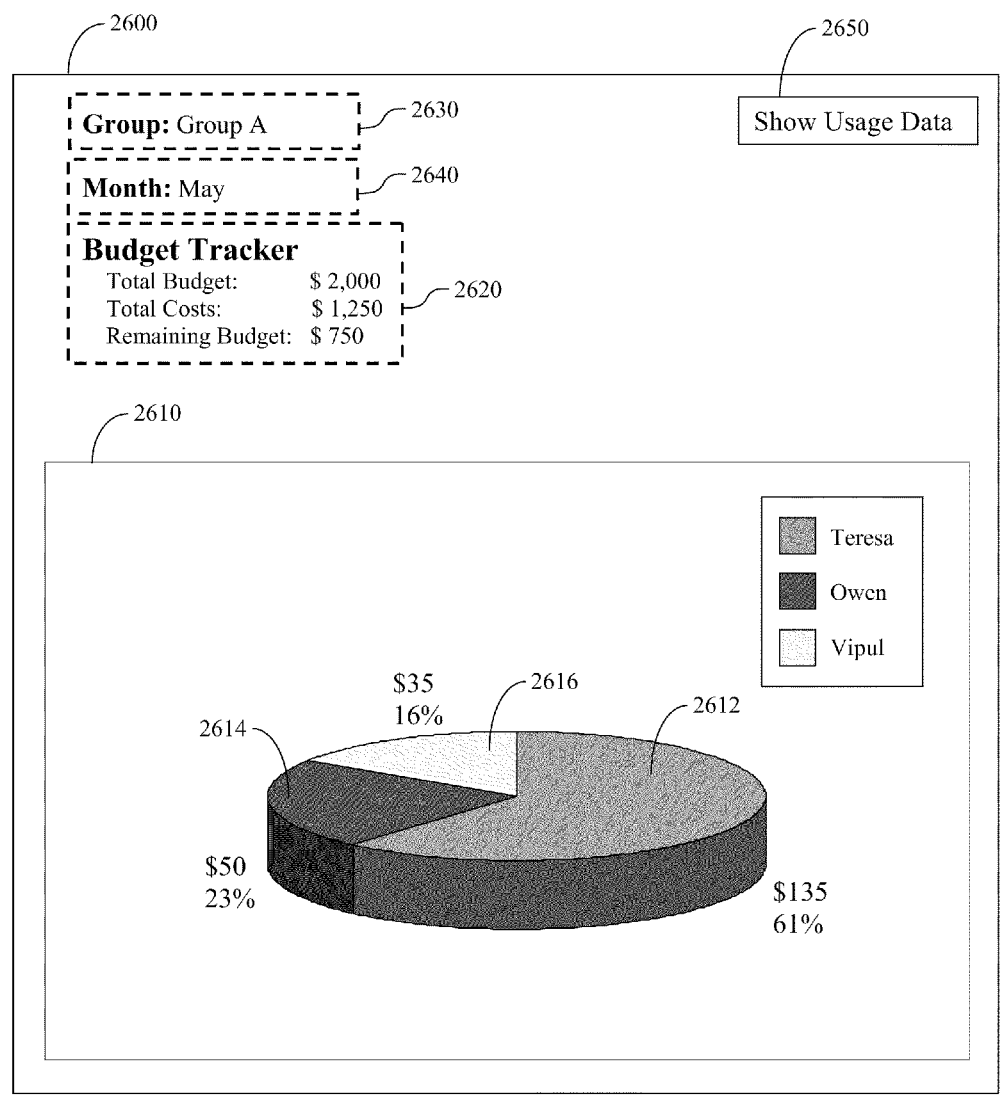
FIG. 26 shows an exemplary on-screen graphical user interface for presenting usage data monitored and/or tracked by user in accordance with one embodiment of the present invention.

FIG. 26 shows exemplary on-screen graphical user interface 2600 for presenting usage data monitored and/or tracked by user in accordance with one embodiment of the present invention. As shown in FIG. 26, region 2610 includes a plurality of portions of usage data (e.g., 2418), where each portion corresponds to a respective user. For example, portion 2612 represents usage data corresponding to a first user (e.g., "Teresa"), portion 2614 represents usage data corresponding to a second user (e.g., "Owen"), and portion 2616 represents usage data corresponding to a third user (e.g., "Vipul"). In this manner, region 2610 may be used to convey the relative usage of a plurality of users of computing resources provisioned across at least one cloud provider (e.g., 120, 130, 140, etc.) and/or at least one data center (e.g., 150, etc.).

In one embodiment, the usage data displayed in region 2610 may be associated with the group of computing resources (e.g., one or more projects, one or more environments, one or more virtual machines, some combination thereof, etc.) displayed in region 2630 (e.g., "Group A"). The usage data displayed in region 2610 may be associated with the period of time displayed in region 2640 (e.g., "May"). As such, in one embodiment, regions 2630 and/or 2640 may be used to alter the usage data displayed in region 2610 by selecting a different group of computing resources (e.g., using region 2630) or a different period of time (e.g., using region 2640).

As shown in FIG. 26, region 2620 includes budget information associated with the usage data displayed in region 2610. For example, region 2620 may include a total budget (e.g., for the group of computing resources displayed in or selected using region 2630), total costs (e.g., based on the total usage of the provisioned computing resources by all users), and a remaining budget (e.g., determined based on the difference between the total budget and total costs). Alternatively, the information displayed in region 2620 may be related to the period of time displayed in region 2640 (e.g., costs for that period of time, a daily budget for that period of time, etc.). In this manner, region 2620 may be used to perform budget tracking (e.g., defined or configured using element 624 of GUI 600, etc.) for a particular group of computing resources.

In one embodiment, GUI 2600 may be used to display usage data (e.g., 2418) in real-time. As such, the relative size, number, etc. of the portions of usage data displayed in region 2610 of GUI 2600 may be dynamically updated to reflect continued or real-time usage of the computing resources provisioned across at least one cloud provider (e.g., 120, 130, 140, etc.) and/or at least one data center (e.g., 150, etc.). Additionally, the budget information displayed in region 2620 may be dynamically updated to reflect continued or real-time usage of the computing resources provisioned across at least one cloud provider (e.g., 120, 130, 140, etc.) and/or at least one data center (e.g., 150, etc.).

As shown in FIG. 26, interaction with element 2650 may enable a user to initiate a request for usage data. For example, a user interaction with element 2650 may generate request for usage data 2416 (e.g., shown in FIG. 24) which may be accessed by event processor 2410. Event processor 24 may generate usage data 2418 in response thereto for display (e.g., using GUI 2600, etc.). In this manner, a user may use element 2650 to initiate an initial display (e.g., using GUI 2600, etc.) of usage data, refresh an existing display of usage data, etc.

Although the usage data in FIG. 26 is represented in units of dollars, it should be appreciated that the usage data may be represented in other units (e.g., other currencies, units of time, etc.) in other embodiments. Additionally, although a pie chart is used to represent the usage data in FIG. 26, it should be appreciated that the usage data may be alternatively represented in other embodiments. For example, the usage data may be represented using a different type of graph or chart, as numbers in a table, etc.

Figure 27:
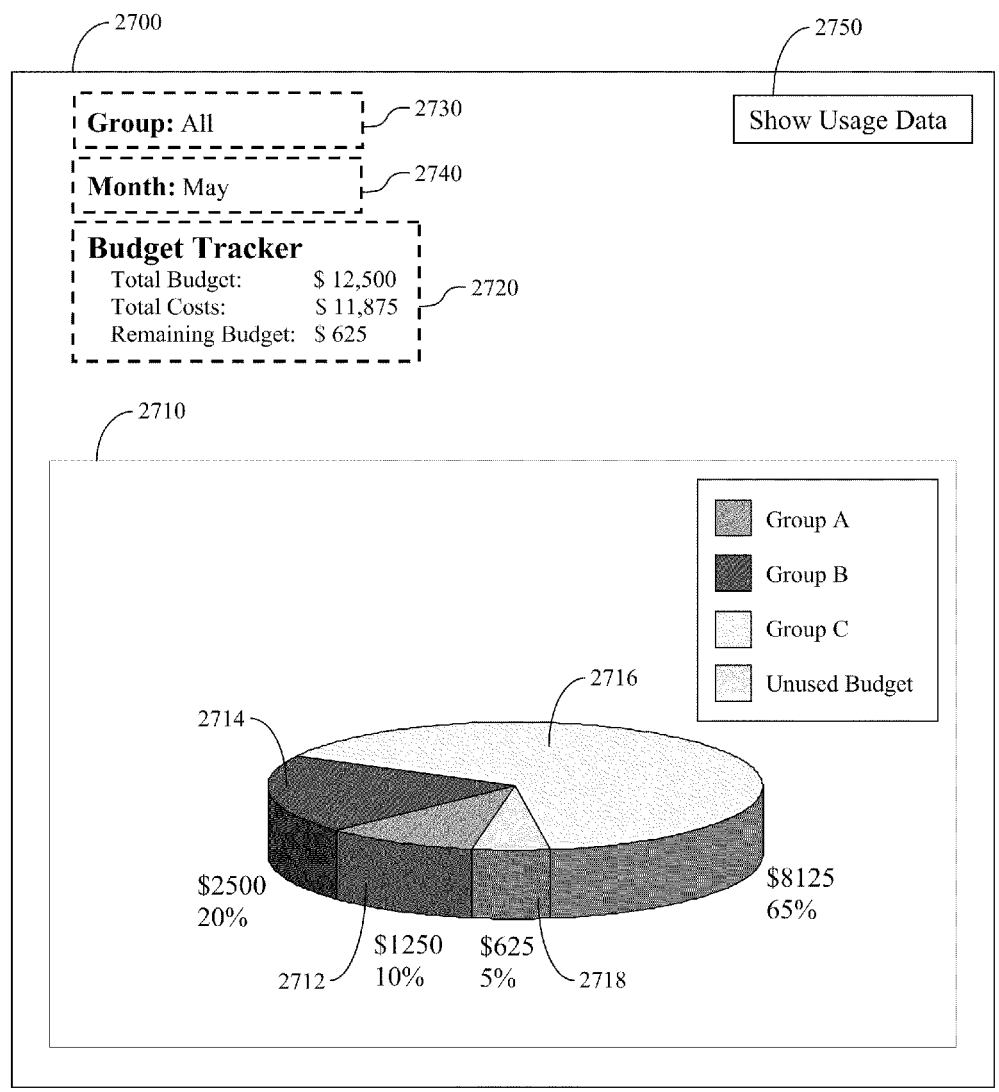
FIG. 27 shows an exemplary on-screen graphical user interface for presenting usage data monitored and/or tracked by group of computing resources in accordance with one embodiment of the present invention.

FIG. 27 shows exemplary on-screen graphical user interface 2700 for presenting usage data monitored and/or tracked by group of computing resources in accordance with one embodiment of the present invention. As shown in FIG. 27, region 2710 includes a plurality of portions of usage data (e.g., 2418), where each portion corresponds to a respective group of computing resources (e.g., one or more projects, one or more environments, one or more virtual machines, some combination thereof, etc.). For example, portion 2712 represents usage data corresponding to a first group of computing resources (e.g., "Group A"), portion 2714 represents usage data corresponding to a second group of computing resources (e.g., "Group B"), and portion 2716 represents usage data corresponding to a third group of computing resources (e.g., "Group C"). Additionally, portion 2718 represents unused budget (e.g., which may be used by Group A, Group B, Group C, or some other group of computing resources). In this manner, region 2710 may be used to convey the relative usage of a plurality of groups of computing resources which are provisioned across at least one cloud provider (e.g., 120, 130, 140, etc.) and/or at least one data center (e.g., 150, etc.).

In one embodiment, the usage data displayed in region 2710 may be associated with the period of time displayed in region 2740 (e.g., the month of "May"). As such, region 2740 may be used to alter the usage data displayed in region 2710 by selecting a different period of time.

As shown in FIG. 27, region 2720 includes budget information associated with the usage data displayed in region 2710. For example, region 2720 may include a total budget (e.g., for all groups of computing resources for which usage data is displayed in region 2710), total costs (e.g., based on the total usage of the provisioned computing resources of all the groups of computing resources), and a remaining budget (e.g., determined based on the difference between the total budget and total costs). Alternatively, the information displayed in region 2720 may be related to the period of time displayed in region 2740 (e.g., costs for that period of time, a daily budget for that period of time, etc.). In this manner, region 2720 may be used to perform budget tracking (e.g., defined or configured using element 624 of GUI 600, etc.) for a plurality of groups of computing resources.

In one embodiment, GUI 2700 may be used to display usage data (e.g., 2418) in real-time. As such, the relative size, number, etc. of the portions of usage data displayed in region 2710 of GUI 2700 may be dynamically updated to reflect continued or real-time usage of the computing resources provisioned across at least one cloud provider (e.g., 120, 130, 140, etc.) and/or at least one data center (e.g., 150, etc.). Additionally, the budget information displayed in region 2720 may be dynamically updated to reflect continued or real-time usage of the computing resources provisioned across at least one cloud provider (e.g., 120, 130, 140, etc.) and/or at least one data center (e.g., 150, etc.).

As shown in FIG. 27, interaction with element 2750 may enable a user to initiate a request for usage data. For example, a user interaction with element 2750 may generate request for usage data 2416 (e.g., shown in FIG. 24) which may be accessed by event processor 2410. Event processor 24 may generate usage data 2418 in response thereto for display (e.g., using GUI 2700, etc.). In this manner, a user may use element 2750 to initiate an initial display (e.g., using GUI 2700, etc.) of usage data, refresh an existing display of usage data, etc.

Although the usage data in FIG. 27 is represented in units of dollars, it should be appreciated that the usage data may be represented in other units (e.g., other currencies, units of time, etc.) in other embodiments. Additionally, although a pie chart is used to represent the usage data in FIG. 27, it should be appreciated that the usage data may be alternatively represented in other embodiments. For example, the usage data may be represented using a different type of graph or chart, using numbers in a table, etc. As another example, portion 2718 may be omitted and the usage data may reflect only the respective costs for each group of computing resources.

Figure 28:
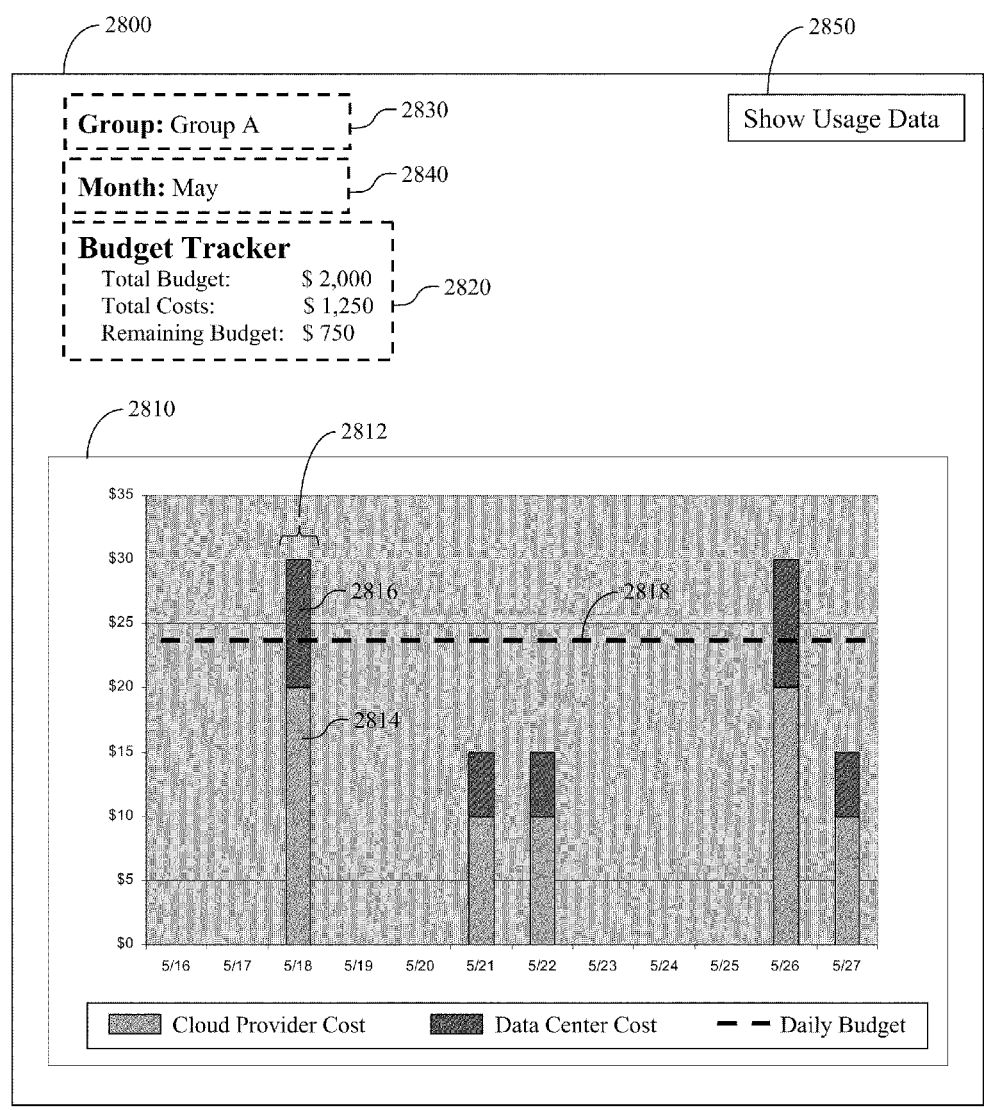
FIG. 28 shows an exemplary on-screen graphical user interface for presenting usage data for a particular group of computing resources in accordance with one embodiment of the present invention.

FIG. 28 shows exemplary on-screen graphical user interface 2800 for presenting usage data for a particular group of computing resources in accordance with one embodiment of the present invention. As shown in FIG. 28, region 2810 includes usage data for a particular group of computing resources (e.g., "Group A" as indicated in region 2830). The group of computing resources may include one or more projects, one or more environments (e.g., 200), one or more virtual machines (e.g., 210, 220, 230, etc.), some combination thereof, etc. The usage data displayed in region 2810 may be displayed in response to a user interaction with another user interface (e.g., portion 2712 of GUI 2700, etc.), a region of GUI 2800 (e.g., by entering or selecting another group of computing resources using region 2830), etc.

Additionally, the usage day displayed in region 2810 may include usage data for a particular period of time (e.g., the month of "May" as indicated in region 2840). Region 2840 may be used to enter or select another period of time (e.g., another month, a week, a year, etc.), where the usage data displayed in region 2810 may be refreshed to display usage data for the new period of time in one embodiment.

As shown in FIG. 28, the usage data displayed in region 2810 may show the relative usage of computing resources provisioned on at least one cloud provider and at least one data center for a given period of time. For example, first portion 2814 of column 2812 may represent usage of computing resources provisioned on at least one cloud provider for a particular day (e.g., "May 18"), while second portion 2816 of column 2812 may represent usage of computing resources provisioned on at least one data center for the particular day (e.g., "May 18"). In this manner, region 2810 may be used to monitor and/or compare cloud provider use versus data center use for a particular group of computing resources (e.g., identified in region 2830) during a particular period of time.

Region 2810 may also show a budget limit for a particular period of time. For example, column 2812 shows a usage of $30 for the day of May 18 which exceeds the daily budget limit of $24 as indicated by dashed line 2818. In this manner, region 2810 may be used to perform budget tracking for a particular group of computing resources (e.g., identified in region 2830).

As shown in FIG. 28, region 2820 includes budget information associated with the usage data displayed in region 2810. For example, region 2820 may include a total budget (e.g., for the group of computing resources displayed in or selected using region 2830), total costs (e.g., based on the total usage of the provisioned computing resources by all users), and a remaining budget (e.g., determined based on the difference between the total budget and total costs). Alternatively, the information displayed in region 2820 may be related to the period of time displayed in region 2840 (e.g., costs for that period of time, a daily budget for that period of time, etc.). In this manner, region 2820 may be used to perform budget tracking (e.g., defined or configured using element 624 of GUI 600, etc.) for a particular group of computing resources.

In one embodiment, GUI 2800 may be used to display usage data (e.g., 2418) in real-time. As such, the relative size, number, etc. of the portions of usage data displayed in region 2810 of GUI 2800 may be dynamically updated to reflect continued or real-time usage of the computing resources provisioned across at least one cloud provider (e.g., 120, 130, 140, etc.) and/or at least one data center (e.g., 150, etc.). Additionally, the budget information displayed in region 2820 may be dynamically updated to reflect continued or real-time usage of the computing resources provisioned across at least one cloud provider (e.g., 120, 130, 140, etc.) and/or at least one data center (e.g., 150, etc.).

As shown in FIG. 28, interaction with element 2850 may enable a user to initiate a request for usage data. For example, a user interaction with element 2850 may generate request for usage data 2416 (e.g., shown in FIG. 24) which may be accessed by event processor 2410. Event processor 24 may generate usage data 2418 in response thereto for display (e.g., using GUI 2800, etc.). In this manner, a user may use element 2850 to initiate an initial display (e.g., using GUI 2800, etc.) of usage data, refresh an existing display of usage data, etc.

Although the usage data in FIG. 28 is represented in units of dollars, it should be appreciated that the usage data may be represented in other units (e.g., other currencies, units of time, etc.) in other embodiments. Additionally, although a bar graph is used to represent the usage data in FIG. 28, it should be appreciated that the usage data may be alternatively represented in other embodiments. For example, the usage data may be represented using a different type of graph or chart, using numbers in a table, etc.

Figure 29:
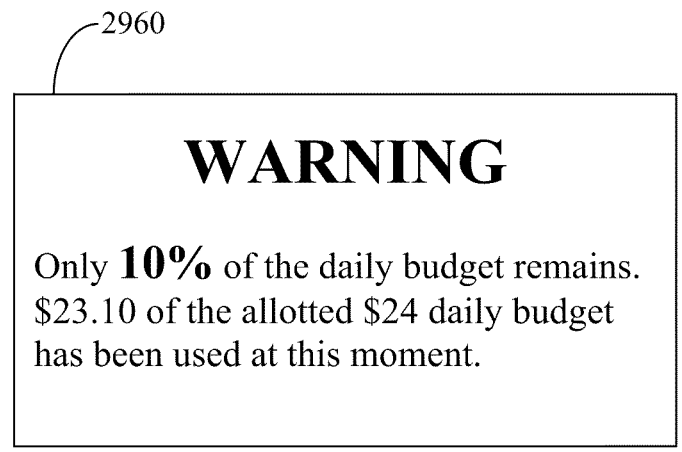
FIG. 29 shows an exemplary on-screen graphical user interface for presenting a notification in accordance with one embodiment of the present invention.

FIG. 29 shows exemplary on-screen graphical user interface 2900 for presenting a notification in accordance with one embodiment of the present invention. As shown in FIG. 29, GUI 2900 includes notification 2960. In one embodiment, notification 2960 may include a warning to a user (e.g., that a daily budget has been exceeded). In other embodiments, notification 2960 may include different information, where the different information may include text, images, video, etc.

Notification 2960 may be displayed automatically in response to detecting that costs (e.g., associated with one or more users, one or more groups of computing resources, etc.) has reached a predetermined threshold. The predetermined threshold may be, for example, 90% of the allotted budget (e.g., as indicated by dashed line 2818, as indicated by information displayed in a region such as region 2620, 2720, 2820, etc.) to provide adequate time for a user to address the situation (e.g., reduce costs to prevent the costs from exceeding a predefined budget limit, reduce costs to limit the amount that costs exceed a predefined budget limit, etc.).

It should be appreciated that GUI 2900 may be part of another GUI (e.g., 2600, 2700, 2800, etc.), and thus, notification 2960 may be displayed simultaneously with information (e.g., usage data, etc.) of the other GUI. Notification 2960 may overlap information displayed using another GUI in one embodiment. And in one embodiment, notification 2960 and/or GUI 2900 may be displayed in a separate window from another GUI (e.g., 2600, 2700, 2800, etc.), where the window including notification 2960 may be displayed alongside of, overlapping, etc., the window or windows including the other GUI (e.g., 2600, 2700, 2800, etc.).

Figure 30A:
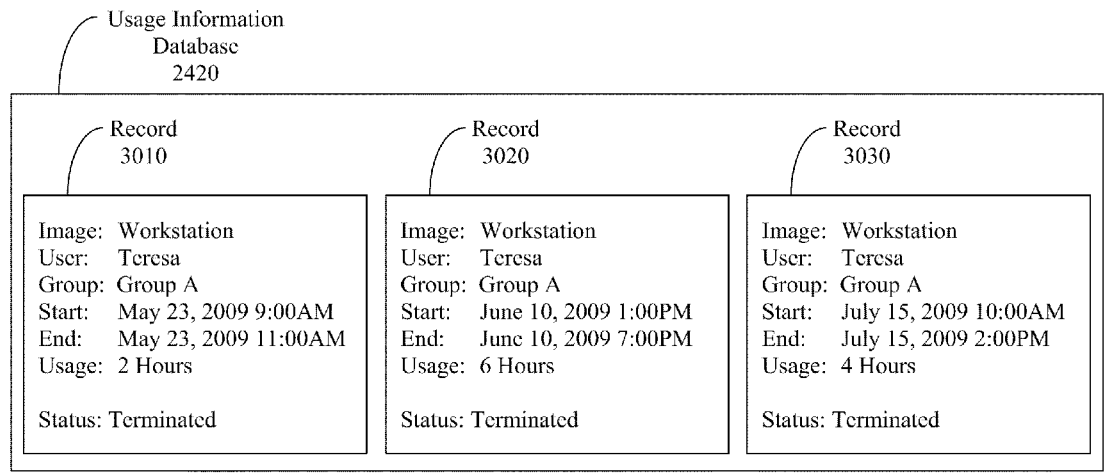
FIG. 30A shows an exemplary usage information database with historical data in accordance with one embodiment of the present invention.
Figure 30B:
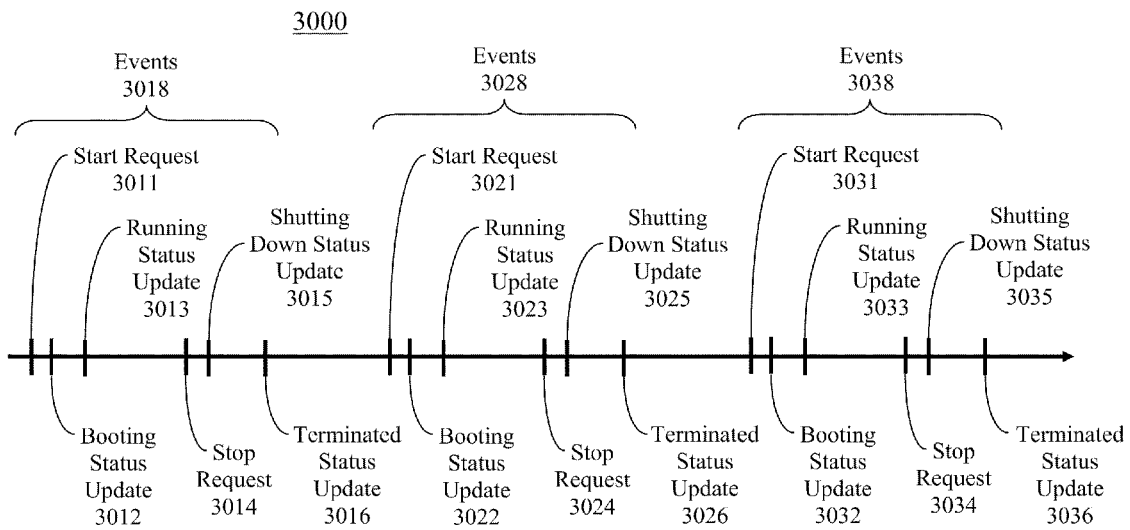
FIG. 30B shows an exemplary timeline which includes events used to generate the historical data in a usage information database in accordance with one embodiment of the present invention.

FIG. 30A shows exemplary usage information database 2420 with historical data in accordance with one embodiment of the present invention, while FIG. 30B shows exemplary timeline 3000 which includes events used to generate the historical data in usage information database 2420 in accordance with one embodiment of the present invention. As shown in FIG. 30A, events 3018 may be used to create and/or update record 3010, events 3028 may be used to create and/or update record 3020, and events 3038 may be used to create and/or update record 3030. In one embodiment, records 3010, 3020 and 3030 may each be associated with the same computing resources (e.g., used to implement a "Workstation" in "Group A"), where events 3028 occur before events 3038 and events 3018 occur before events 3028. In this manner, some or all of the events of timeline 3000 (e.g., events 3018, 3028, 3038, etc.) may be associated with previous usage of the computing resources (e.g., provisioned across at least one cloud provider and/or at least one data center), and thus, some or all of the records of usage information database 2040 may include historical data.

Events 3018 may include start request 3011, booting status update 3012, running status update 3013, stop request 3014, shutting down status update 3015, terminated status update 3016, some combination thereof, etc. Events 3028 may include start request 3021, booting status update 3022, running status update 3023, stop request 3024, shutting down status update 3025, terminated status update 3026, some combination thereof, etc. Events 3038 may include start request 3031, booting status update 3032, running status update 3033, stop request 3034, shutting down status update 3035, terminated status update 3036, some combination thereof, etc.

In one embodiment, creation and/or updating of records (e.g., 3010, 3020, 3030, etc.) in usage information database 2420 of FIG. 30A based on the events of timeline 3000 of FIG. 30B may be performed analogously to the creation and/or updating of records (e.g., 2510, 2520, 2530, etc.) in usage information database 2420 of FIG. 25A based on the events of timeline 2500 of FIG. 25B. Additionally, records 3010-3030 of FIG. 30 may include similar information to records 2510-2530 of FIG. 25. Further, in one embodiment, timeline 3000 may include similar events to timeline 2500. For example, each of events 3018 of timeline 3000 may correspond to a respective event of events 2511-2516 of timeline 2500.

Figure 31:
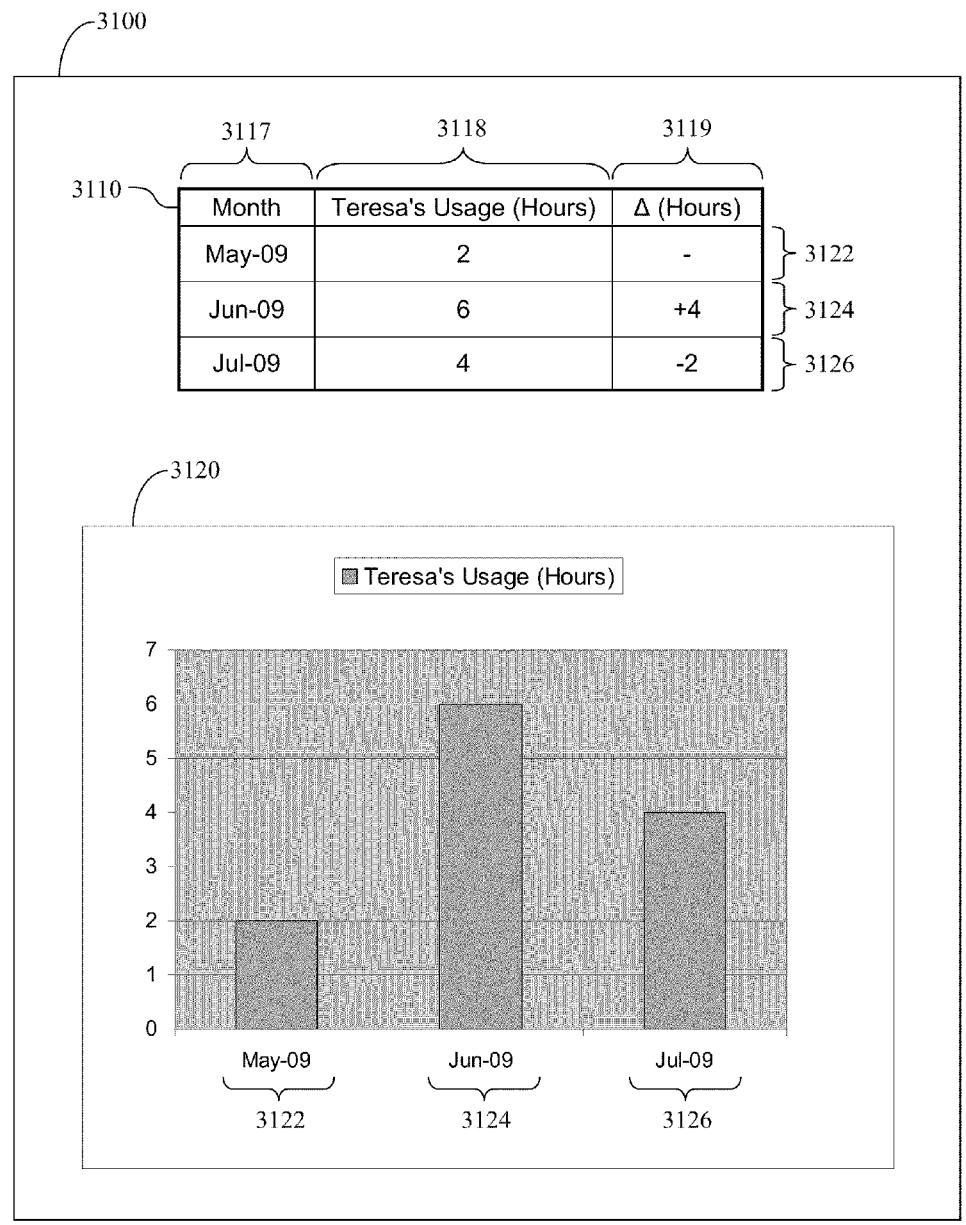
FIG. 31 shows an exemplary on-screen graphical user interface for presenting usage data including historical data in accordance with one embodiment of the present invention.

FIG. 31 shows exemplary on-screen graphical user interface 3100 for presenting usage data including historical data in accordance with one embodiment of the present invention. As shown in FIG. 31, region 3110 includes a table and region 3120 includes a bar chart, where regions 3110 and 3120 each include usage data tracked over a period of time (e.g., three months). The usage data in regions 3110 and 3120 may generated based on the information in usage information database 2420 (e.g., shown in FIG. 30A), and therefore, the usage data in regions 3110 and 3120 may include historical data associated with a previous usage of computing resources.

The data in column 3122 of region 3120 may correspond to the data in row 3112 of region 3110. The data in column 3124 of region 3120 may correspond to the data in row 3114 of region 3110. Additionally, the data in column 3126 of region 3120 may correspond to the data in row 3116 of region 3110.

As shown in FIG. 31, the usage data may include various types of historical data. For example, the historical data may be represented as a quantity of usage for a particular period of time. For example, column 3118 of region 3110 shows a respective usage for each month listed in column 3117. Alternatively, the historical data may be represented as a change in usage for one period of time to another. For example, column 3119 of region 3110 shows a respective change in usage from one month to the next (e.g., listed in column 3117). And in other embodiments, the historical data may be represented in other forms.

Although the usage data in FIG. 31 is represented in units of time, it should be appreciated that the usage data may be represented in other units (e.g., dollars, other currencies, etc.) in other embodiments. Additionally, although a table and bar chart are used to represent the usage data in FIG. 31, it should be appreciated that the usage data may be alternatively represented in other embodiments. For example, the usage data may be represented using a different type of graph or chart, a different type of table, etc.

One or more of the GUIs depicted in FIGS. 26, 27, 28, 29 and 31 may be generated by an access component (e.g., 116) and used to implement a GUI (e.g., 165, 175, 185, etc.) of at least one user (e.g., 160, 170, 180, etc.) in one embodiment. Additionally, it should be appreciated that one or more of the GUIs depicted in FIGS. 26, 27, 28, 29 and 31 may be part of the same user interface or part of at least one different user interface. Further, one or more of the GUIs depicted in FIGS. 26, 27, 28, 29 and 31 may be part of a user interface which also enables provisioning of computing resources across at least one cloud provider and/or at least one data center (e.g., in accordance with FIGS. 5 through 12), enables assignment of a permission level to one or more users governing access to computing resources provisioned across at least one cloud provider and/or at least one data center (e.g., in accordance with FIGS. 13 and 14), access to computing resources provisioned across at least one cloud provider and/or at least one data center (e.g., in accordance with FIGS. 16 to 23B), or some combination thereof.

Additionally, although FIG. 24 shows usage monitoring component 118 with a specific number of components (e.g., one event processor and one usage information database), it should be appreciated that usage monitoring component 118 may include a different number of components in other embodiments. For example, event processor 2410 may be replaced with multiple components (e.g., one for processing events and one for generating usage data). Further, although FIG. 24 depicts usage monitoring component 118 as accessing certain types of information and/or events, it should be appreciated that usage monitoring component 118 may access different types of information and/or events in other embodiments.

Figure 32:
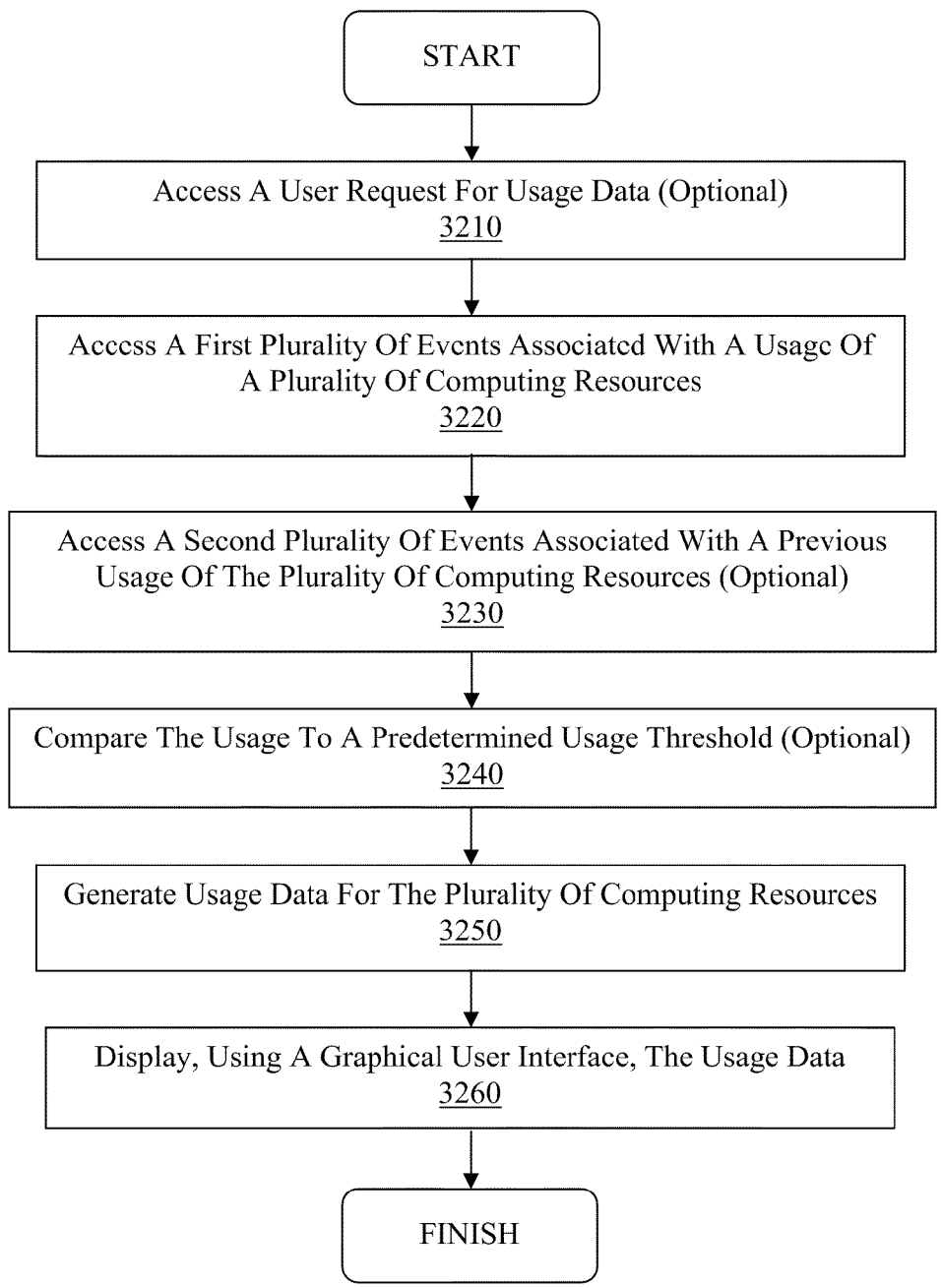
FIG. 32 shows a flowchart of an exemplary process for monitoring usage of a plurality of computing resources provisioned across at least one cloud provider and/or at least one data center in accordance with one embodiment of the present invention.

FIG. 32 shows a flowchart of exemplary process 3200 for monitoring usage of a plurality of computing resources provisioned across at least one cloud provider and/or at least one data center in accordance with one embodiment of the present invention. As shown in FIG. 32, step 3210 involves accessing a request for usage data. The request for usage data may be generated in response to a user interaction with a GUI (e.g., 165, 175, 185, 195, 2600, 2700, 2800, etc.). Additionally, the request for usage data (e.g., 2416) may be accessed in step 3210 by a component of usage monitoring component 118 (e.g., event processor 2410).

Step 3220 involves accessing a first plurality of events associated with a usage of a plurality of computing resources. The first plurality of events (e.g., shown in FIG. 25B as part of timeline 2500, shown in FIG. 30B as part of timeline 3000, etc.) accessed in step 3220 may include at least event associated with a cloud provider (e.g., cloud provider event 2411), at least one event associated with a data center (e.g., data center event 2412), at least one user interaction with a graphical user interface (e.g., user-initiated event 2413), some combination thereof, etc. The first plurality of events may include a request to start the plurality of computing resources (e.g., 2511, 2521, 2531, 3011, 3021, 3031, etc.), a request to stop the plurality of computing resources (e.g., 2514, 3014, 3024, 3034, etc.), a status change associated with the plurality of computing resources (e.g., a booting status update, a running status update, a shutting down status update, a terminated status update, etc.). Further, the first plurality of events may be accessed in step 3220 by a component of usage monitoring component 118 (e.g., event processor 2410).

As shown in FIG. 32, step 3230 involves accessing a second plurality of events associated with a previous usage of the plurality of computing resources. The second plurality of events (e.g., 3021-3026 as shown in FIG. 30B) accessed in step 3230 may occur before the first plurality of events (e.g., 3011-3016 as shown in FIG. 30B) accessed in step 3220. Additionally, the second plurality of events (e.g., shown in FIG. 25B as part of timeline 2500, shown in FIG. 30B as part of timeline 3000, etc.) accessed in step 3230 may include at least event associated with a cloud provider (e.g., cloud provider event 2411), at least one event associated with a data center (e.g., data center event 2412), at least one user interaction with a graphical user interface (e.g., user-initiated event 2413), some combination thereof, etc. The second plurality of events may include a request to start the plurality of computing resources (e.g., 2511, 2521, 2531, 3011, 3021, 3031, etc.), a request to stop the plurality of computing resources (e.g., 2514, 3014, 3024, 3034, etc.), a status change associated with the plurality of computing resources (e.g., a booting status update, a running status update, a shutting down status update, a terminated status update, etc.). Further, the first plurality of events may be accessed in step 3230 by a component of usage monitoring component 118 (e.g., event processor 2410).

The plurality of computing resources (e.g., associated with the first plurality of events accessed in step 3220 and/or the second plurality of events accessed in step 3230) may be provisioned across at least one cloud provider (e.g., 120, 130, 140, etc.) and/or at least one data center (e.g., 150). The plurality of computing resources (e.g., associated with the first plurality of events accessed in step 3220 and/or the second plurality of events accessed in step 3230) may include at least one processing resource, at least one storage resource, at least one network resource, at least one operating system, at least one software application, at least one software application configuration, state data, another type of data, some combination thereof, etc. And in one embodiment, the plurality of computing resources (e.g., associated with the first plurality of events accessed in step 3220 and/or the second plurality of events accessed in step 3230) may be associated with an image, an instance of an image, a particular virtual machine of a cloud computing environment (e.g., 200), a plurality of virtual machines of a cloud computing environment (e.g., 200), some combination thereof, etc.

As shown in FIG. 32, step 3240 involves comparing the usage (e.g., associated with the first plurality of events accessed in step 3220 and/or the second plurality of events accessed in step 3230) to a predetermined usage threshold. The predetermined usage threshold may be set (e.g., using element 624 of GUI 600) during provisioning of the plurality of computing resources in one embodiment. Additionally, the comparison performed in step 3240 may be performed by a component of usage monitoring component 118 (e.g., event processor 2410).

Step 3250 involves generating usage data for the plurality of computing resources. In one embodiment, the usage data (e.g., 2418) may be generated based upon the first plurality of events (e.g., accessed in step 3220). In another embodiment, the usage data (e.g., 2418) may be generated based upon the second plurality of events (e.g., accessed in step 3230), and therefore, step 3250 may involve generating the usage data which includes historical data associated with a previous usage of the plurality of computing resources. In one embodiment, if it is determined that the usage is greater than the predetermined usage threshold in step 3240, step 3250 may involve generating usage data which includes a notification (e.g., 2960) of the usage exceeding the predetermined usage threshold. Additionally, the usage data may be generated in step 3250 by a component of usage monitoring component 118 (e.g., event processor 2410).

As shown in FIG. 32, step 3260 involves displaying the usage data (e.g., generated in step 3250) using a graphical user interface (e.g., GUI 165, 175, 185, 195, 2600, 2700, 2800, etc.). In one embodiment, step 3260 may involve displaying (e.g., using GUI 3100 of FIG. 31) usage data which includes historical data (e.g., as generated in step 3250). Step 3260 may involve displaying (e.g., using GUI 2900 of FIG. 29) usage data which includes a notification (e.g., as generated in step 3250) in one embodiment.

In one embodiment, the usage data generated in step 3250 and/or displayed in step 3260 may be associated with one or more users. For example, the first plurality of events (e.g., accessed in step 3220) and/or the second plurality of events (e.g., accessed in step 3230) may be associated with a plurality of users, where each portion of a plurality of portions of the usage data may correspond to a respective user of the plurality of users (e.g., as shown in FIG. 26). The usage data may be assigned to or associated with the appropriate user based on user information associated with each event (e.g., user data 2414).

The usage data generated in step 3250 and/or displayed in step 3260 may be associated with one or more groups of computing resources. For example, the first plurality of events (e.g., accessed in step 3220) and/or the second plurality of events (e.g., accessed in step 3230) may be associated with a plurality of groups of computing resources, where each portion of a plurality of portions of the usage data may correspond to a respective group of computing resources of the plurality of groups of computing resources (e.g., as shown in FIG. 27). The usage data may be assigned to or associated with the appropriate group of computing resources based on group information associated with each event (e.g., group data 2415).

Figure 33:
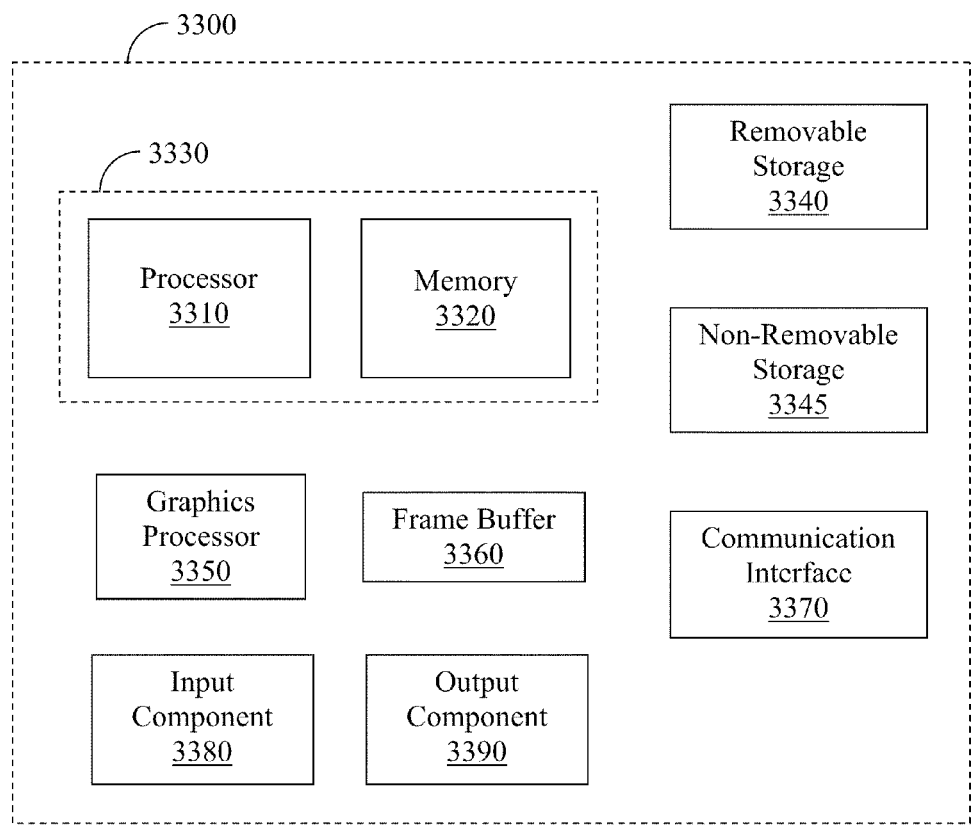
FIG. 33 shows an exemplary general purpose computer system platform upon which embodiments of the present invention may be implemented.

FIG. 33 shows exemplary general purpose computer system platform 3300 upon which embodiments of the present invention may be implemented. For example, computer system 3300 may be used to implement one or more components of system 100 of FIG. 1.

As shown in FIG. 33, portions of the present invention are comprised of computer-readable and computer-executable instructions that reside, for example, in computer system platform 3300 and which may be used as a part of a general purpose computer network (not shown). It is appreciated that computer system platform 3300 of FIG. 33 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 3330, computer system platform 3300 may comprise at least one processor 3310 and at least one memory 3320. Processor 3310 may comprise a central processing unit (CPU) or other type of processor. Depending on the configuration and/or type of computer system environment, memory 3320 may comprise volatile memory (e.g., RAM), non-volatile memory (e.g., ROM, flash memory, etc.), or some combination of the two. Additionally, memory 3320 may be removable, non-removable, etc.

In other embodiments, computer system platform 3300 may comprise additional storage (e.g., removable storage 3340, non-removable storage 3345, etc.). Removable storage 3340 and/or non-removable storage 3345 may comprise volatile memory, non-volatile memory, or any combination thereof. Additionally, removable storage 3340 and/or non-removable storage 3345 may comprise CD-ROM, digital versatile disks (DVD) or other optical storage, magnetic cassettes, magnetic tape, magnetic disk storage or other magnetic storage devices, or any other medium which can be used to store information for access by computer system platform 3300.

As shown in FIG. 33, computer system platform 3300 may communicate with other systems, components, or devices via communication interface 3370. Communication interface 3370 may embody computer readable instructions, data structures, program modules or other data in a modulated data signal (e.g., a carrier wave) or other transport mechanism. By way of example, and not limitation, communication interface 3370 may couple to wired media (e.g., a wired network, direct-wired connection, etc.) and/or wireless media (e.g., a wireless network, a wireless connection utilizing acoustic, RF, infrared, or other wireless signaling, etc.).

Input component 3380 may include any component for enabling a user, system, etc. to provide an input to system 3300. For example, input component 3380 may include a keyboard, mouse, pen, voice input device (e.g., microphone), touch input device (e.g., touchscreen), visual input device (e.g., optical sensor, camera, etc.), accelerometer, proximity sensor, some combination thereof, etc.

As shown in FIG. 33, output component 3390 may include any component for enabling system 3300 to provide an output to a user, system, etc. For example, output component 3390 may include a display device (e.g., LCD, LED, OLED, plasma, CRT, etc.), speaker, printer, some combination thereof, etc.

Graphics processor 3350 may perform graphics processing operations on graphical data stored in frame buffer 3360 or another memory (e.g., 3320, 3340, 3345, etc.) of computer system platform 3300. Graphical data stored in frame buffer 3360 may be accessed, processed, and/or modified by components (e.g., graphics processor 3350, processor 3310, etc.) of computer system platform 3300 and/or components of other systems/devices. Additionally, the graphical data may be accessed (e.g., by graphics processor 3350) and displayed on an output device coupled to computer system platform 3300. Accordingly, memory 3320, removable storage 3340, non-removable storage 3345, frame buffer 3360, or a combination thereof, may comprise instructions that when executed on a processor (e.g., 3310, 3350, etc.) implement a method of provisioning a plurality of computing resources (e.g., in accordance with process 300 of FIG. 3, process 1500 of FIG. 15, etc.), a method of assigning a permission level to a user (e.g., in accordance with process 300 of FIG. 3, etc.), a method of accessing computing resources provisioned across at least one cloud provider and/or at least one data center (e.g., in accordance with process 300 of FIG. 3, process 2300 of FIG. 23A and/or FIG. 23B, etc.), a method of monitoring usage of computing resources provisioned across at least one cloud provider and/or at least one data center (e.g., in accordance with FIGS. 24 to 32), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of provisioning a plurality of computing resources, said method comprising:
    accessing a user selection of said plurality of computing resources and of a plurality of cloud providers operable to implement said plurality of computing resources, wherein said user selection is input via a graphical user interface generic to said plurality of cloud providers;
    accessing a plurality of scripts associated with said plurality of cloud providers, wherein each script of said plurality of scripts corresponds to a respective cloud provider of said plurality of cloud providers, and wherein each script of said plurality of scripts is operable to allocate a computing resource on said respective cloud provider;

automatically allocating, using said plurality of scripts, said plurality of computing resources on said plurality of cloud providers to a plurality of virtual machines; and assigning a user permission level to a user, wherein said user permission level defines at least one operation said user is allowed to perform on a component associated with said plurality of computing resources, wherein the at least one operation is selected from a group consisting of creation of said component, deletion of said component, updating of said component and using said component.

2. The method of claim 1 further comprising:
accessing a user selection of a data center operable to implement at least one computing resource of said plurality of computing resources;
accessing at least one script associated with said data center; and
automatically allocating, using said at least one script, said at least one computing resource on said data center.

3. The method of claim 1, wherein said plurality of computing resources are selected from a group consisting of at least one processing resource, at least one storage resource, at least one network resource, at least one operating system, at least one software application, at least one software application configuration, state data, and another type of data.

4. The method of claim 1, wherein said plurality of computing resources are operable to implement at least one virtual machine.

5. The method of claim 1, wherein said graphical user interface is operable to automatically suggest said plurality of computing resources based on at least one user-defined attribute.

6. The method of claim 1, wherein said graphical user interface is operable to automatically suggest said plurality of cloud providers based on at least one user-defined attribute.

7. The method of claim 1, wherein said component is selected from a group consisting of an image, an instance, a file system, storage, and a static IP address.

8. The method of claim 1, wherein a first computing resource from a first cloud provider is allocated to a first virtual machine and a second computing resource from the first cloud provider is allocated to a second virtual machine.

9. The method of claim 8, wherein a first computing resource from a second cloud provider is allocated to the first virtual machine and a second computing resource from the second cloud provider is allocated to the second virtual machine.

10. A non-transitory computer-readable medium having computer-readable program code embodied therein for causing a computer system to perform a method of provisioning a plurality of computing resources, said method comprising:
accessing a user selection of said plurality of computing resources and of a plurality of cloud providers operable to implement said plurality of computing resources, wherein said user selection is input via a graphical user interface generic to said plurality of cloud providers;
accessing a plurality of scripts associated with said plurality of cloud providers, wherein each script of said plurality of scripts corresponds to a respective cloud provider of said plurality of cloud providers, and wherein each script of said plurality of scripts is operable to allocate a computing resource on said respective cloud provider;
automatically allocating, using said plurality of scripts, said plurality of computing resources on said plurality of cloud providers to a plurality of virtual machines; and
assigning a user permission level to a user, wherein said user permission level defines at least one operation said user is allowed to perform on a component associated with said plurality of computing resources, wherein the at least one operation is selected from a group consisting of creation of said component, deletion of said component, updating of said component and using said component.

11. The non-transitory computer-readable medium of claim 10, wherein said method further comprises:
accessing a user selection of a data center operable to implement at least one computing resource of said plurality of computing resources;
accessing at least one script associated with said data center; and
automatically allocating, using said at least one script, said at least one computing resource on said data center.

12. The non-transitory computer-readable medium of claim 10, wherein said plurality of computing resources are selected from a group consisting of at least one processing resource, at least one storage resource, at least one network resource, at least one operating system, at least one software application, at least one software application configuration, state data, and another type of data.

13. The non-transitory computer-readable medium of claim 10, wherein said plurality of computing resources are operable to implement at least one virtual machine.

14. The non-transitory computer-readable medium of claim 10, wherein said graphical user interface is operable to automatically suggest said plurality of computing resources based on at least one user-defined attribute.

15. The non-transitory computer-readable medium of claim 10, wherein said graphical user interface is operable to automatically suggest said plurality of cloud providers based on at least one user-defined attribute.

16. The non-transitory computer-readable medium of claim 10, wherein said component is selected from a group consisting of an image, an instance, a file system, storage, and a static IP address.

17. The computer-readable medium of claim 10, wherein a first computing resource from a first cloud provider is allocated to a first virtual machine and a second computing resource from the first cloud provider is allocated to a second virtual machine.

18. The computer-readable medium of claim 17, wherein a first computing resource from a second cloud provider is allocated to the first virtual machine and a second computing resource from the second cloud provider is allocated to the second virtual machine.

19. A system comprising a processor and a memory, wherein said memory comprises instructions that when executed by said system implement a method of provisioning a plurality of computing resources, said method comprising:
accessing a user selection of said plurality of computing resources and of a plurality of cloud providers operable to implement said plurality of computing resources, wherein said user selection is input via a graphical user interface generic to said plurality of cloud providers;
accessing a plurality of scripts associated with said plurality of cloud providers, wherein each script of said plurality of scripts corresponds to a respective cloud provider of said plurality of cloud providers, and wherein each script of said plurality of scripts is operable to allocate a computing resource on said respective cloud provider;

automatically allocating, using said plurality of scripts, said plurality of computing resources on said plurality of cloud providers to a plurality of virtual machines; and assigning a user permission level to a user, wherein said user permission level defines at least one operation said user is allowed to perform on a component associated with said plurality of computing resources, wherein the at least one operation is selected from a group consisting of creation of said component, deletion of said component, updating of said component and using said component.

20. The system of claim 19, wherein said method further comprises:

accessing a user selection of a data center operable to implement at least one computing resource of said plurality of computing resources;

accessing at least one script associated with said data center; and automatically allocating, using said at least one script, said at least one computing resource on said data center.

21. The system of claim 19, wherein said plurality of computing resources are selected from a group consisting of at least one processing resource, at least one storage resource, at least one network resource, at least one operating system, at least one software application, at least one software application configuration, state data, and another type of data.

22. The system of claim 19, wherein said plurality of computing resources are operable to implement at least one virtual machine.

23. The system of claim 19, wherein said graphical user interface is operable to automatically suggest said plurality of computing resources based on at least one user-defined attribute.

24. The system of claim 19, wherein said graphical user interface is operable to automatically suggest said plurality of cloud providers based on at least one user-defined attribute.

25. The system of claim 19, wherein said component is selected from a group consisting of an image, an instance, a file system, storage, and a static IP address.

26. The system of claim 19, wherein a first computing resource from a first cloud provider is allocated to a first virtual machine and a second computing resource from the first cloud provider is allocated to a second virtual machine.

27. The system of claim 26, wherein a first computing resource from a second cloud provider is allocated to the first virtual machine and a second computing resource from the second cloud provider is allocated to the second virtual machine.

* * * * *